US011464050B2

(12) United States Patent
Xin et al.

(10) Patent No.: US 11,464,050 B2
(45) Date of Patent: Oct. 4, 2022

(54) TIMER FOR NON-SIMULTANEOUS T/R MULTI-LINK DEVICE ACCESSING OF THE CHANNEL

(71) Applicants: SONY GROUP CORPORATION, Tokyo (JP); SONY CORPORATION OF AMERICA, New York, NY (US)

(72) Inventors: Liangxiao Xin, San Jose, CA (US); Mohamed Abouelseoud, Burlingame, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 0 days.

(21) Appl. No.: 17/306,307

(22) Filed: May 3, 2021

(65) Prior Publication Data

US 2022/0167406 A1    May 26, 2022

Related U.S. Application Data

(60) Provisional application No. 63/116,978, filed on Nov. 23, 2020.

(51) Int. Cl.
| | | |
|---|---|---|
| *H04W 74/08* | (2009.01) | |
| *H04W 74/00* | (2009.01) | |
| *H04W 84/12* | (2009.01) | |

(52) U.S. Cl.
CPC ..... *H04W 74/0816* (2013.01); *H04W 74/008* (2013.01); *H04W 84/12* (2013.01)

(58) Field of Classification Search
CPC ............ H04W 74/0816; H04W 74/008; H04W 84/12

USPC ........................................................ 370/329
See application file for complete search history.

(56) References Cited

U.S. PATENT DOCUMENTS

| | | | | |
|---|---|---|---|---|
| 2021/0211375 A1* | 7/2021 | Kwon | ............... | H04W 72/1257 |
| 2021/0266891 A1* | 8/2021 | Chu | ..................... | H04W 74/00 |

OTHER PUBLICATIONS

Xin, Liangxiao et al., "Channel Access for Strap MLD with non-STR non-AP MLD", IEEE Draft; v1ol. 802.11-20/0974r0, Jul. 1, 2020, pp. 1-12.

Naribole, Sharan et al., "Simultaneous Transmit-Receive Multi Channel Operation in Next Generation WLANS", 2020 IEEE Wireless Communications and Networking Conference, Samsung Semiconductor, Inc., San Jose, California, USA, May 25, 2020, pp. 1-8.

Naribole, Sharan et al., "Non-STR Blindness: Non-zero NAV on Blind Link Discussion", IEEE 802.11-20/1263r0, Sep. 10, 2020, pp. 1-14.

(Continued)

*Primary Examiner* — Gbemileke J Onamuti
(74) *Attorney, Agent, or Firm* — O'Banion & Ritchey LLP; John P. O'Banion

(57) ABSTRACT

A WLAN protocol which addresses a fairness issue in sharing MLD link access between STR and NSTR MLDs. The protocol allows NSTR MLDs to be transmitting under certain circumstances even when receiving on the other link of the NSTR link pair. A process is described in which an NSTR timer is utilized in a process of determining whether an NSTR MLD is allowed to transmit on a link of a NSTR link pair of the NSTR MLD even when it is receiving on the other link of the NSTR link pair. Numerous examples are described for utilizing this enhanced WLAN protocol.

28 Claims, 35 Drawing Sheets

(56) References Cited

OTHER PUBLICATIONS

Kim, Sanghyun et al., "Contention Window Value Management tor STR MLD", IEEE 802.11-20/1156r1, Jul. 30, 2020, pp. 1-8.

Li, Yunbo et al., "Discussion about single and multiple primary links in synchronous multi-link", IEEE 802.11-19/1993r1, Nov. 6, 2019, pp. 1-11.

Dibakar, Das et al., "Blindness issue for non-STR operations-followup", doc.: IEEE 802.11-20/1009r4, filed Jul. 3, 2020, submission—13 slides, downloaded from https://www.google.com/url?sa=t&rct=j&q=&esrc=s&source=web&cd=&cad=rja&uact=8&ved=2ahUKEwjns8zoxbPtAhWm7XMBHVYQCY4QFjAAegQIBBAC&url=https%3A%2F%2Fmentor.ieee.org%2F802.11%2Fdcn%2F20%2F11-20-1009-04-00be-mulli-link-hidden-lerminal-followup.pptx&usg=AOvVaw3QjVMvRByS7Je1fghfeTgK.

Fischer, Matthew, "IEEE P802.11, Wireless LANs, Proposed Spec Text, Multi-link Channlel Access: General-Non-STR", doc.: IEEE 802.11-20/1395r3, Sep. 2, 2020, submission—5 pages, downloaded from https://www.google.com/url?sa=t&rct=j&q=&esrc=s&source=web&cd=&cad=rja&uact=8&ved=2ahUKEwjgrd_YwrPtAhXr5nMBHZU4CCMQFjAAegQIAxAC&url=https%3A%2F%2Fmentor.ieee.org%2F802.11%2Fdcn%2F20%2F11-20-1395-03-00be-pdt-mac-mlo-.

Gan, Ming et al., "AP assisted Non-STR behavior", doc.: IEEE 802.11-20/0613-01-00be, Apr. 1, 2020; submission—10 slides, downloaded from https://www.google.com/url?sa=t&rct=j&q=&esrc=s&source=web&cd=&cad=rja&uact=8&ved=2ahUKEwj7rPOS-LPtAhWv9XMBHf5VBc8QFjAAegQIBBAC&url=https%3A%2F%2Fmentor.ieee.org%2F802.11%2Fdcn%2F20%2F11-20-0613-01-00be-ap-assisted-non-str-behavior.pptx&usg=AOvVaw3YsRxN9EgHeh2e-0y_6DZ.

* cited by examiner

Data frame | Frame Control | Duration | RA | TA | Sequence Control | Data | FCS |

FIG. 2A
(Prior Art)

ACK frame | Frame Control | Duration | RA | FCS |

FIG. 2B
(Prior Art)

HE-SU | L-STF (8μs) | L-LTF (8μs) | L-SIG (4μs) | RL-SIG (4μs) | HE-SIG-A (8μs) | HE-STF (4μs) | HE-LTFs | Data | PE |

FIG. 3
(Prior Art)

TIMER FOR NON-SIMULTANEOUS T/R MULTI-LINK DEVICE ACCESSING OF THE CHANNEL

CROSS-REFERENCE TO RELATED APPLICATIONS

This application claims priority to, and the benefit of, U.S. provisional patent application Ser. No. 63/116,978 filed on Nov. 23, 2020, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to Wireless Local Area Network (WLANs) systems, and more particularly to a WLAN protocol which fairly shares links of Multi-Link Devices (MLDs) regardless of whether they are that of Simultaneous Transmit/Receive (STR) or Non-STR (NSTR) MLDs.

2. Background Discussion

Existing wireless communication systems using Carrier Sense Multiple-Access/Collision Avoidance (CSMA/CA) allow a station (STA) to contend and obtain the (Transmission Opportunity) TXOP on a single link. TXOP is a contention free period so that the station (STA) can transmit multiple packets without re-contending for the channel between packets.

These current wireless communication systems allow more than one STA to be affiliated with a device, such as in what is referred to as a multi-link device (MLD). If all the affiliated STAs of a MLD are APs, then this MLD is called an AP MLD. If all the affiliated STAs of a MLD are non-APs, then this MLD is called non-AP MLD.

When a STA of a MLD sets up communications with a STA of another MLD over a channel/band (denoted as a link), they can exchange packets over that link. Every STA affiliated with the same MLD uses a link of different frequency channel/band.

A MLD may have at least one link pair, whereby a STA affiliated with the MLD transmits or receives on one link of the link pair which could affect operations on another STA affiliated with the same MLD as it transmits or receives on the other link of the link pair. For example, the link pair could be a non-simultaneous transmit and receive (NSTR) link pair as defined in IEEE 802.11be. The packet received by one STA of a NSTR MLD on a NSTR link pair of the NSTR MLD could collide due to in-device coexistence interference if another STA of the same NSTR MLD is transmitting a packet on the other link of the NSTR link pair at the same time. A MLD having at least one NSTR link pair is denoted as NSTR MLD. Otherwise, a MLD having no NSTR link pair is denoted as STR MLD.

However, existing protocols have numerous issues in regard to handling channel access on STAs of MLDs, especially when there is a mixture of STR and NSTR MLDs on the network.

Accordingly, a need exists for a protocol which improves link access for MLD operations, especially those involving a mixture of STR and NSTR MLDs. The present disclosure fulfills that need and provides additional benefits over previous technologies.

BRIEF SUMMARY

A WLAN protocol which resolves the fairness issue between STR MLDs and NSTR MLDs in accessing links of the MLD. Previously, if a STR MLD occupies one link of a NSTR link pair of the NSTR MLD for the transmissions with the NSTR MLD, then the NSTR MLD should not transmit on the other link of the NSTR link pair. This results in a fairness issue as NSTR MLDs can be denied a fair share of link access.

To solve this issue, the NSTR MLD according to the protocol is allowed under certain circumstances to transmit on a link of a NSTR MLD even when it is receiving on the other link of the NSTR link pair. To accomplish this a timer is utilized, denoted as an NSTR timer, that the NSTR MLD utilizes for determining whether it is allowed to transmit on a link of a NSTR link pair of the NSTR MLD even when it is receiving on the other link of the NSTR link pair.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 2A and FIG. 2B are data field diagrams of a Data frame and ACK frame format in a regular WLAN system.

FIG. 3 is a data field diagram of an HE-SU PPDU frame format in IEEE 802.11ax.

DETAILED DESCRIPTION

1. WLAN Systems Under IEEE 802.11

1.1. CSMA/CA Systems

In WLAN systems, IEEE 802.11 uses CSMA/CA to allow stations (STAs) to obtain access to the channel for packet transmission and retransmission.

Figure 1:
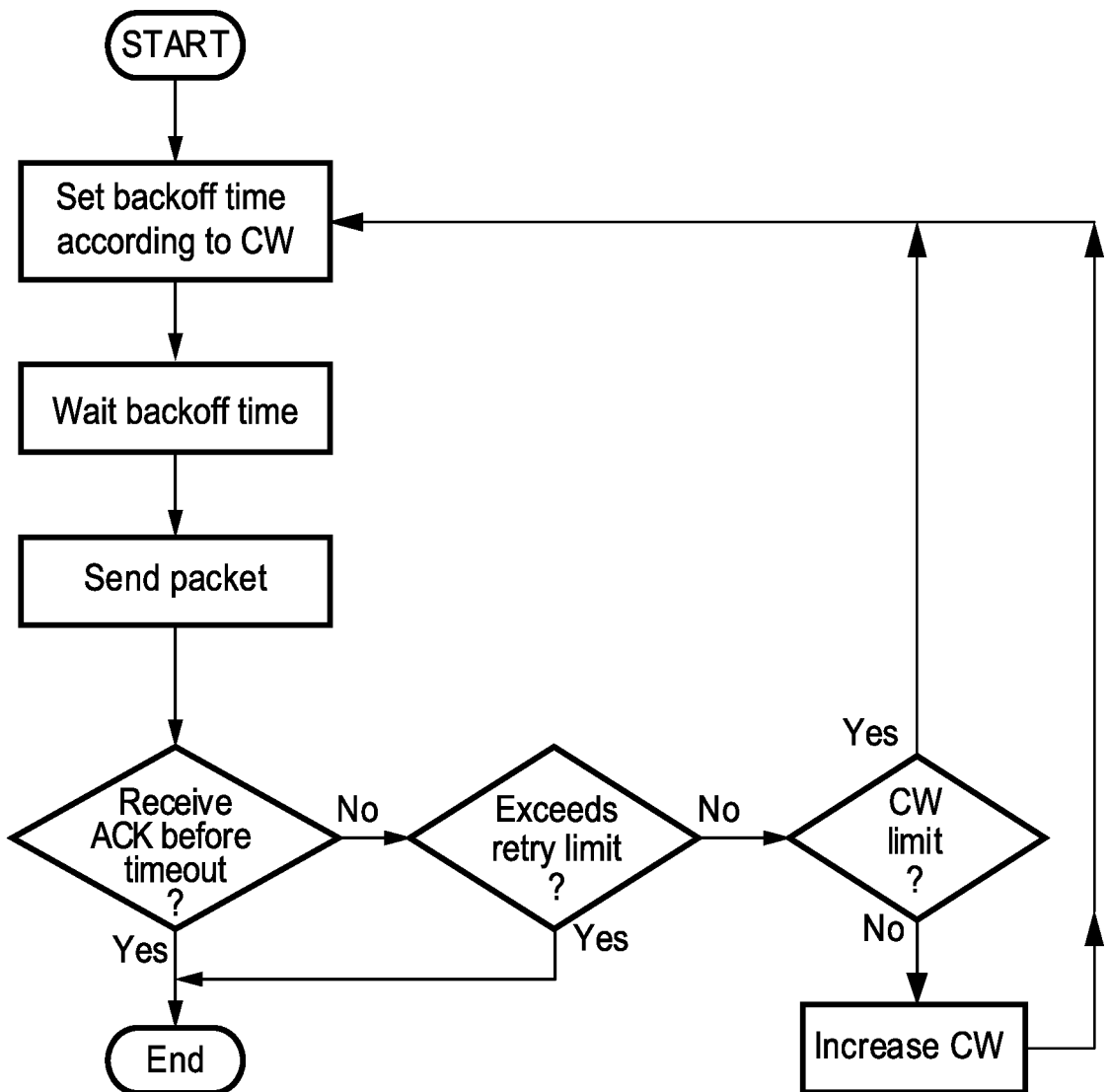
FIG. 1 is a flow diagram of a retransmission scheme in CSMA/CA under IEEE 802.11.

FIG. 1 depicts a flow diagram of this process. In CSMA/CA systems, before each transmission and retransmission, the STA has to sense channel status and sets a backoff time to contend for channel access. The backoff time is decided by a uniform random variable between 0 and the contention window size. After the STA waits for the backoff time and senses that the channel is idle, then the STA may send a packet.

If an acknowledgement (ACK) for the transmission is received, then the transmission succeeded. Otherwise, retransmission of that packet is required; since the STA did not receive an ACK for packet transmission before the timeout occurred. When retransmission is required, the STA checks the number of retransmissions which have been performed for the packet. If the number of retransmission attempts exceeds the retry limit, then the packet is dropped and no retransmission is scheduled. Otherwise, the retransmission is scheduled.

If retransmission is scheduled, then another backoff time is needed to contend for retransmission channel access. If the size of the contention window has not reached the upper limit, the STA increases it.

The STA sets another backoff time depending on the new size of the contention window. The STA waits for the backoff time period for checking channel status and performing its retransmission and proceeds accordingly.

FIG. 2A illustrates a data frame format in a regular WLAN system, having the following fields. A Frame Control field indicates the type of frame. A Duration field contains NAV information used for CSMA/CA channel access. An RA field contains the address of the recipient of the frame. A TA field contains the address of the STA that transmitted the frame. A Sequence control field contains the fragment number and the sequence number of the packet. A data field contains the data payload of the frame. A frame check sequence (FCS) is also shown here and in other data structures described herein. FCS is an error-detecting code added to a frame in a communications protocol, when communicating data from a source to a destination.

FIG. 2B illustrates an Acknowledgement (ACK) frame format in a regular WLAN system having the following fields. A Frame Control field indicates the type of frame. A Duration field contains NAV information used for CSMA/CA channel access. An RA field contains the address of the recipient of the frame.

FIG. 3 depicts a High-Efficiency (HE) Single-User (SU) Physical-layer Protocol Data Unit (PPDU) format used for SU transmission in IEEE 802.11ax; which contains the following fields.

An L-STF field is a non-HT short training field. An L-LTF field is a non-HT long training field. An L-SIG field is a non-HT SIGNAL field. An RL-SIG field is a repeated non-HT SIGNAL field. An HE-SIG-A field is a HE SIGNAL A field. An HE-STF field is a HE short training field. An HE-LTF field is a HE long training field. A Data field is a field carrying the data as PSDUs. A PE field is a packet extension field.

Figure 4:
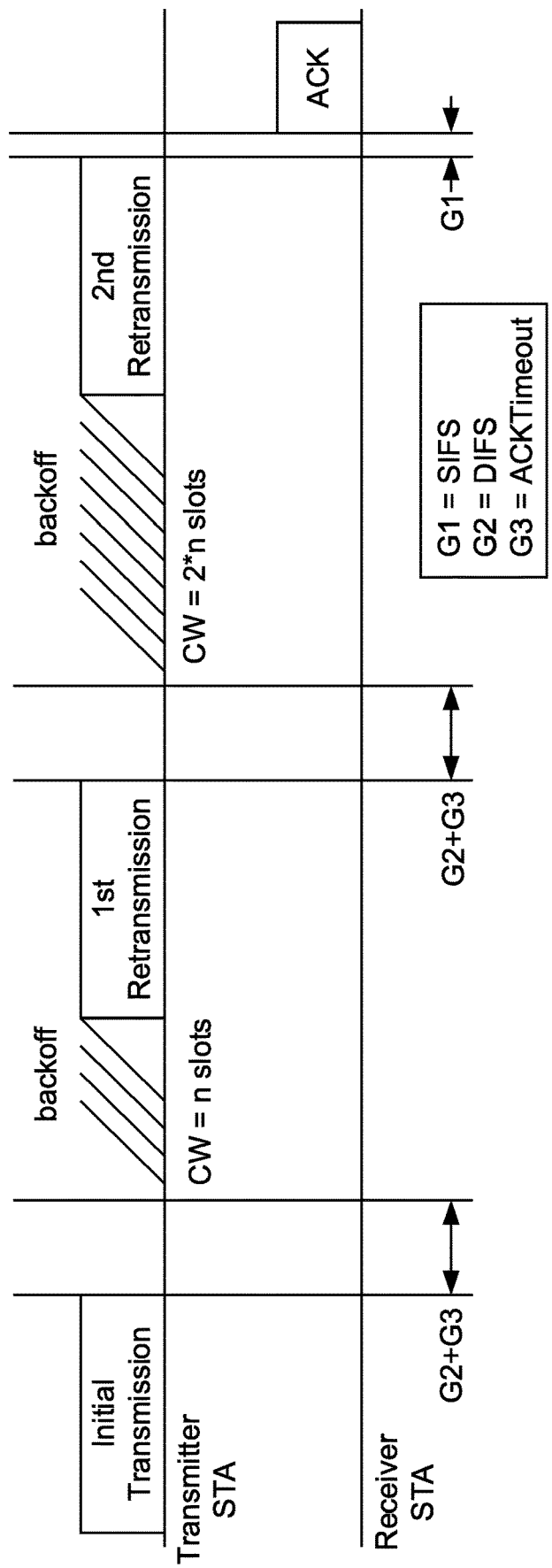
FIG. 4 is a communications sequence diagram of a double sized contention window when performing a retransmission in CSMA/CA.

FIG. 4 illustrates one example of the retransmission in CSMA/CA where the backoff time is increased due to retransmission. The data frame and the ACK frame use the formats as shown in FIG. 2A-FIG. 2B, respectively. The frames are packetized using the packet format as shown in FIG. 3. In this example, after the transmitter transmits the initial transmission of a packet it does not receive the ACK before timeout. So, it sets another backoff time for a first retransmission, whereby the size of the contention window is n slots. After waiting the backoff time, the transmitter STA retransmits the packet for the first time. However, the retransmission also fails. The transmitter STA needs to retransmit the packet and sets backoff time again to contend again for channel access. This time, the size of the contention window is doubled, which is 2*n slots, due to the retransmission. The expected backoff time is also doubled by the contention window size. The 2nd retransmission succeeds since it receives an ACK before timeout.

Figure 5:
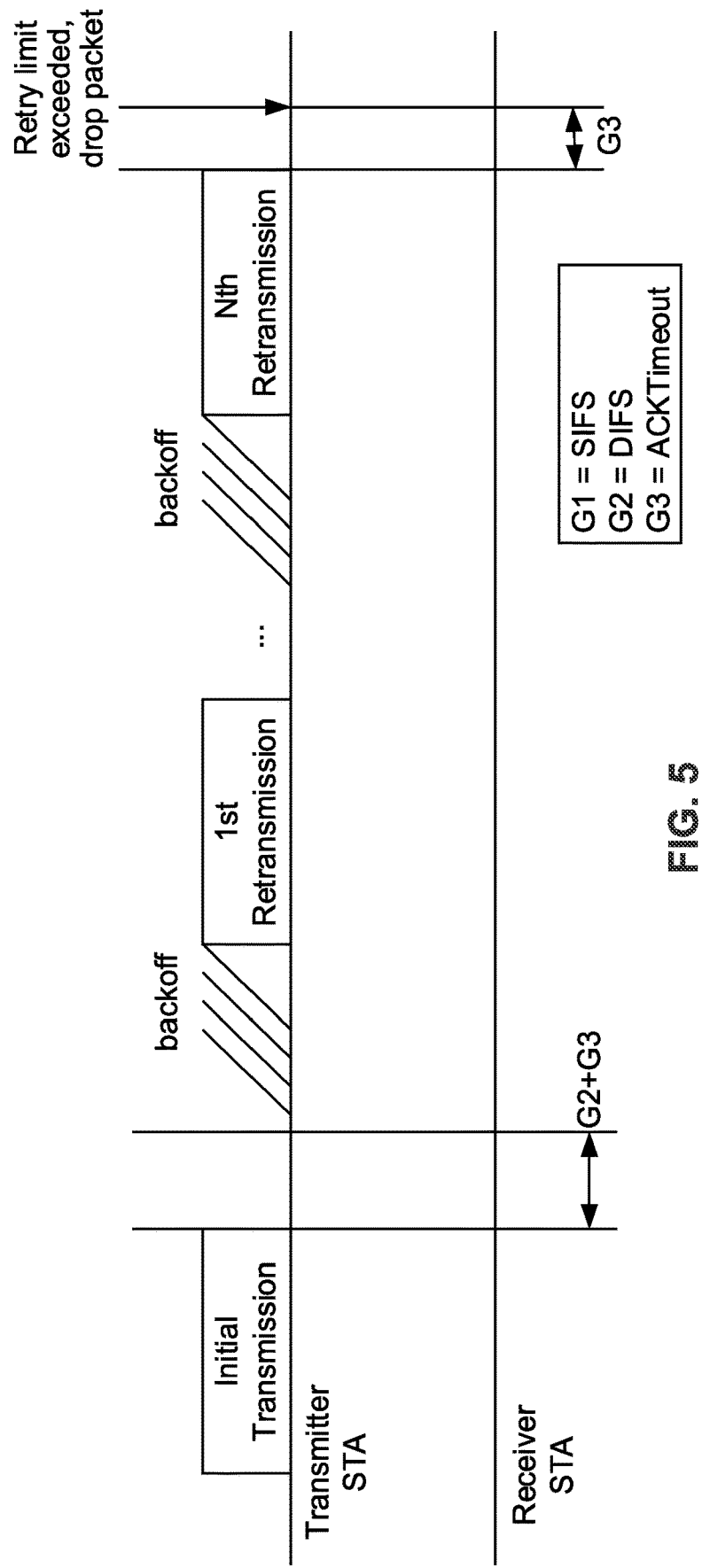
FIG. 5 is a communications sequence diagram showing a packet being dropped due to reaching the retry limit under CSMA/CA.

FIG. 5 illustrates one example in which the packet is dropped after the number of retransmissions exceeds the retry limit. Let us denote the retry limit by R. The data frame and the ACK frame use the formats as shown in FIG. 2A and FIG. 2B, respectively. The frames are packetized using the packet format as shown in FIG. 3. As shown in FIG. 5, after the initial transmission of a packet fails, the transmitter STA retransmits that packet multiple times. However, none of the retransmissions succeed. After retransmitting R times, the number of retransmissions exceeds the retry limit, whereby the transmitter STA stops retransmitting the packet and that packet is dropped.

2. Problem Statement

The disclosed technology addresses the issue of transmission fairness for NSTR MLDs. For a MLD having multiple STAs which are operating on different frequency bands/channels (i.e., links), the signal transmission on a link by a STA of the MLD can interfere with signal reception on another link by another STA of the MLD. This form of interference is referred to as in-device coexistence interference. For a NSTR MLD, the in-device coexistence interference is high, i.e., the interference due to the signal transmission on a link by a STA of the MLD can destroy the signal reception on another link by another STA of the MLD. Thus the NSTR MLD should not transmit on a link while receiving on another link simultaneously.

For a STR MLD, it is able to transmit on a link while receiving on another link simultaneously due to its low in-device coexistence interference.

The challenge is to ensure that the NSTR MLD has a fair opportunity to transmit on the NSTR links. When communication is established between one STR MLD and one NSTR MLD, both of the MLDs could contend for the channel to gain channel access. However, due to the constraints of an NSTR MLD, the chance of the NSTR MLD to gain channel access can be lower than that of the STR MLD. For example, when the NSTR MLD is receiving from the STR MLD on a link of a NSTR link pair of the NSTR MLD, the NSTR MLD should not transmit on the other link of the NSTR link pair. However, the STR MLD could continue to contend and transmit on the other link of the NSTR link pair of the NSTR MLD. In order to give the NSTR MLD a fair chance to transmit, the NSTR MLD should be allowed to transmit on one link of a NSTR link pair when it is receiving on the other link of the NSTR link pair.

The disclosed technology provides a mechanism for NSTR MLD to allow it to transmit on a link of its NSTR link pair while it is receiving on the other link of its NSTR link pair. The purpose is to give the NSTR MLD enough chance for transmitting its own packets.

3. Contribution of the Disclosure

The disclosed technology solves the fairness issue between STR and NSTR MLDs. If a STR MLD occupies one link of a NSTR set of links of an NSTR MLD, then the NSTR MLD has been previously prevented from transmitting on the other link(s) of the NSTR links. A protocol is described which solves this problem to allow the NSTR MLD to transmit on a link of a NSTR MLD in certain instances even when it is receiving on the other link of the NSTR link pair.

The disclosed technology relies on utilizing a timer, denoted as an NSTR timer, for the NSTR MLD to make decisions whether it is allowed to transmit on a link of a NSTR link pair of the NSTR MLD even when it is receiving on the other link of the NSTR link pair.

4. Embodiment

4.1. STA Hardware Configuration

Figure 6:
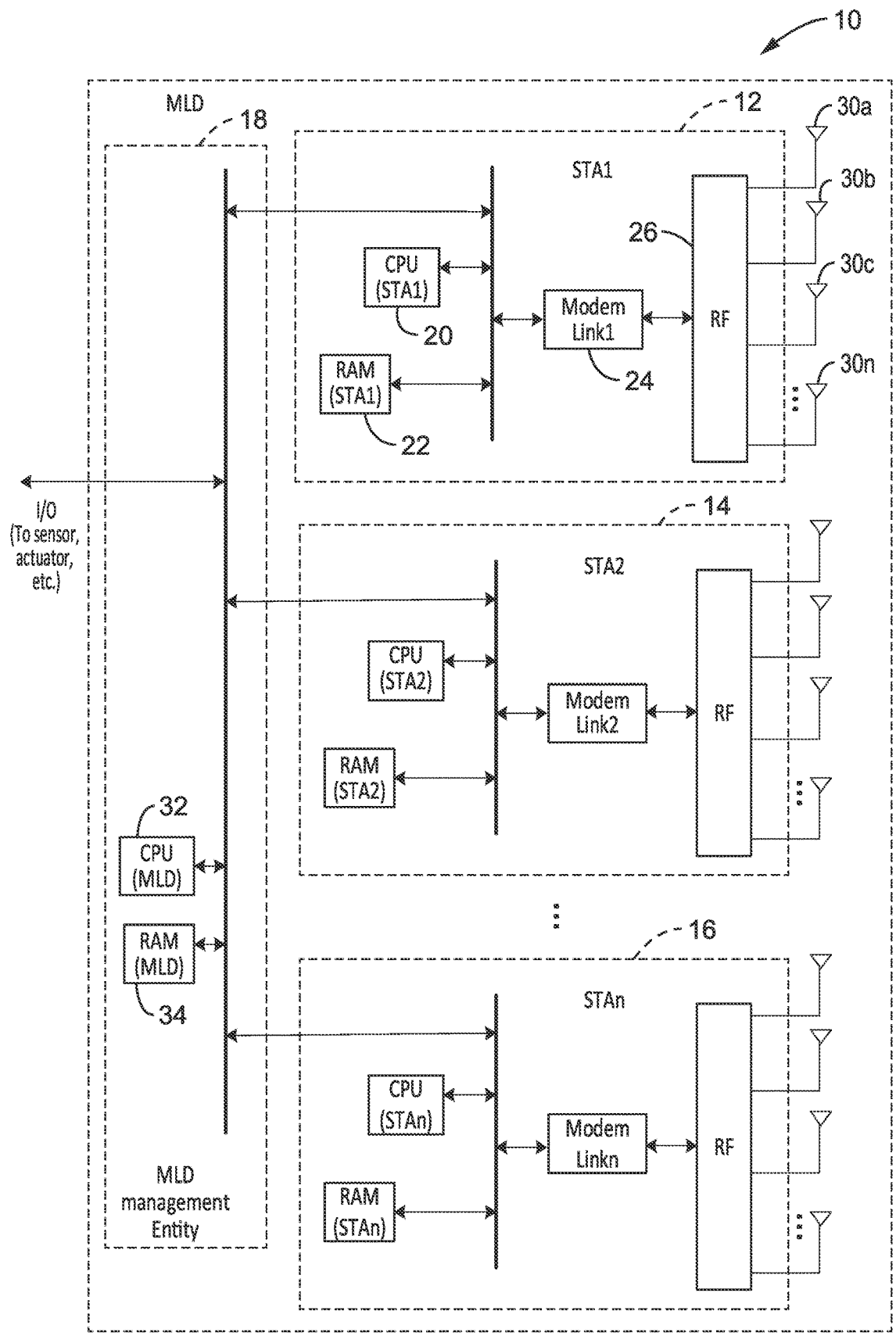
FIG. 6 is a hardware block diagram of a station configuration, such as contained in Multi-Link Device hardware, according to at least one embodiment of the present disclosure.

FIG. 6 illustrates an example embodiment 10 of station hardware, exemplified herein in a multi-link device (MLD) hardware configuration. Multiple STAs are affiliated with an MLD, having up to "n" stations 12a, 12b through 12n each of which operates on a link of a different frequency.

Hardware for each station (STA) has external I/O access 14 to applications, and an internal bus 16 connecting to at least one processor (CPU, MCU, SoC, or other control circuit) 18 and memory (e.g., RAM, or similar program and/or data store) 20, the combination being configured for execute programming that implements this wireless communication protocol.

Each STA accommodates at least one modem 22 to support communications coupled to at least one RF module 24 connected to one or more antennas 26a, 26b, 26c through 26n for performing communications, in one or more bands, such as sub-6 GHz band (e.g., 2.4, 5, 6 GHz), and/or over millimeter wavelengths (mmW). In at least one embodiment the RF module 24 includes a frequency converter, array antenna controller, and other associated circuits.

In certain instances the RF can be configured for omni-directional antenna operation, and/or may be directional to increase gain. By way of example, RF module 24 is shown having multiple antennas to support beamforming for transmission and reception on that band. In this way, the STA may transmit signals using one or multiple sets of beam patterns. It should be appreciated that any desired bands can be supported by the teachings of the present disclosure. The present example shows multiple STAs grouped (clustered) in this multi-link device.

Bus 14 allows connecting various devices to the CPU, such as to sensors, actuators and so forth. Instructions from memory 20 are executed on processor 18 to execute a program which implements the communication protocol, which is executed to allow the STA to perform the functions of an access point (AP) station or a non-AP (regular) station (STA). It should also be appreciated that the programming is configured to operate in different modes (source, transmitter, intermediate, destination, receiver, first AP, other AP, non-AP stations associated with the first AP, non-AP TXOP holder station, non-AP TXOP participant stations, non-AP TXOP non-participant stations, stations associated with another AP, coordinator, coordinatee and so forth), depending on what role it is playing in the current communications context. In addition the protocol is configured for operating with separate stations or stations within multi-link devices (MLDs) which are configured for either Simultaneous Transmit and Receive (STR MLD), or do not have that capability (non-STR MLD).

It should be appreciated that the STAs of the present disclosure, such as those within this MLD, can be configured with multiple modems 22, with each modem coupled to any arbitrary number of RF circuits. In general, using a larger number of RF circuits will result in broader coverage of the antenna beam direction. It should be appreciated that the number of RF circuits and number of antennas being utilized is determined by hardware constraints of a specific device. Some of the RF circuitry and antennas may be disabled when the STA determines it is unnecessary to communicate with neighboring STAs.

The MLD is shown having an internal bus 34 for communicating between its processor 36 and associated memory 38 and each of the STAs 12a, 12b through 12n. In addition, the MLD has external I/O 32 to access applications for MLD, CPU and RAM of MLD management entity, to run a program that implements communication protocols at the MLD level. It can distribute tasks to, and collect information from, each affiliated STA and share information between affiliated STAs.

It should also be appreciated that each STA of the MLD need not have its own processor and memory. In at least one embodiment, one or more of the stations within the MLD may share processors and memory between themselves, or share the processor and memory of the MLD circuit. Thus, the present disclosure contemplates many possible arrangements for communication over multiple links within an MLD.

4.2. STA Topology for Consideration

Figure 7:
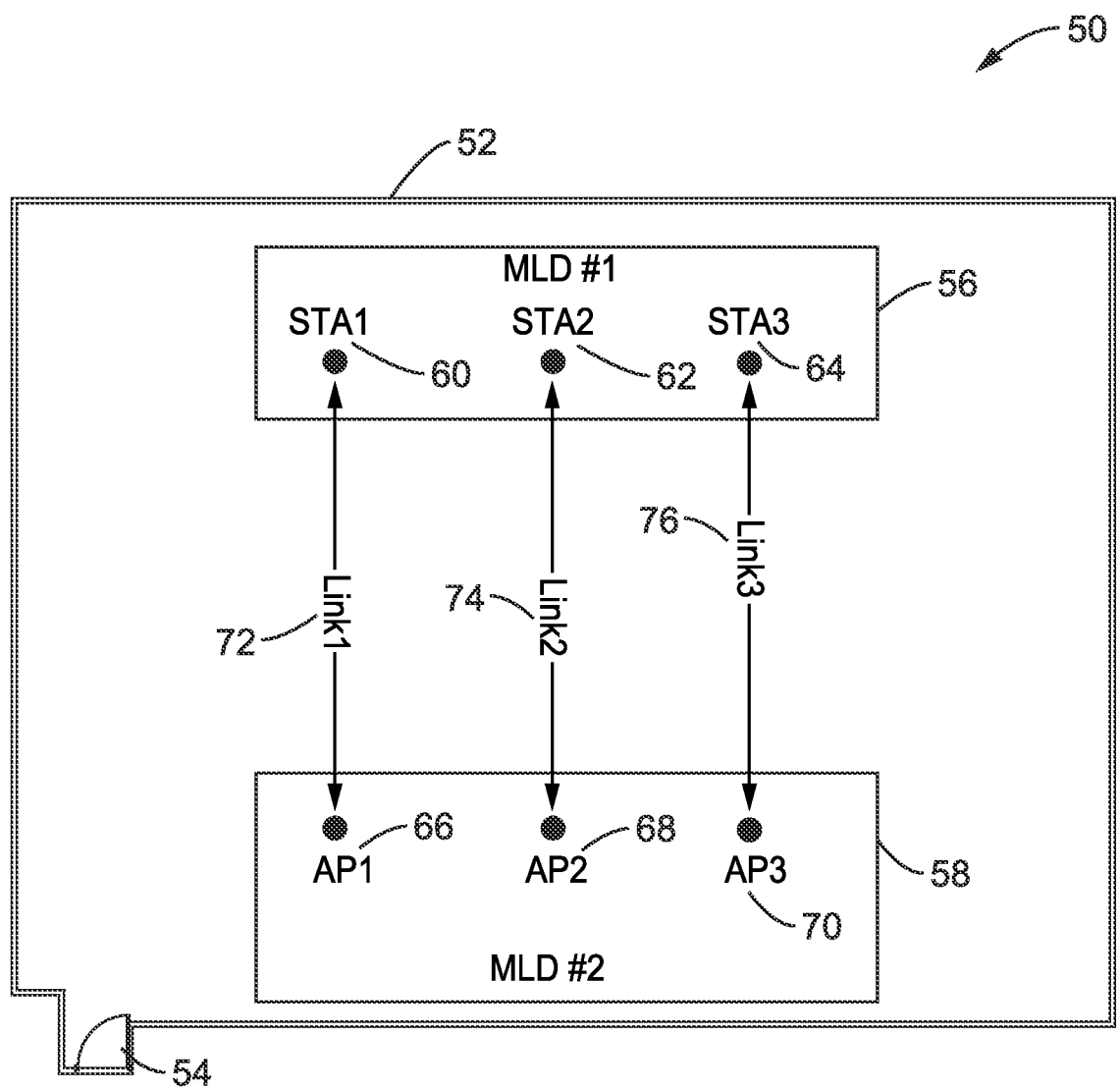
FIG. 7 is a station topology embodiment for consideration according to at least one embodiment of the present disclosure.

FIG. 7 illustrates an example embodiment 50 of a wireless topology between MLDs. To better explain the goal of the disclosed technology, the figure sets up a network scenario. It should be appreciated that this topology is only shown for illustrating the example cases described herein; as the present disclosure provides a protocol which can be operated in any desired topology.

A multi-link device (MLD) is a device that has more than one (e.g., two or more) affiliated STA and has one Media Access Control (MAC) Service Access Point (SAP) to a Logical Link Control (LLC), which includes one MAC data service.

If an MLD is able to transmit and receive on different links simultaneously, then such an MLD is referred to as being a Simultaneous Transmit and Receive MLD (STR-MLD); otherwise if an MLD is not able to transmit on a link(s) and receive on the other link(s) simultaneously due to in-device operation constraints, then this MLD is referred to herein as a non-STR (NSTR) MLD. An NSTR MLD can either transmit on one or more of its links simultaneously, or receive on one or more of its links simultaneously.

The topology assumes by way of example that there are six STAs 60, 62, 64, 66, 68 and 70 consisting of two MLDs 56, 58 in a meeting room 52 having by way of example an opening (e.g., window(s), door(s)) 54. STAs 1, 2, 3 (60, 62 and 64) are affiliated with multi-link device (MLD) #1 and APs 1, 2, 3 (66, 68 and 70) are affiliated with MLD #2. STAs 1, 2, 3 are associated with APs 1, 2, 3 over links 1, 2, 3, (72, 74 and 76) respectively.

When the in-device coexistence interference is high between links of the same MLD, i.e., the interference due to the signal transmission on a link by a STA of the MLD can destroy the signal reception on another link by another STA of the same MLD, such links consist of a non-simultaneous transmit and receive (NSTR) links of that MLD. The NSTR MLD should not transmit on a link of a NSTR link pair while receiving on other links of the same NSTR simultaneously.

In the protocol all STAs are considered to use CSMA/CA for random channel access on its links. It should be appreciated that the NSTR timer operations described can be utilized by AP MLDs or non-AP MLDs. It is also possible that the MLD may only enable a portion of its STAs, for example a single STA and behave as a single link device.

4.3. Setting a Timer for MLD Accessing a Channel

This section explains the aspects of setting a timer, denoted as NSTR timer, for a MLD, especially for a NSTR MLD accessing a link (e.g., channel/band). The following describes a number of aspects for obtaining link fairness for NSTR MLDs: (a) how the NSTR timer variable is used for the NSTR MLD to make its decision on transmitting; (b) how a STA affiliated with a MLD sets and resets its NSTR timer; and (c) how a STA affiliated with a MLD counts down the NSTR timer.

It should be appreciated that the NSTR timer is not the backoff timer. The count-down procedure of backoff is generally independent of the count-down procedure of NSTR timer. It should also be noted that it is possible for one link to belong to multiple NSTR link pairs of a MLD.

It should also be appreciated that although for the sake of simplicity of illustration the discussion describes counting down the NSTR timer to zero, it can be equally performed by counting down or up (down/up) from an initial value (e.g., by a set/reset) by any desired increment toward any desired terminal count or value, at which point counting stops and the count remains at that value. Special values, which are not counted down, may be set aside to indicate specific conditions that remain the same until the counter is set, reset, reloaded to another value, or discarded. One of ordinary skill in the art will appreciate that there are many ways to implement a process/structure which allows for generating controlled delays for spacing selected events within a communication sequence, and the disclosure embodiments are not limited to any specific counting/delaying approach.

It should be noted that the NSTR timer may be configured to decremented/incremented to its terminal value with any desired time base, for example using based on time unit (TU) from IEEE802.11 which are equal to 1024 microseconds, or microseconds as used by the Timing synchronization function (TSF) which is based on a 1-MHz clock and ticks in microseconds, or use slot timing as with the backoff counter, or other form of time base.

Figure 8:
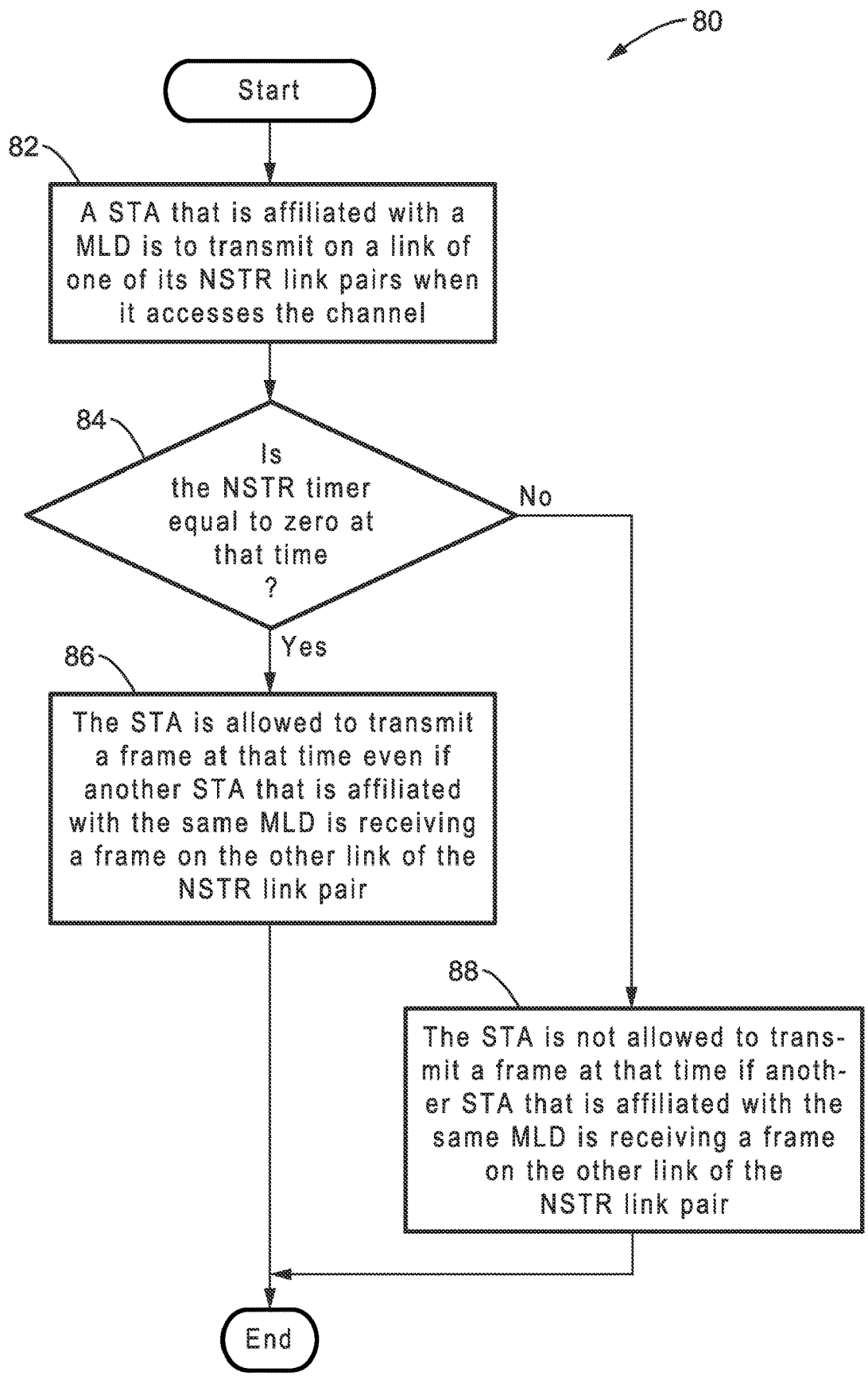
FIG. 8 is a flow diagram for a STA affiliated with a MLD transmitting on a link of one of its NSTR link pairs depending on its NSTR timer according to at least one embodiment of the present disclosure.

FIG. 8 illustrates an example embodiment 90 of a STA affiliated with a MLD setting a NSTR timer for transmitting on a link of one of its NSTR link pairs.

A STA that is affiliated with a MLD sets 82 a timer, denoted by NSTR timer, when it is to transmit on a link of one of its NSTR link pairs when it accesses the channel. A check is made 84 to determine if the NSTR timer is equal to zero (terminal count) at that time. If the timer is zero, then at block 86 the STA is allowed to transmit a packet at the same time that another STA that is affiliated with the same MLD is receiving packet on the other link of the NSTR link pair. If the NSTR timer value at block 84 is not equal to zero at that time, then at block 88 the STA is not allowed to transmit packets at the same time that another STA that is affiliated with the same MLD is receiving packets on a second link of the NSTR MLDs links.

Figure 9A:
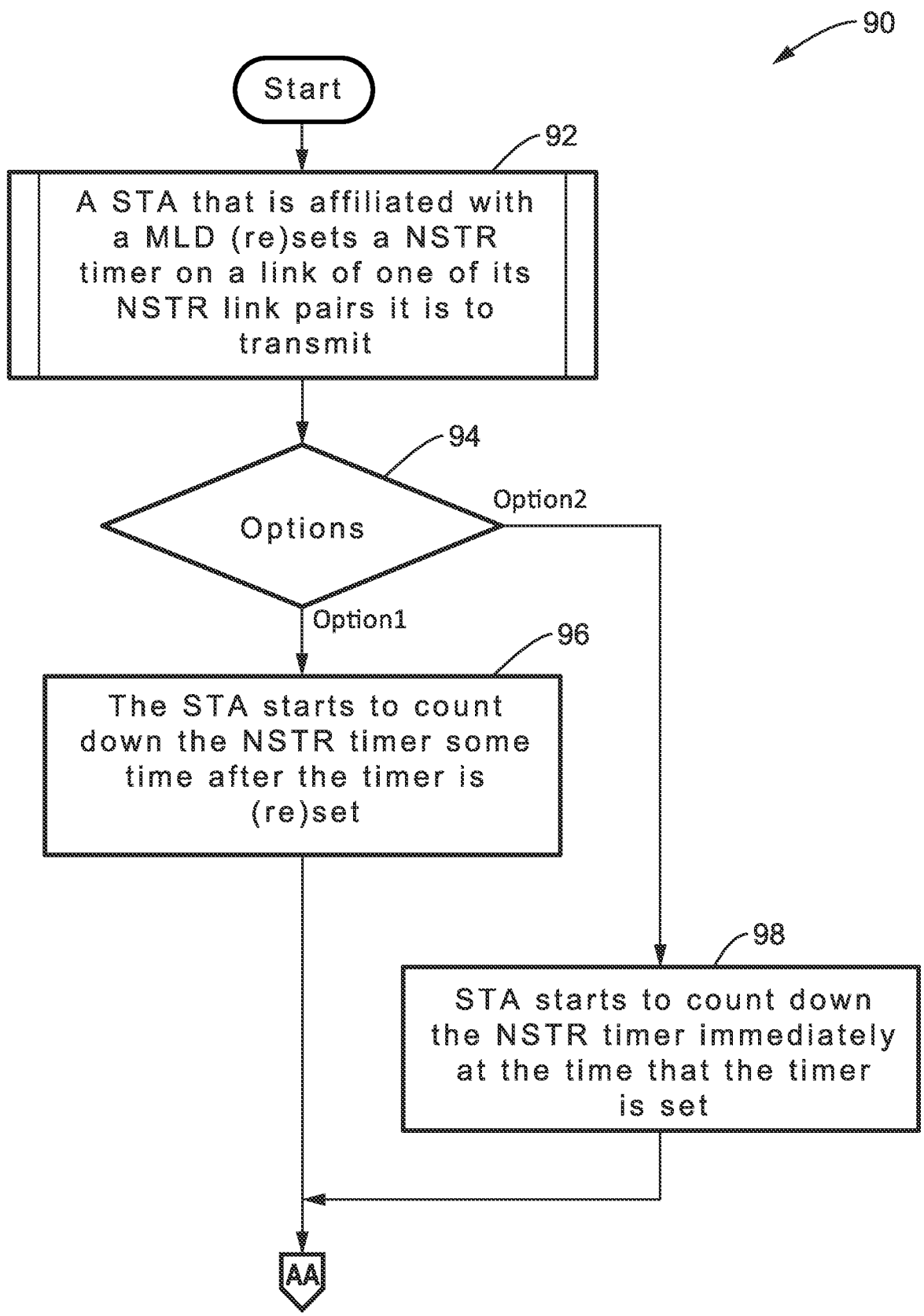
FIG. 9A and FIG. 9B is a flow diagram for a STA affiliated with a MLD setting and counting down its NSTR timer according to at least one embodiment of the present disclosure.
Figure 9B:
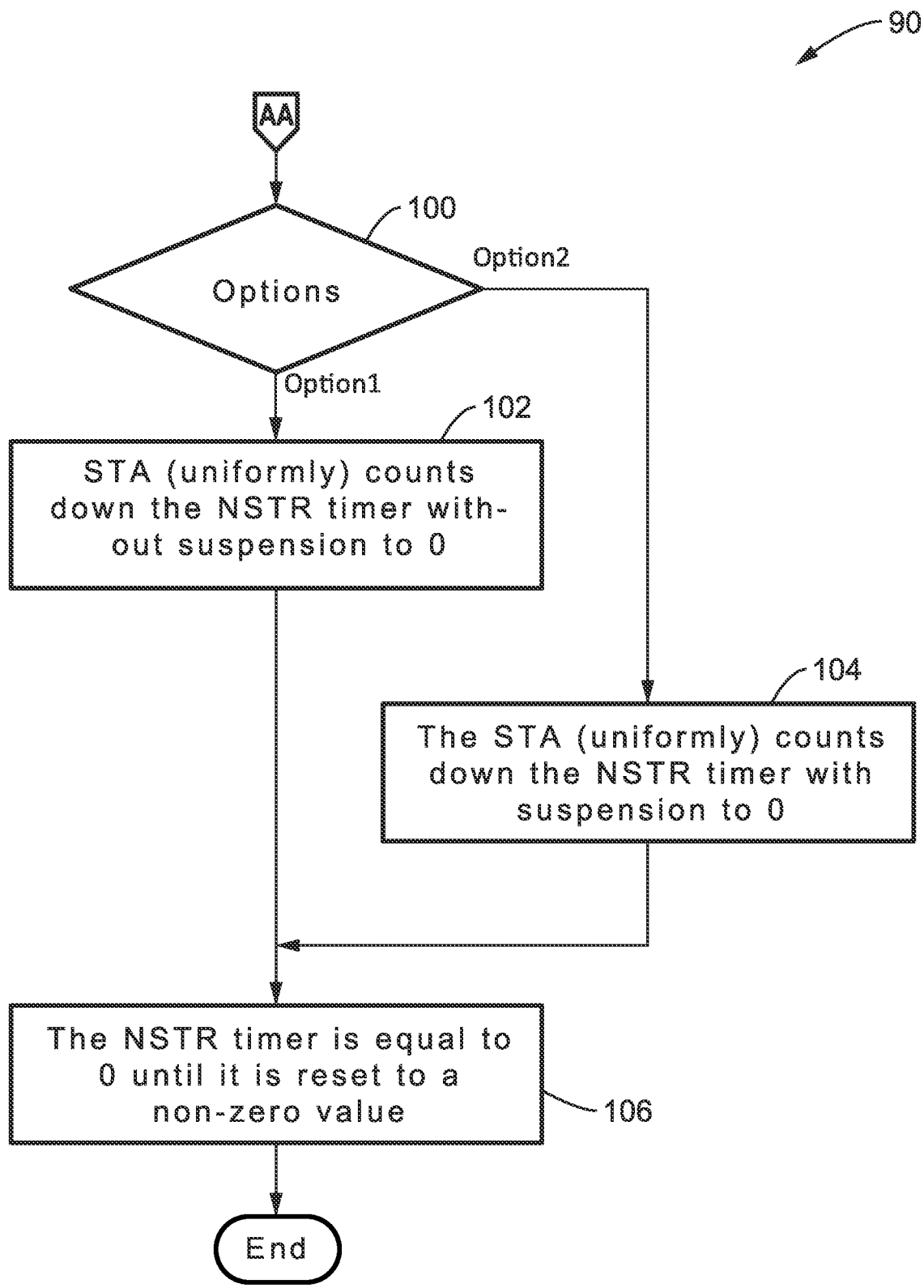

FIG. 9A through FIG. 9B illustrate an example embodiment 90 of a STA affiliated with a MLD which is setting and counting down its NSTR timer. A STA that is affiliated with a MLD sets or resets 92 a timer, denoted herein as an NSTR timer, for a link of one of its NSTR link pairs that it is to transmit. The determination of when to set or reset the NSTR timer is explained in FIG. 10. Returning to FIG. 9A, after the STA sets or resets the timer, a decision is made 94 to determine which of two options is to be taken for starting the count down of the NSTR timer 94.

If Option 1, seen in block 96, is selected then the STA starts to count down the NSTR timer some time after the NSTR timer is set. For example, the NSTR timer starts to count down from its initial count value at the first indication of it sensing that another STA affiliated with the same MLD is receiving a frame on the other link of the NSTR link pair after the timer is set.

If Option 2, seen in block 98, is selected then the STA starts counting down the NSTR timer immediately upon the timer being set.

In either case, after the STA starts to count down its NSTR timer, then execution reaches decision block 100 in FIG. 9B to select between two options for counting down the NSTR timer to its terminal count of zero 100.

If Option 1 is selected then execution reaches block 102 and the STA (uniformly) counts down the NSTR timer to zero without suspension.

If Option 2 is selected then execution reaches block 104 with the STA (uniformly) counting down the NSTR timer to zero with suspension. For example, a STA affiliated with a MLD counts down the NSTR timer only if it senses that another STA that is affiliated with the same MLD is receiving a frame on the other link of the NSTR link pair. Otherwise, the NSTR timer does not count down. It is also possible that the NSTR timer is counted down only when the STA senses that the channel on its link is idle but another STA that is affiliated with the same MLD is receiving a frame on the other link of the NSTR link pair.

In either case, after the NSTR timer is counted down to zero, then block 106, and the timer remains equal to zero until it is reset (reinitialized) to a non-zero value.

It should be noted that the STA can reset its NSTR timer at anytime during this procedure. When the NSTR timer is reset, the STA restarts the count-down procedure of the NSTR timer as described in the flowchart.

Figure 10:
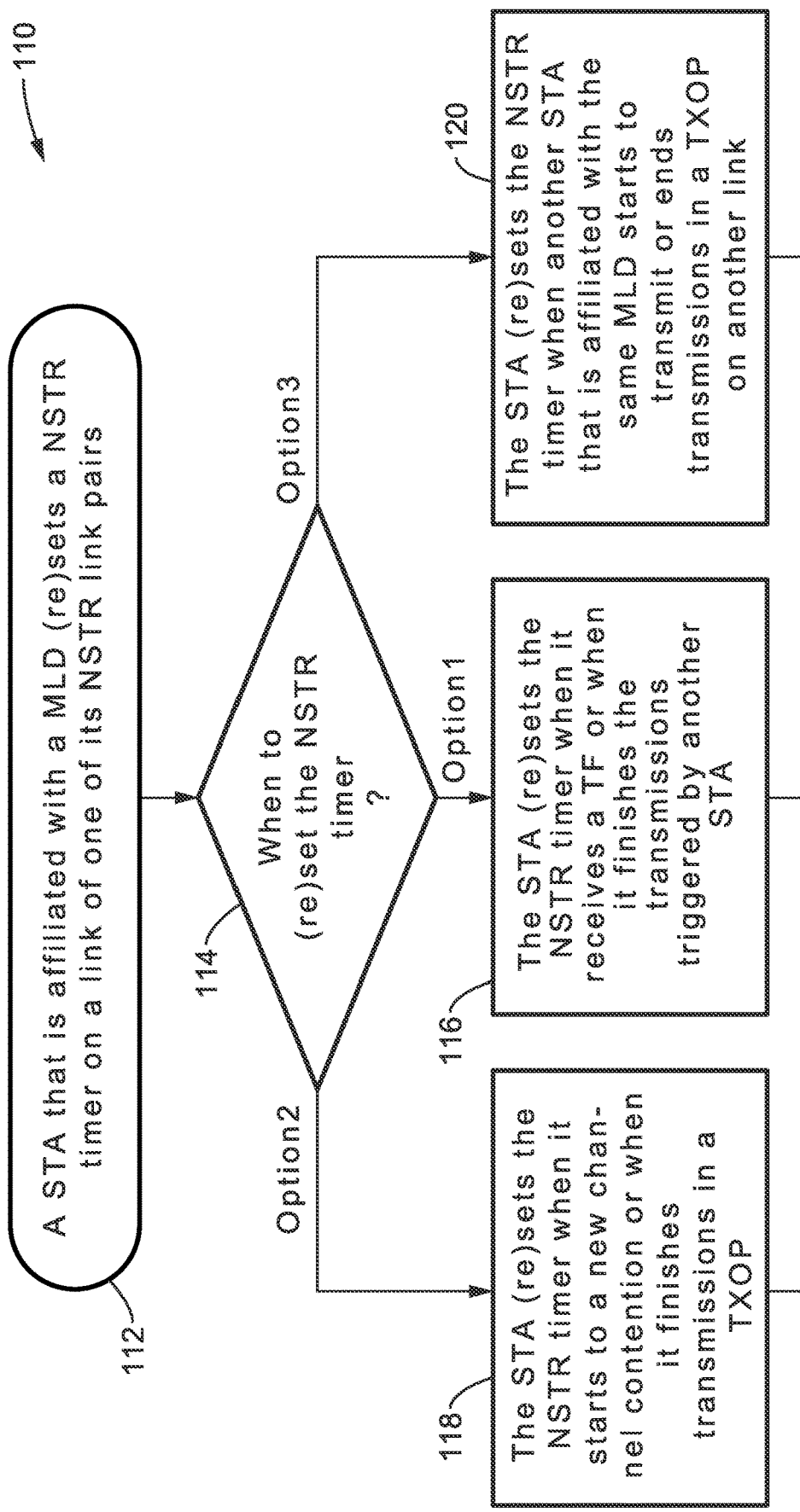
FIG. 10 is a flow diagram of for a STA affiliated with a MLD resetting its NSTR timer according to at least one embodiment of the present disclosure.

FIG. 10 illustrates an example embodiment 110 for a STA affiliated with a MLD setting or resetting 112 its NSTR timer. At block 114 a decision is made to determine between three options for the STA resetting its NSTR timer. The STA can use at least one option listed in the flowchart to reset its NSTR timer. It should also be appreciated that these options can be expanded to include other options and combinations without departing from the teachings of the present disclosure.

If Option 1 is selected, then at block 116 the STA resets the NSTR timer when it receives a TF or when it finishes the transmissions triggered by another STA.

Figure 30:
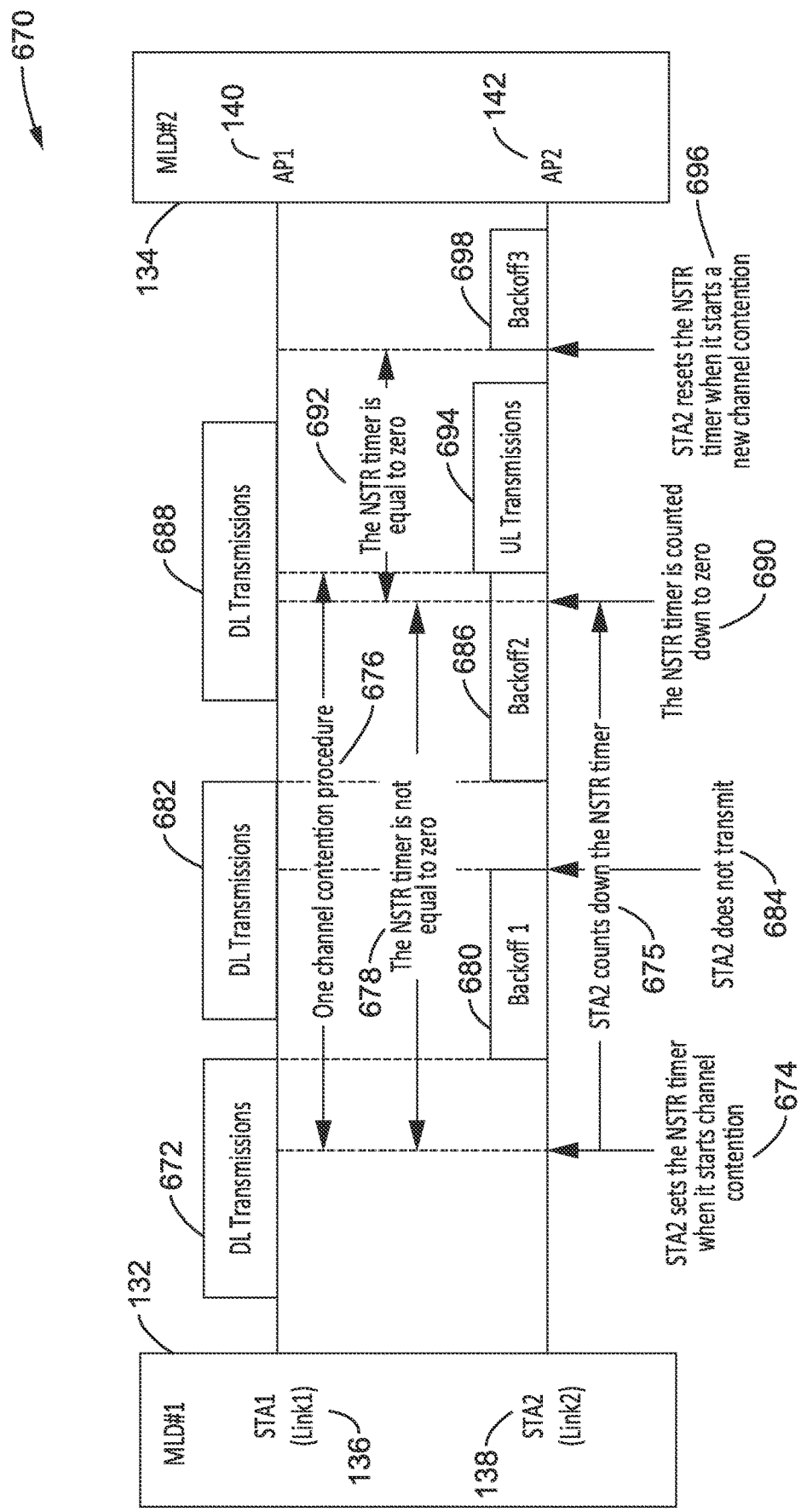
FIG. 30 is a communications sequence diagram showing an example of running multiple backoffs during a channel contention procedure according to at least one embodiment of the present disclosure.

If Option 2 is selected then at block 118 the STA resets the NSTR timer when it starts a new channel contention procedure or when it finishes the transmissions in a TXOP. It should be noted that the channel contention procedure could represent the time since the STA starts to contend for the channel until it obtains a TXOP. The STA may have multiple backoff procedures during a channel contention as shown in FIG. 30.

In Option 3 seen in block 120 the STA resets the NSTR timer, upon or after, one of the STAs that is affiliated with the same MLD transmits on another link.

It should be noted that one STA that is affiliated with the same MLD transmits on another link may comprise any STA affiliated with the same MLD. It should also be noted that it is possible that one STA that is affiliated with the same MLD transmits on another link only represents a STA affiliated with the same MLD operating on a link of one of the NSTR link pairs of the MLD. And it will also be noted that it is possible that one STA that is affiliated with the same MLD transmits on another link only represents a STA affiliated with the same MLD operating on the other link of the NSTR link pairs.

It is possible that the STA resets the NSTR timer before the NSTR timer counts down to zero. It is also possible that the STA uses the options as indicated in the flowchart to reset the NSTR timer only when the NSTR timer is equal to zero.

4.4. Example Scenarios

Following a number of example embodiments which illustrate the operation of the flowcharts seen in FIG. 8 through FIG. 10 in regard to NSTR MLD link access operations.

Figure 11:
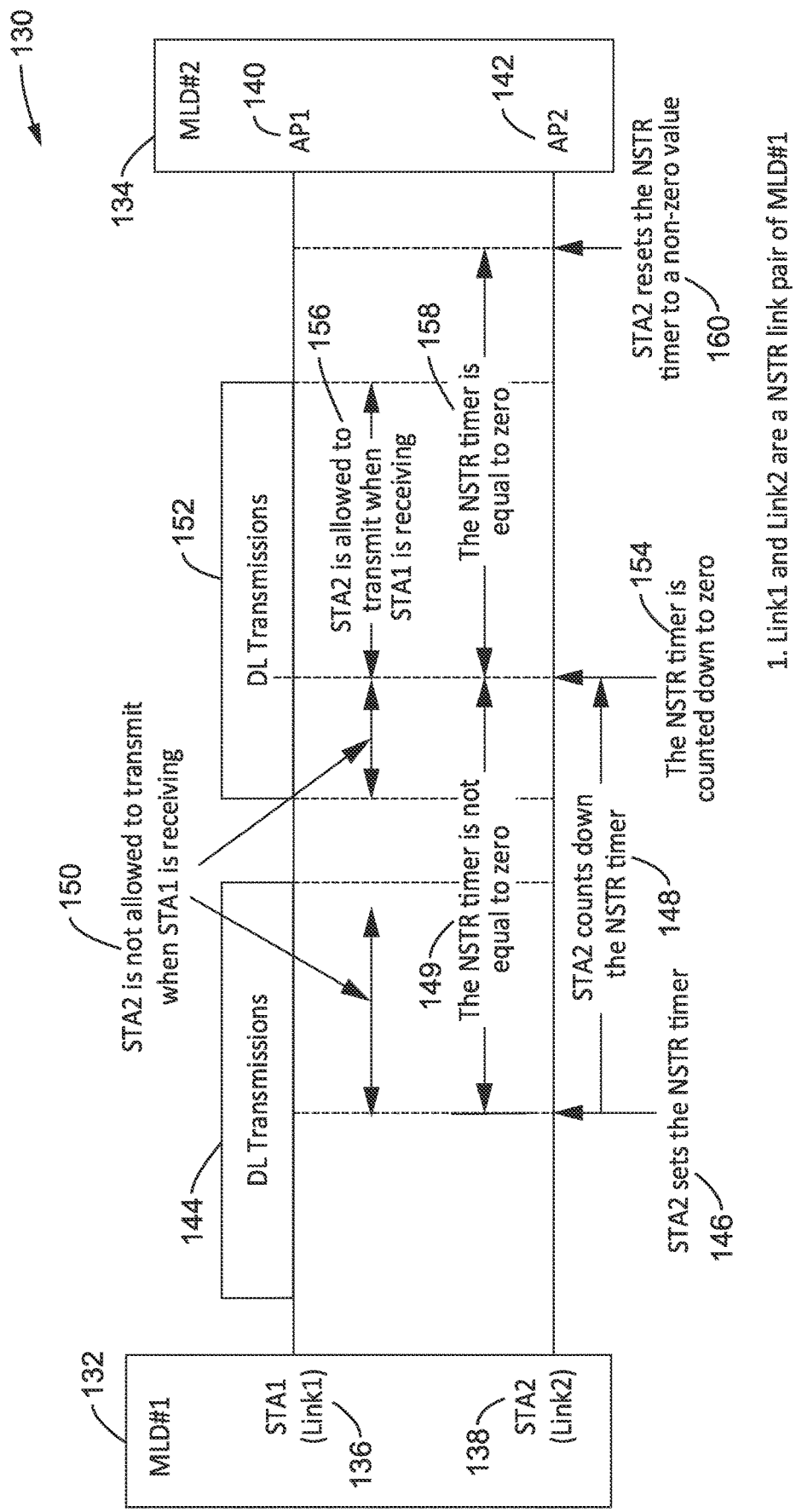
FIG. 11 is a communications sequence diagram showing an example of the impact of a NSTR timer on a STA affiliated with a MLD transmitting on a link of a NSTR link pair when another STA affiliated with the same MLD is receiving on a link of a NSTR link pair shown according to at least one embodiment of the present disclosure.

FIG. 11 illustrates an example embodiment 130 of how a STA affiliated with a MLD uses its NSTR timer to decide to transmit on a link of a NSTR link pair when another STA affiliated with the same MLD receiving on a link of a NSTR link pair. The network topology in the example is shown in FIG. 7 with MLD #1 132 which is a NSTR MLD having STA1 136 with Link1 and STA2 138 with Link2. MLD #2 134 is shown with AP1 140 and AP2 142.

A downlink (DL) transmission 144 is being received on STA1. STA2 sets a NSTR timer 146 and counts down the timer on link2. Before 149 the NSTR timer is counted down to zero, the NSTR timer is not equal to zero. Thus, STA2 is not allowed 150 to transmit to AP2 when STA1 is receiving from AP1. STA1 receives another DL transmission 152. After the NSTR timer is counted down to zero 154, then the NSTR timer is equal to zero 158 until it is reset to a non-zero (non-terminal) value. STA2 is now allowed 156 to transmit when STA1 is receiving. After this the NSTR timer is reset to a non-zero value 160.

Figure 12:
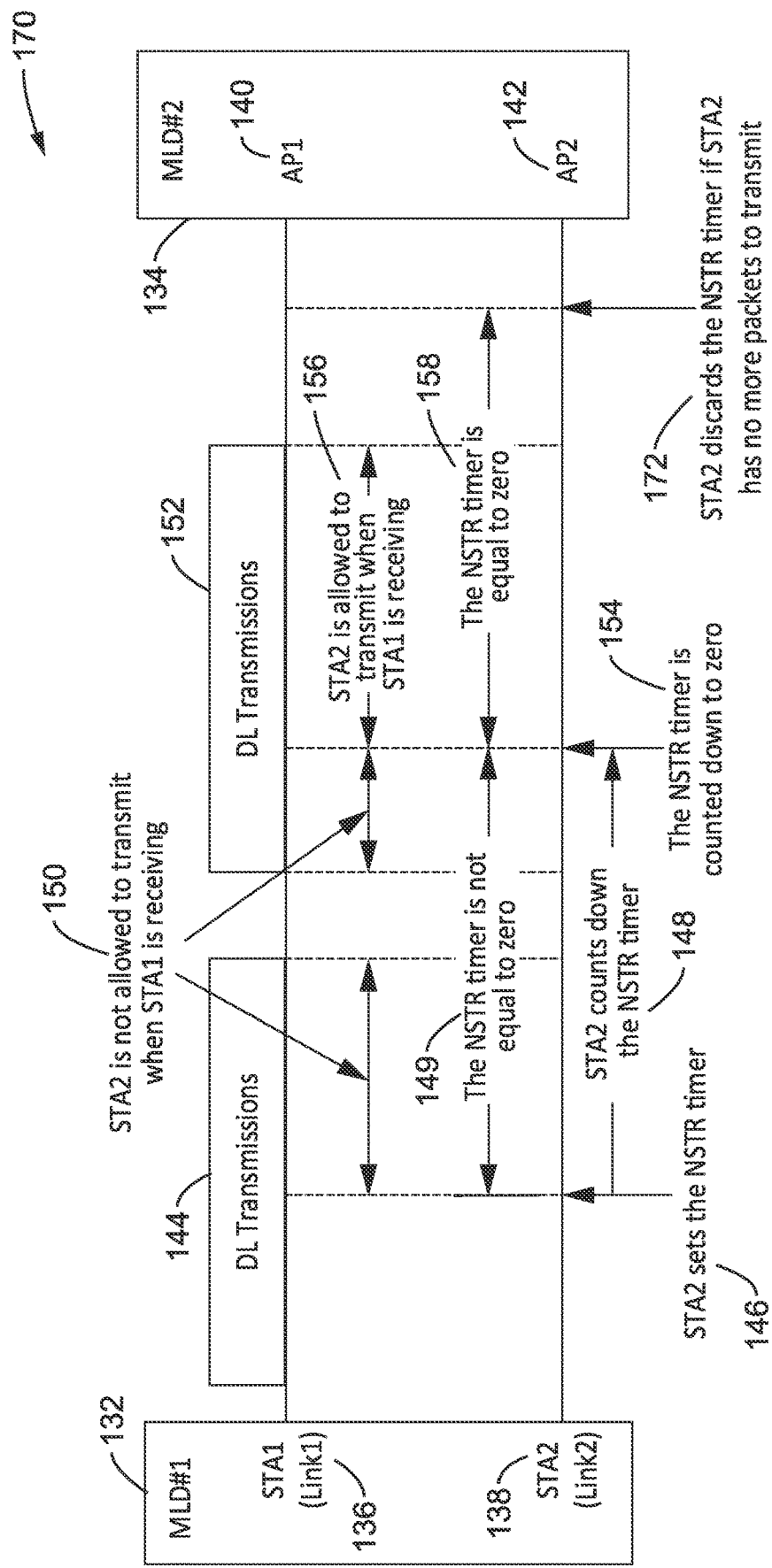
FIG. 12 is a communications sequence diagram showing an example of discarding the NSTR timer if there are no more transmissions to be made, as performed according to at least one embodiment of the present disclosure.

FIG. 12 illustrates an example embodiment 170 showing how a STA affiliated with a MLD uses its NSTR timer to decide to transmit on a link of a NSTR link pair when another STA affiliated with the same MLD receiving on a link of a NSTR link pair. Compared with the example shown in FIG. 11, it shows that it is possible to discard the NSTR timer if STA2 has no more packets to transmit.

As in the previous example the network topology in the example is shown in FIG. 7 with MLD #1 132 which is a NSTR MLD having STA1 136 with Link1 and STA2 138 with Link2. MLD #2 134 is shown with AP1 140 and AP2 142.

STA2 can set a NSTR timer and counts down 148 the timer on link2. Before the NSTR timer is counted down to zero, the NSTR timer is not equal to zero. STA2 is not allowed to transmit to AP2 when STA1 is receiving from AP1. After the NSTR timer is counted down to zero, the NSTR timer is equal to zero 158 until it is discarded. STA is allowed to transmit when STA1 is receiving.

The difference from FIG. 11, is that here when STA2 does not have packets to transmit, it can discard the NSTR timer 172. The NSTR timer can be set again (reset) when it starts to contend again for the channel.

Figure 13:
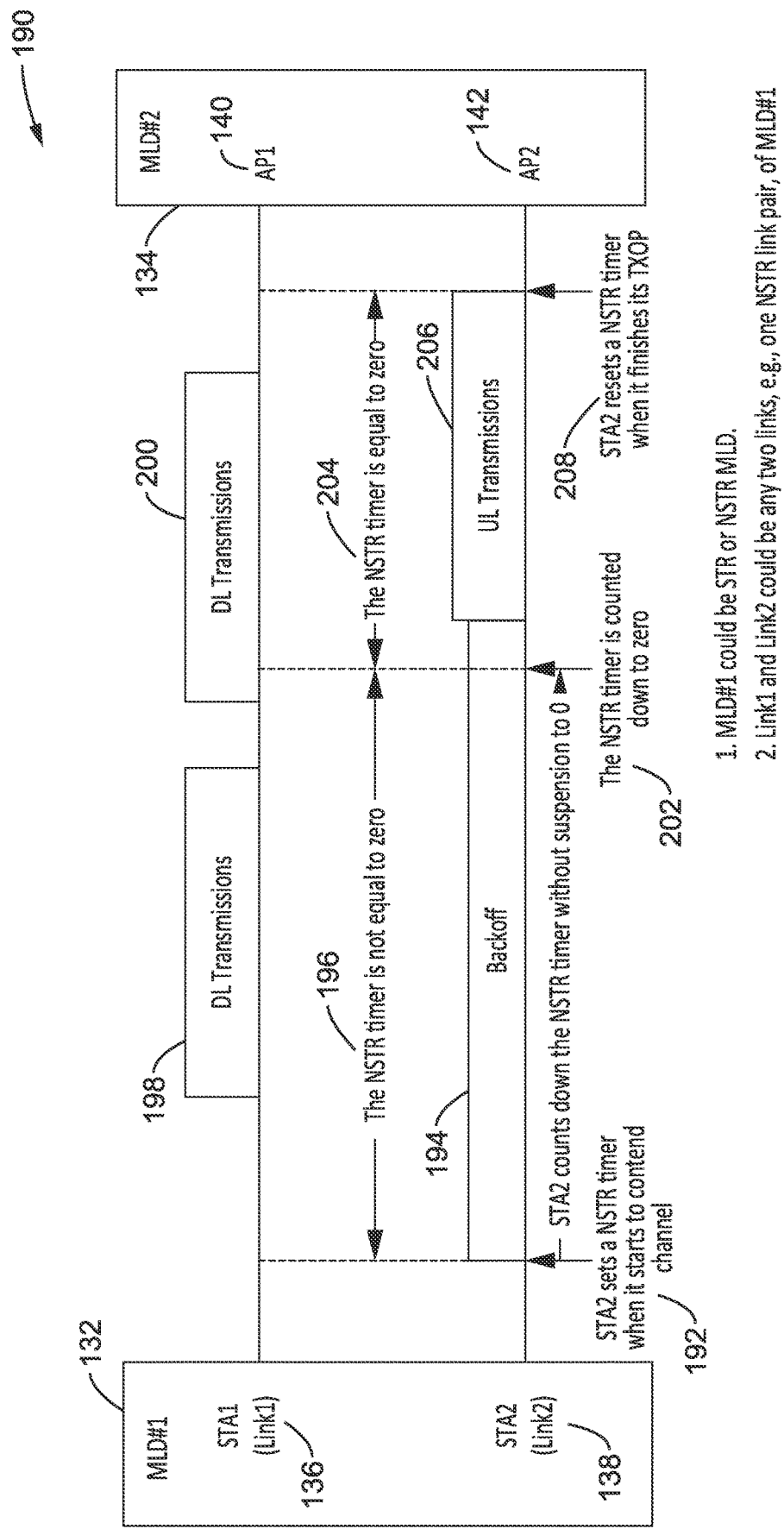
FIG. 13 is a communications sequence diagram showing an example of a STA setting and counting down the NSTR timer without suspension according to at least one embodiment of the present disclosure.

FIG. 13 illustrates an example embodiment 190 showing an example of a STA affiliated with a MLD setting and counting down the NSTR timer without suspension.

The network topology in the example is shown in FIG. 7 with MLD #1 132 which is a NSTR MLD having STA1 136 with Link1 and STA2 138 with Link2. MLD #2 134 is shown with AP1 140 and AP2 142.

STA2 has packets to transmit and sets a NSTR timer 192 when it starts channel contention on Link2 with backoff 196, which is explained for block 92 of FIG. 9A and block 116 of FIG. 10. In this example, STA2 starts to count down the NSTR timer immediately 196 after the timer is set as explained for block 98 of FIG. 9A. STA2 counts down the NSTR timer without suspension to 0 as explained for block 102 of FIG. 9B.

Before STA2 counts down the NSTR timer to zero, STA2 is not allowed to transmit at the same time STA1 is receiving; because the NSTR timer is not equal to zero (has not reached the terminal count), which is explained for block 88 of FIG. 8. STA1 is seen here receiving a DL transmission 198 from AP1. Before the NSTR timer is counted down to zero STA1 starts receiving another transmission 200.

After STA2 counts down the NSTR timer to zero 202, then STA2 is allowed to transmit at the same time STA1 is receiving (i.e., DL transmission 200 shown in the figure) from AP1, which is explained for block 86 of FIG. 8. It will be noted that after NSTR timer reaches zero it remains equal to zero 204 until set/reset.

As shown in the figure, when STA2 finishes backoff at the time STA1 is receiving DL transmissions 200 from AP1, it obtains the TXOP and transmits UL transmissions 206 to AP2. After STA2 finishes the UL transmissions to AP2, it can reset the NSTR timer to a non-zero value 208 as explained for block 118 of FIG. 10. It should be noted that Link1 and Link2 can be NSTR link pairs of MLD #1.

Figure 14:
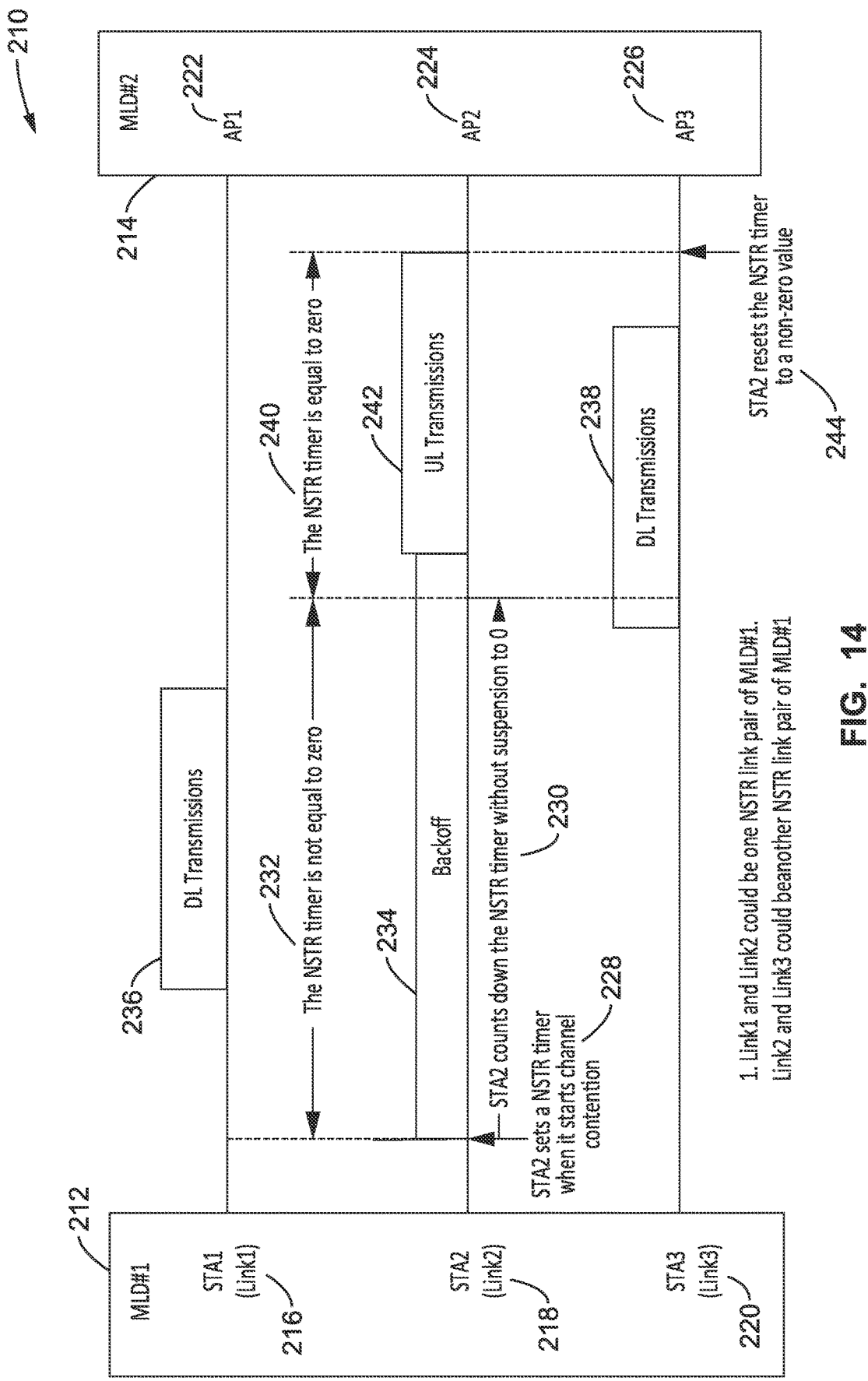
FIG. 14 is a communications sequence diagram showing an example of a STA setting and counting down the NSTR timer to transmit on a link that is a link belonging to multiple link pairs of the MLD as performed according to at least one embodiment of the present disclosure.

FIG. 14 illustrates an example embodiment 210 of a scenario of a STA affiliated with a MLD setting and counting down an NSTR timer without suspension to zero.

The network topology in the example is shown in FIG. 7 with MLD #1 212 which is a NSTR MLD having STA1 216 with Link1, STA2 218 with Link2, and STA3 220 with Link3. Link1 and Link2 comprise a NSTR link pair of MLD #1, while Link2 and Link3 consist of another NSTR link pair of MLD #1. MLD #2 214 is shown with AP1 222, AP2 224 and AP3 226.

STA2 has packets to transmit and sets a NSTR timer 228 when it starts a backoff 234 in contending for the channel on Link2, which is explained for block 92 of FIG. 9A and block 116 of FIG. 10. In this example, STA2 starts to count down the NSTR timer immediately 230 at the time that the timer is set as explained for block 98 of FIG. 9A. STA2 counts down the NSTR timer without suspension to 0 as explained for block 102 of FIG. 9B.

Before STA2 counts down the NSTR timer to zero, the NSTR timer is not equal to zero 232. STA2 is not allowed to transmit at the same time STA1 or STA3 is receiving from AP1 or AP3, respectively. This is explained for block 88 of FIG. 8. Receiving on the other stations is exemplified here initially by STA1 receiving DL transmission 236, then at the time just preceding the NSTR timer being counted down to zero by STA2, then STA3 is shown receiving a DL transmission 238.

After STA2 counts down the NSTR timer to zero 240, the NSTR timer remains equal to zero until it is reset to a non-zero value. STA2 is allowed to transmit at the same time STA1 or STA3 is receiving (i.e., DL transmissions shown in the figure) from AP1, which is explained in 86 of FIG. 8. As shown in the figure, when STA2 finishes its backoff at the time STA3 is receiving DL transmissions from AP1, it obtains the TXOP and transmits UL transmissions 242 to AP2.

After STA2 finishes the UL transmissions 242 to AP2, it can decide to reset the NSTR timer to a non-zero value 244 as explained for block 118 of FIG. 10.

Figure 15:
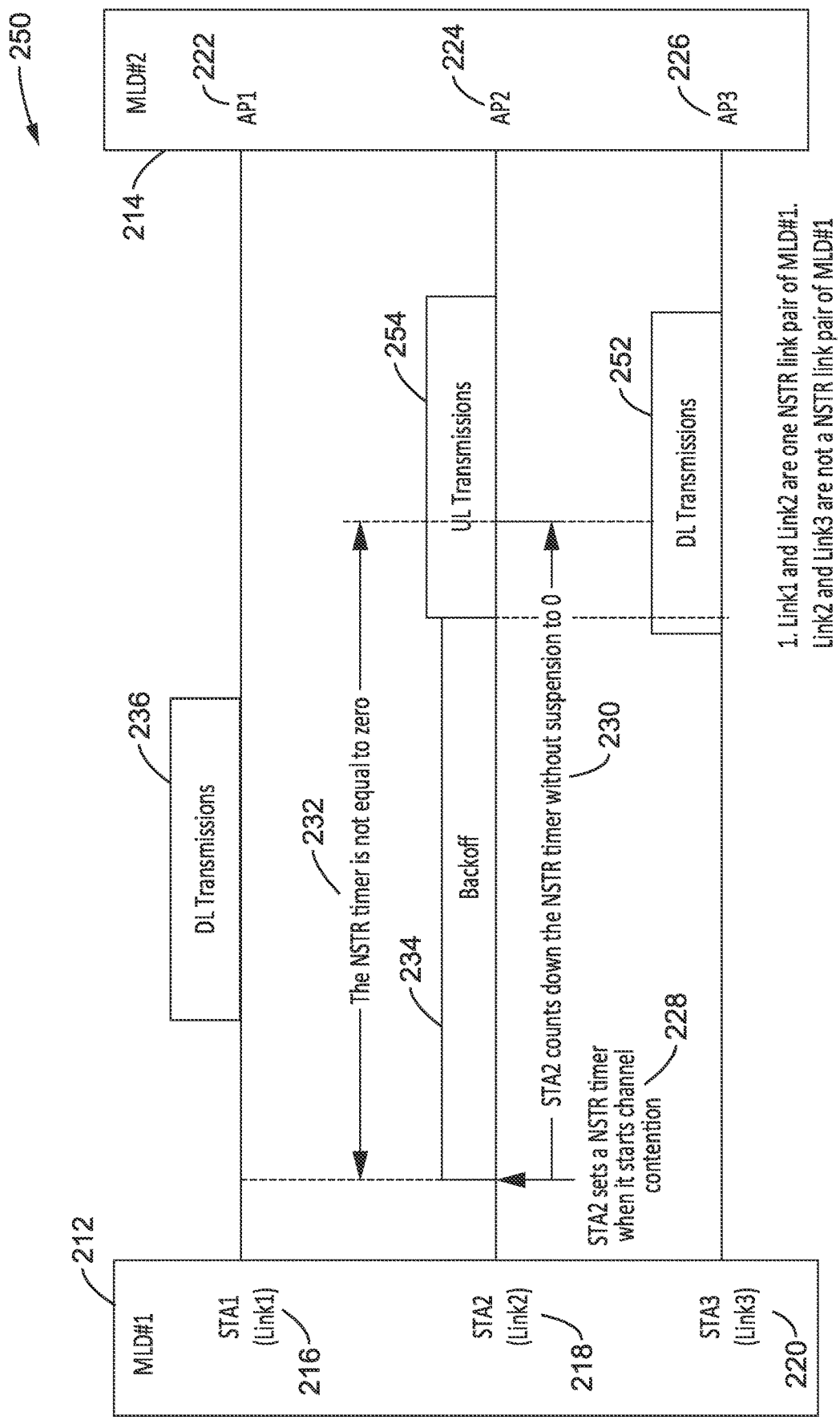
FIG. 15 is a communications sequence diagram showing an example of the NSTR timer of a STA affiliated with a MLD not affecting the transmitting on a link of one of the link pairs of the MLD at the same time another STA affiliated with the same MLD is receiving on a link that is not the other link of the link pair according to at least one embodiment of the present disclosure.

FIG. 15 illustrates an example embodiment 250 another of a STA affiliated with a MLD setting and counting down the NSTR timer without suspension.

The network topology in the example is shown in FIG. 7 with MLD #1 212 which is a NSTR MLD having STA1 216 with Link1, STA2 218 with Link2, and STA3 220 with Link3. Link1 and Link2 comprise a NSTR link pair of MLD #1, while Link2 and Link3 are not a NSTR link pair of MLD #1. MLD #2 214 is shown with AP1 222, AP2 224 and AP3 226.

This example shows that a STA affiliated with a MLD can transmit on a link of one of its NSTR link pair at the same time another STA affiliated with the same MLD is receiving on another link which is not the other link of the same NSTR link pair at any time.

STA2 has packets to transmit and sets a NSTR timer 228 when it starts channel contention on Link2 with backoff 234, which is explained for block 92 of FIG. 9A and block 116 of FIG. 10. In this example, STA2 starts to count down the NSTR timer immediately 230 at the time that the timer is set for is as explained for block 98 of FIG. 9A. STA2 counts down the NSTR timer without suspension to its terminal count (zero) as explained for block 102 of FIG. 9B.

Before STA2 counts down the NSTR timer to zero, the NSTR timer is not equal 232 to zero, and thus STA2 is not allowed to transmit at the same time STA1 is receiving, exemplified by DL transmission 236 on Link1, from AP1, which is explained for block 88 of FIG. 8.

Since Link2 and Link3 are not a NSTR link pair of MLD #1, it is possible that before STA2 counts down the NSTR timer to zero, STA2 is allowed to transmit to AP2 at the same time STA3 is receiving (i.e., DL transmissions 252 shown in the figure) from AP3. As shown in the figure, when STA2 finishes its backoff at the time STA3 is receiving DL transmissions 252 from AP1, STA2 obtains the TXOP and transmits UL transmissions 254 to AP2 even though the NSTR timer has not counted down to zero.

Figure 16:
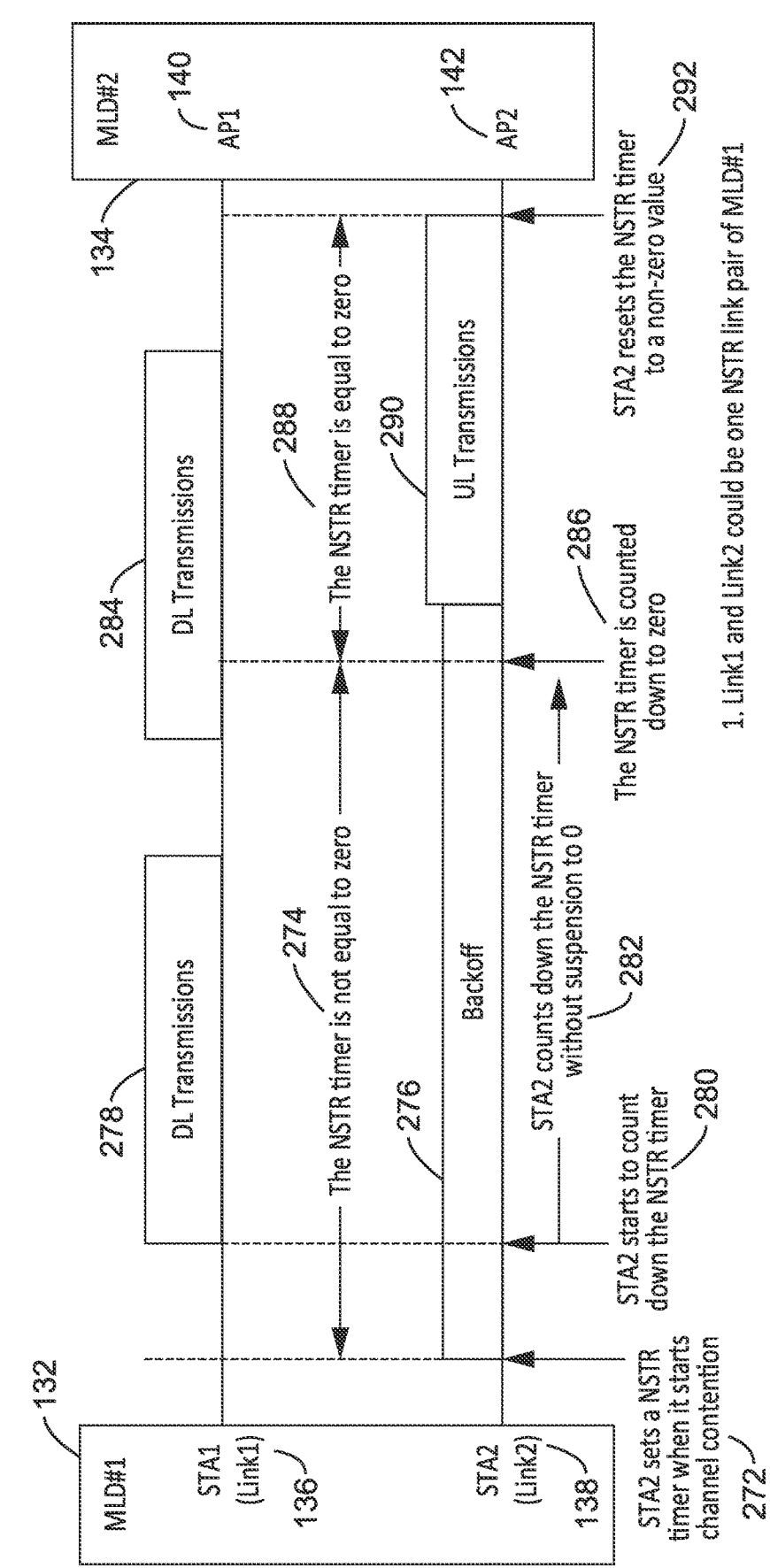
FIG. 16 is a communications sequence diagram showing an example of a STA starting to count down its NSTR timer after the timer is set as performed according to at least one embodiment of the present disclosure.

FIG. 16 illustrates an example embodiment 270 of a STA affiliated with a MLD performing setting and counting down an NSTR timer without suspension. Compared with the example shown in FIG. 13, this example shows that the STA can start to count down the NSTR timer from the first indication that its ability to transmit is not allowed because another STA that is affiliated with the same MLD is receiving a frame on the other link.

The network topology in the example is shown in FIG. 7 with MLD #1 132 which is a NSTR MLD having STA1 136 with Link1 and STA2 138 with Link2. Link1 and Link2 being a NSTR link pair of MLD #1. MLD #2 134 is shown with AP1 140 and AP2 142.

STA2 has packets to transmit and sets a NSTR timer 272 when it starts a backoff 276 to contend for the channel on Link2, which is explained for block 92 of FIG. 9A and FIG. 9B. In this example, STA2 starts to count down 282 the NSTR timer from the first time its senses that STA1 is receiving on Link1 after the timer is set. This is explained for block 96 of FIG. 9A. In the figure STA1 is seen receiving DL transmission 278, in response to which STA2 starts counting down the NSTR timer 280 and continues counting 282 without suspension until the NSTR timer reaches zero as explained for block 102 of FIG. 9B.

Before STA2 counts down the NSTR timer to zero, the NSTR timer is not equal to zero 274; and thus STA2 is not allowed to transmit at the same time STA1 is receiving (i.e., DL transmission 278) from AP1, which is explained for block 88 of FIG. 8.

STA1 is seen receiving another DL transmission 284, during which time STA2 counts down the NSTR timer to zero 286, whereby STA2 is now allowed to transmit at the same time STA1 is receiving DL transmission 284 from AP1, which is explained for block 86 of FIG. 8. As shown in the figure, when STA2 finishes its backoff at the time STA1 is receiving DL transmissions from AP1, it obtains the TXOP and transmits UL transmissions 290 to AP2. It will be noted that upon the NSTR timer being counted down to zero it remains equal to zero 288, until it is set/reset.

After STA2 finishes the UL transmissions to AP2, it can reset the NSTR timer to a non-zero value 292 as explained for block 118 of FIG. 10.

Figure 17:
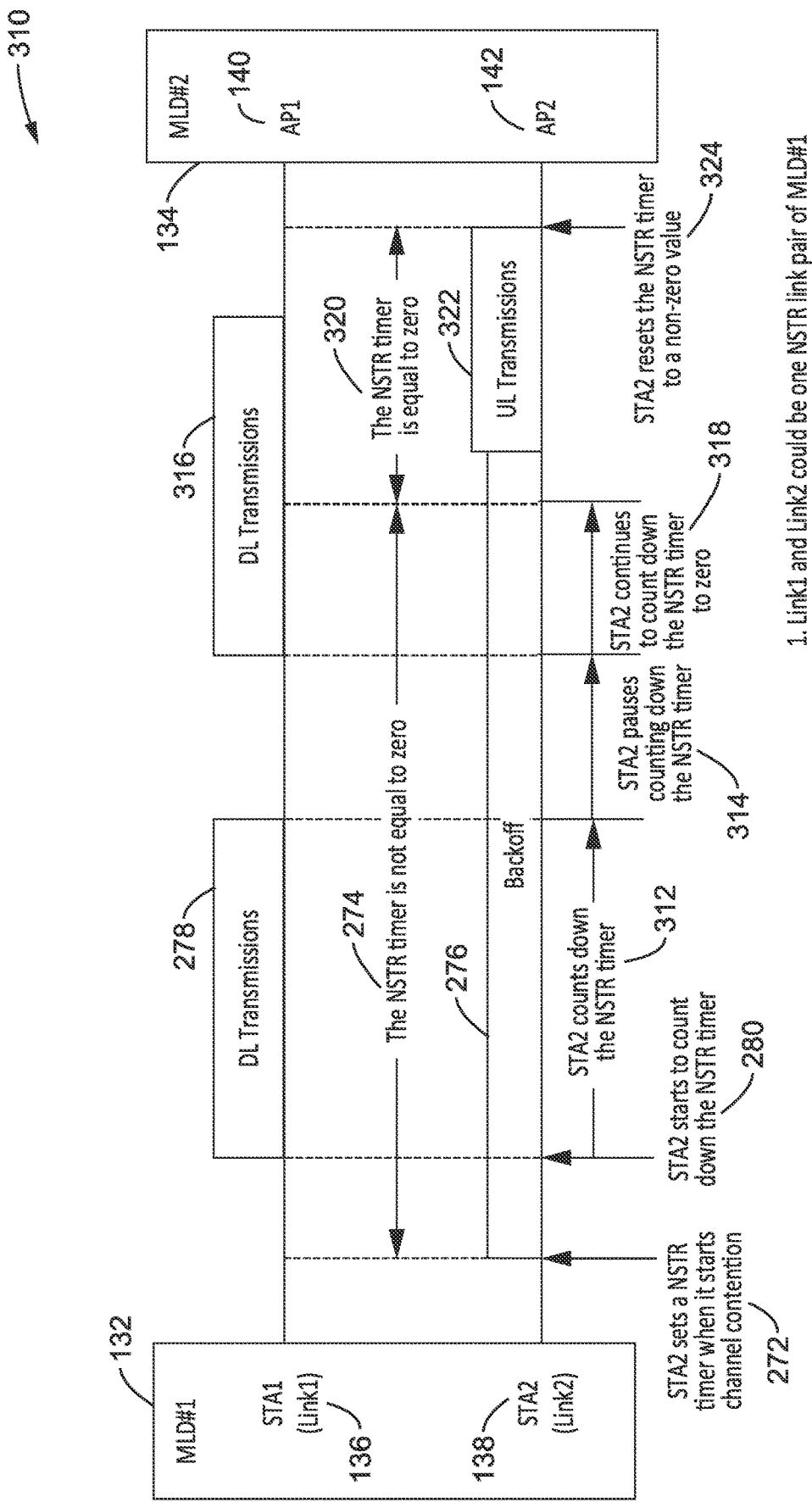
FIG. 17 is a communications sequence diagram showing an example of a STA counting down its NSTR timer with suspension according to at least one embodiment of the present disclosure.

FIG. 17 illustrates an example embodiment 310 of a STA affiliated with a MLD setting and counting down NSTR timer with suspension. Compared with the example shown in FIG. 13, this example shows that the STA can only count down the NSTR timer during the time when it senses that another STA that is affiliated with the same MLD is receiving a frame on the other link of the NSTR link pair.

The network topology in the example is shown in FIG. 7 with MLD #1 132 which is a NSTR MLD having STA1 136 with Link1 and STA2 138 with Link2. Link1 and Link2 being a NSTR link pair of MLD #1. MLD #2 134 is shown with AP1 140 and AP2 142.

As in FIG. 16, STA2 has packets to transmit and sets a NSTR timer 272 when it starts channel contention on Link2, which is explained for block 92 of FIG. 9A and FIG. 9B. In this example, STA2 starts to count down 280 the NSTR timer from the first time it senses that STA1 is receiving 278 on Link1 after the timer is set. This is explained for block 96 of FIG. 9A and FIG. 9B. STA2 counts down the NSTR timer 312 with suspension as explained for block 104 of FIG. 9A and FIG. 9B. The NSTR timer counts down only when STA1 is receiving DL transmissions on link1, with the count-down of the NSTR timer being paused 314 when STA1 is not receiving DL transmissions from AP1 on Link1.

Before STA2 counts down the NSTR timer to zero, the NSTR timer is not equal to zero 274; thus STA2 is not allowed to transmit at the same time STA1 is receiving (i.e., DL transmission 278 shown in the figure) from AP1, which is explained for block 88 of FIG. 8.

STA1 is seen receiving another DL transmission 316, whereby STA2 now continues to count down the NSTR timer to zero 318. When STA2 completes counting down the NSTR timer to zero 320 then the NSTR timer remains equal to zero until it is reset to a non-zero value. STA2 is allowed to transmit at the same time STA1 is receiving DL transmissions 316 from AP1, which is explained for block 86 of FIG. 8. As shown in the figure, when STA2 finishes its backoff at the time STA1 is receiving DL transmissions from AP1, STA2 obtains the TXOP and transmits UL transmissions 322 to AP2.

After STA2 finishes the UL transmissions 322 to AP2, it can reset the NSTR timer to a non-zero value 324 as explained for block 118 of FIG. 10.

Figure 18:
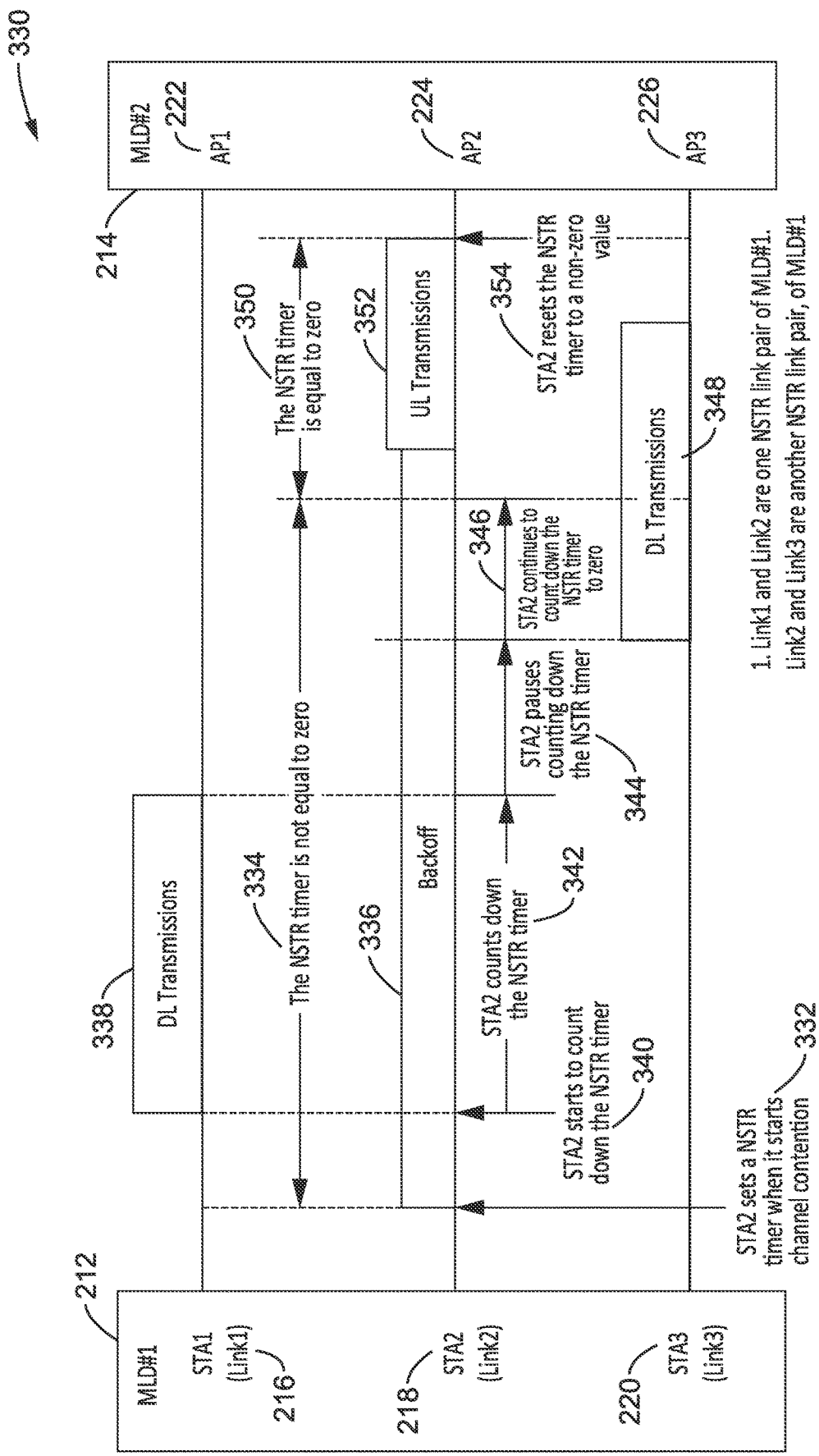
FIG. 18 is a communications sequence diagram showing an example of a STA counting down the NSTR timer with suspension to transmit on a link that is a link belonging to multiple link pairs of the MLD according to at least one embodiment of the present disclosure.

FIG. 18 illustrates an example embodiment 330 of a STA affiliated with a MLD setting and counting down an NSTR timer with suspension. This figure is similar to the scenario in FIG. 17; however, in this example there is another link pair involved.

The network topology in the example is shown in FIG. 7 with MLD #1 212 which is a NSTR MLD having STA1 216 with Link1, STA2 218 with Link2, and STA3 220 with Link3. Link1 and Link2 comprise a NSTR link pair of MLD #1, and Link2 and Link3 are also a NSTR link pair of MLD #1. MLD #2 214 is shown with AP1 222, AP2 224 and AP3 226.

STA2 has packets to transmit and sets a NSTR timer 332 when it starts channel contention 336 on Link2, which is explained for block 92 of FIG. 9A. In this example, STA2 starts to count down 342 the NSTR timer from the first time it senses that STA1 or STA3 is receiving on Link1 or Link3 after the timer is set. This is explained for block 96 of FIG. 9A. So in the figure STA2 starts counting down the NSTR timer 342 upon detection that STA1 is beginning to receive DL transmissions 338. STA2 counts down the NSTR timer with suspension as explained for block 104 of FIG. 9B. The NSTR timer counts down only when STA1 or STA3 is receiving DL transmission on link1; wherein the countdown of the NSTR timer is paused 344 when STA1 or STA3 is not receiving DL transmissions from AP1 on Link1.

Before STA2 counts down the NSTR timer to zero, the NSTR timer is not equal to zero 334. STA2 is not allowed to transmit at the same time STA1 or STA3 is receiving transmissions from AP1 or AP3, respectively. This is explained for block 88 of FIG. 8.

STA3 is seen receiving DL transmission 348, wherein counting down of the NSTR timer resumes 346. After STA2 counts down the NSTR timer to zero, then the NSTR timer is equal to zero 350 until it is reset to a non-zero value. Accordingly, STA2 is then allowed to transmit at the same time STA1 or STA3 is receiving (i.e., DL transmissions 348 shown in the figure) from AP1, which is explained for block 86 of FIG. 8. As shown in the figure, when STA2 finishes backoff 336 at the time STA3 is receiving DL transmissions from AP1, it obtains the TXOP and transmits UL transmissions 352 to AP2.

After STA2 finishes the UL transmissions to AP2, it can reset the NSTR timer to a non-zero value 354 as explained for block 118 of FIG. 10.

Figure 19:
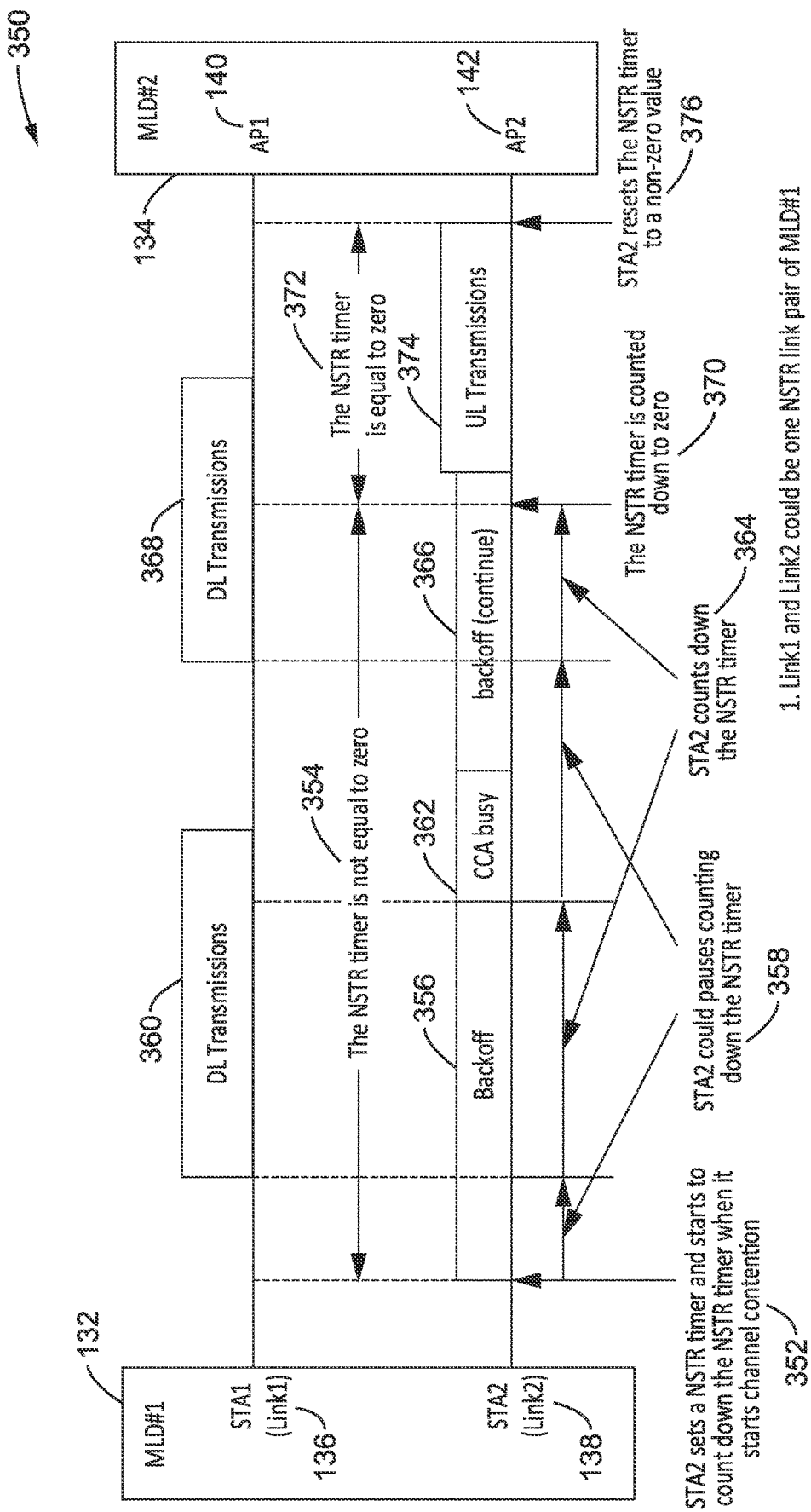
FIG. 19 is a communications sequence diagram showing an example of a STA starting to count down its NSTR timer with a suspension occurring immediately when the timer is set, according to at least one embodiment of the present disclosure.

FIG. 19 illustrates an example embodiment 350 of a STA affiliated with a MLD setting and counting down the NSTR timer with suspension. Compared with the example shown in FIG. 17, this example shows that the STA can start to count down the NSTR timer during the time when another STA that is affiliated with the same MLD is receiving a frame on the other link of the NSTR link pair.

The network topology in the example is shown in FIG. 7 with MLD #1 132 which is a NSTR MLD having STA1 136 with Link1 and STA2 138 with Link2. Link1 and Link2 being a NSTR link pair of MLD #1. MLD #2 134 is shown with AP1 140 and AP2 142.

STA2 has packets to transmit and sets a NSTR timer 352 when it starts channel contention (i.e., backoff 356 shown in the figure) on Link2, which is explained for block 92 of FIG. 9A. In this example, STA2 starts to count down the NSTR timer immediately 352 when the timer is set. This is explained for block 98 of FIG. 9A. STA2 counts down the NSTR timer with suspension as explained for block 104 of FIG. 9B. Thus, the count-down of the NSTR timer is continued or paused with respect to detecting certain conditions on the STAs. In this example scenario, the NSTR timer counts down only when STA2 senses that the channel on Link2 is idle 364 at the same time STA1 is receiving DL transmissions 360, 368 on link1, and is seen otherwise pausing the count down 358. For example, when the channel is idle on Link1 358 or STA2 senses CCA busy 362 on Link2, then STA2 pauses counting down the NSTR timer.

Before STA2 counts down the NSTR timer to zero, the NSTR timer is not equal to zero. STA2 is not allowed to transmit at the same time STA1 is receiving (i.e., DL transmissions shown in the figure) from AP1, which is explained for block 88 of FIG. 8.

After STA2 counts down the NSTR timer to zero 370, the NSTR timer is equal to zero 372; then STA2 is allowed to transmit at the same time STA1 is receiving (i.e., DL transmissions 368 shown in the figure) from AP1, which is explained for block 86 of FIG. 8. As shown in the figure, when STA2 finishes backoff 356 at the time STA1 is receiving DL transmissions 368 from AP1, STA2 obtains the TXOP and transmits UL transmissions 374 to AP2.

After STA2 finishes the UL transmissions 374 to AP2, it can reset the NSTR timer to a non-zero value 376 as explained for block 118 of FIG. 10.

Figure 20:
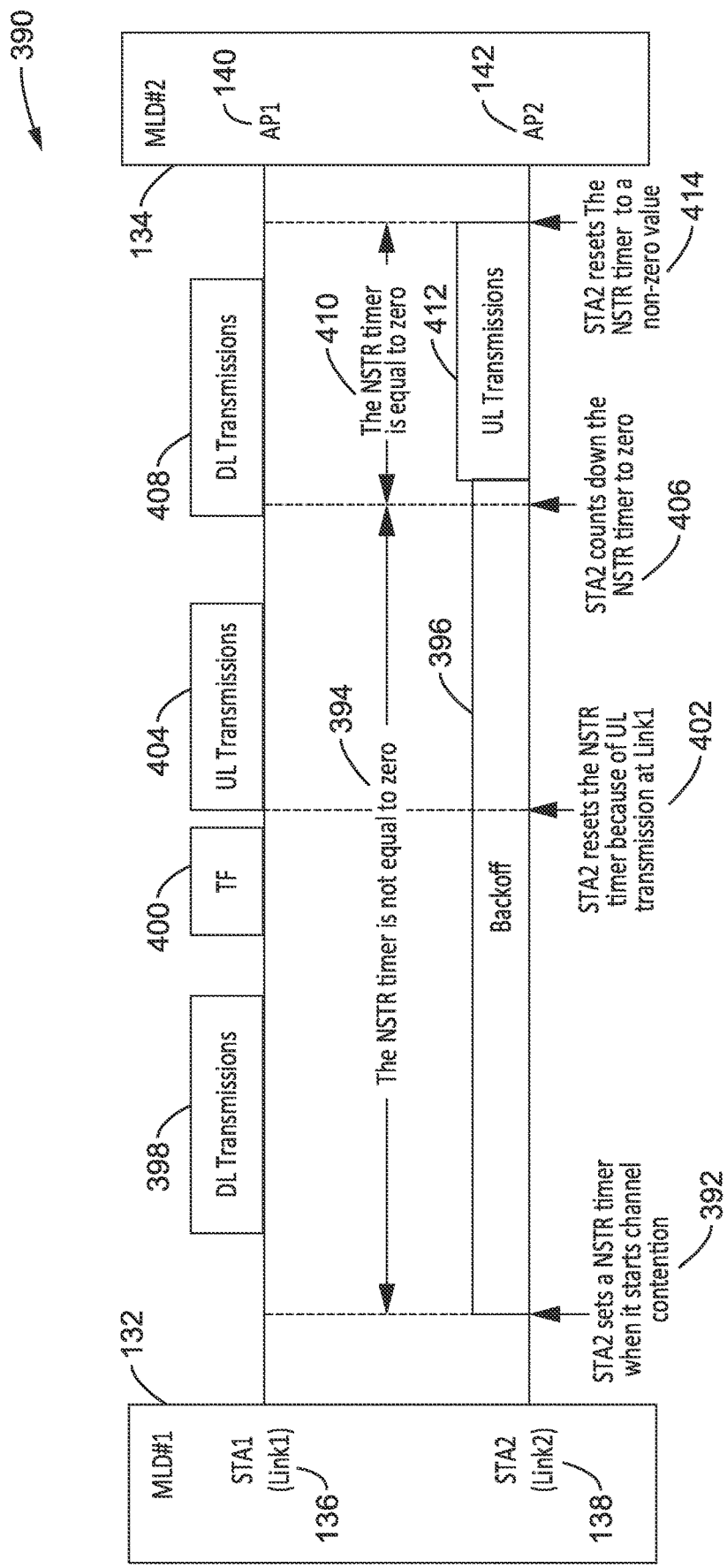
FIG. 20 is a communications sequence diagram showing an example of a STA affiliated with a MLD resetting its NSTR timer when another STA affiliated with the same MLD starts a trigger-based UL transmission according to at least one embodiment of the present disclosure.

FIG. 20 illustrates an example embodiment 390 of a STA affiliated with a MLD resetting its NSTR timer when another STA affiliated with the same MLD starts a trigger-based UL transmission.

The network topology in the example is shown in FIG. 7 with MLD #1 132 which is a NSTR MLD having STA1 136 with Link1 and STA2 138 with Link2. Link1 and Link2 being a NSTR link pair of MLD #1. MLD #2 134 is shown with AP1 140 and AP2 142.

STA2 sets a NSTR timer 392 when it starts contending for the channel with backoff 396 on Link2, which is explained for block 92 of FIG. 9A. STA2 can count down the NSTR timer as explained in FIG. 9A and FIG. 9B.

STA1 is seen receiving a DL transmission 398, and before STA2 transmits the UL transmission, STA1 receives a TF 400 from AP1 for UL transmissions 404 on Link1. When STA1 starts to transmit the UL transmissions 404 triggered by AP1 on Link1, STA2 resets the NSTR timer 402 as explained for block 120 of FIG. 10. After STA2 counts down the NSTR timer to zero 406, the NSTR timer is equal to zero 410 until it is reset.

Just prior to the NSTR timer being counted down to zero, the example shows STA1 receiving more DL transmissions 408. When STA2 gains channel access in response to the NSTR timer reaching its terminal zero count, STA2 is allowed to transmit 412, depicting a UL transmission, when STA1 is receiving from AP1. Again it is seen that STA2 can reset the NSTR timer 414 to a non-zero value. It should be noted here, as well as all the other embodiments, that the zero count is given by way of example and not limitation as a terminal value for the count, whereas one of ordinary skill in the art will appreciate that other terminal values could be used instead of zero without limitation.

It should be realized that it is possible that STA2 resets the NSTR timer when another STA affiliated with the same MLD starts a trigger-based transmission on a link, for example by a Link3 when Link2 and Link3 are not a NSTR link pair of MLD #1.

It is also possible that the UL transmissions on Link1 is not triggered by AP1 but launched because STA1 obtains the TXOP on Link1.

Figure 21:
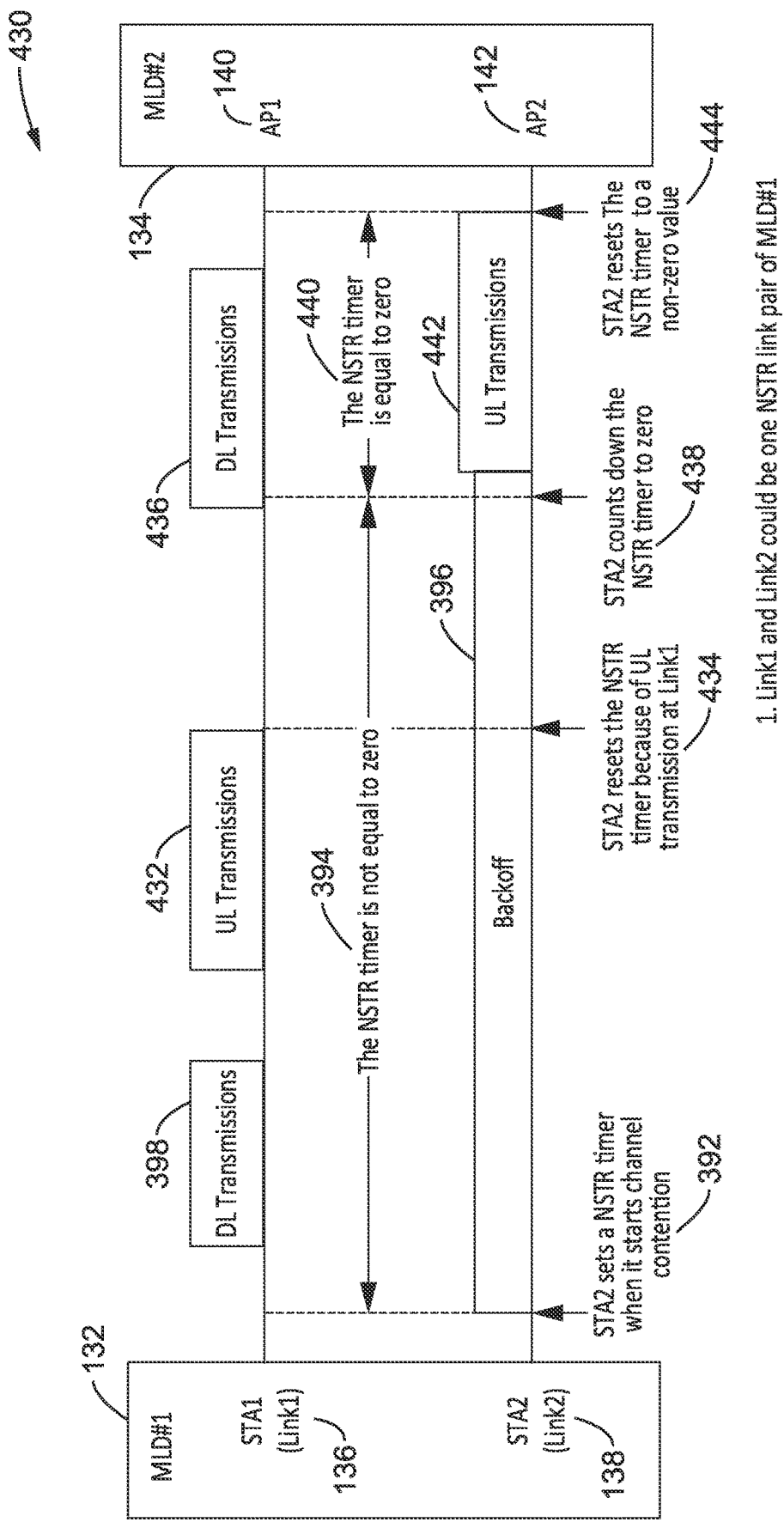
FIG. 21 is a communications sequence diagram showing an example of a STA affiliated with a MLD resetting its NSTR timer when another STA affiliated with the same MLD finishes a UL transmission according to at least one embodiment of the present disclosure.

FIG. 21 illustrates an example embodiment 430 of a STA affiliated with a MLD resetting its NSTR timer when another STA affiliated with the same MLD starts or finishes a UL transmission.

The network topology in the example is shown in FIG. 7 with MLD #1 132 which is a NSTR MLD having STA1 136 with Link1 and STA2 138 with Link2. Link1 and Link2 being a NSTR link pair of MLD #1. MLD #2 134 is shown with AP1 140 and AP2 142.

STA2 sets NSTR timer 392 when it starts channel contention with backoff 396 on Link2, which is explained for block 92 of FIG. 9A. STA2 can count down the NSTR timer as explained in FIG. 9A and FIG. 9B.

STA1 is then seen receiving DL transmissions 398, and before STA2 transmits its UL transmission, STA1 obtains a TXOP to transmit UL transmissions 432 on Link1. When STA1 finishes transmitting the UL transmissions on Link1, STA2 resets the NSTR timer 434 as explained for block 120 of FIG. 10. After STA2 counts down the NSTR timer to zero 438 and the NSTR timer is equal to zero 440 until it is reset. When STA2 gains channel access in response to the NSTR timer reaching 438 its terminal count of zero, then STA2 is allowed to transmit UL transmission 442, even though STA3 is receiving DL transmissions 436 from AP3. STA2 can reset the NSTR timer to a non-zero value 444 after its transmission.

It should be noted that it is possible that STA2 resets the NSTR timer when another STA affiliated with the same MLD finish transmitting on a link, such as a Link3 in the case where Link2 and Link3 are not a NSTR link pair of MLD #1.

It is possible that the UL transmissions on Link1 are triggered by AP1 but not launched because STA1 obtains the TXOP on Link1.

Figure 22:
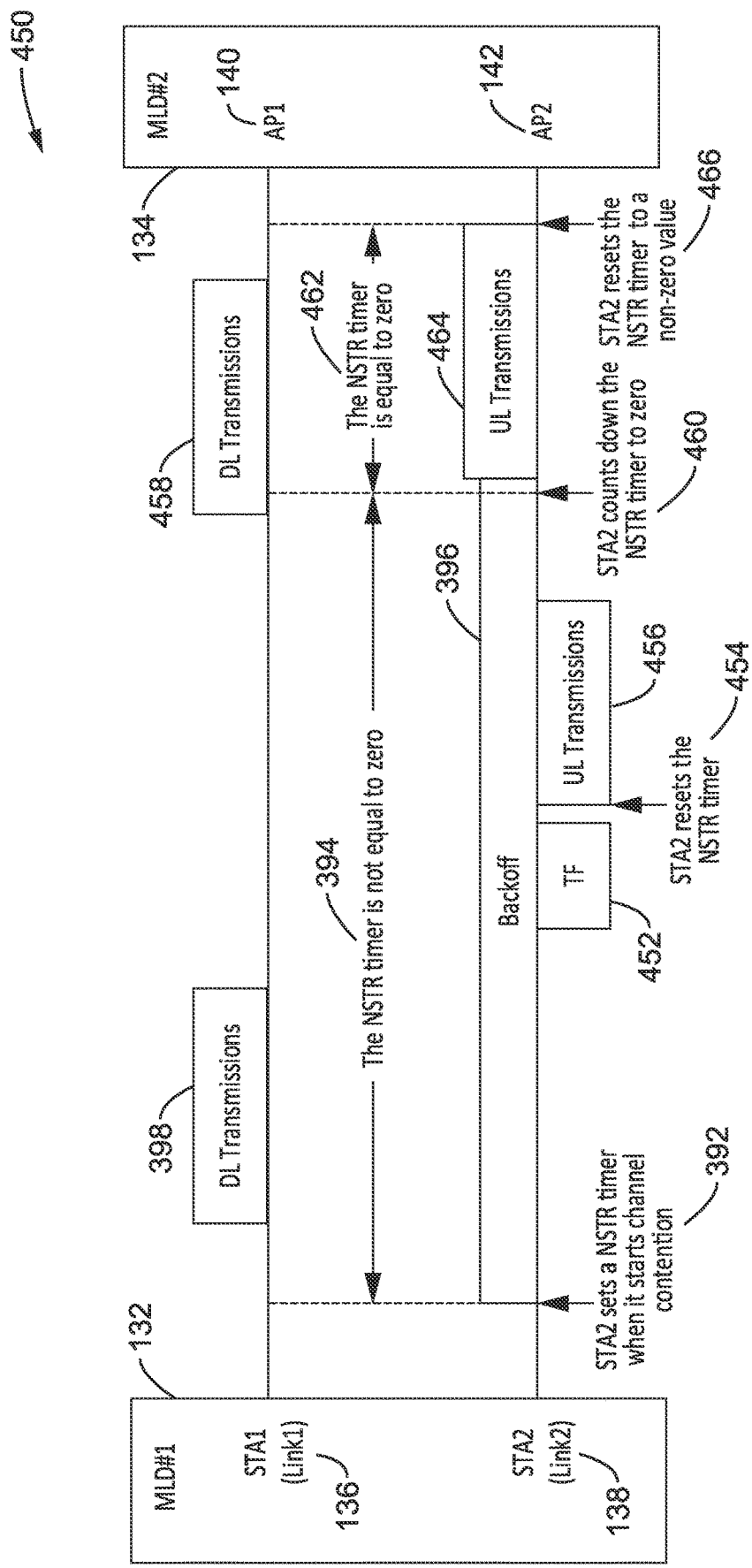
FIG. 22 is a communications sequence diagram showing an example of a STA affiliated with a MLD resetting its NSTR timer when it starts a trigger-based UL transmission according to at least one embodiment of the present disclosure.

FIG. 22 illustrates an example embodiment 450 of a STA affiliated with a MLD resetting its NSTR timer when it starts a trigger-based UL transmission.

The network topology in the example is shown in FIG. 7 with MLD #1 132 which is a NSTR MLD having STA1 136 with Link1 and STA2 138 with Link2. Link1 and Link2 being a NSTR link pair of MLD #1. MLD #2 134 is shown with AP1 140 and AP2 142.

STA2 sets a NSTR timer 392 when it starts channel contention with backoff 396 on Link2, which is explained for block 92 of FIG. 9A. STA2 can count down the NSTR timer as explained in FIG. 9A and FIG. 9B.

STA1 is seen receiving DL transmissions 398 as the NSTR for STA2 is being counted down. Before STA2 counts down its NSTR timer to zero to transmit UL transmissions, it receives a Trigger Frame (TF) 452 from AP2 for UL transmissions. When STA2 starts transmitting the UL transmissions 456 triggered by AP2, STA2 resets the NSTR timer 454 as explained for block 116 of FIG. 10. When STA2 counts down the NSTR timer to zero 460, the NSTR timer is equal to zero 462 until it is reset. When STA2 gains channel access in response to the NSTR timer reaching a terminal count of zero, STA2 is allowed to transmit UL transmission 464, even though STA1 is receiving DL transmissions 458 from AP1. STA2 may then reset 466 the NSTR timer when it finishes receiving the TF or starts the UL transmission.

Figure 23:
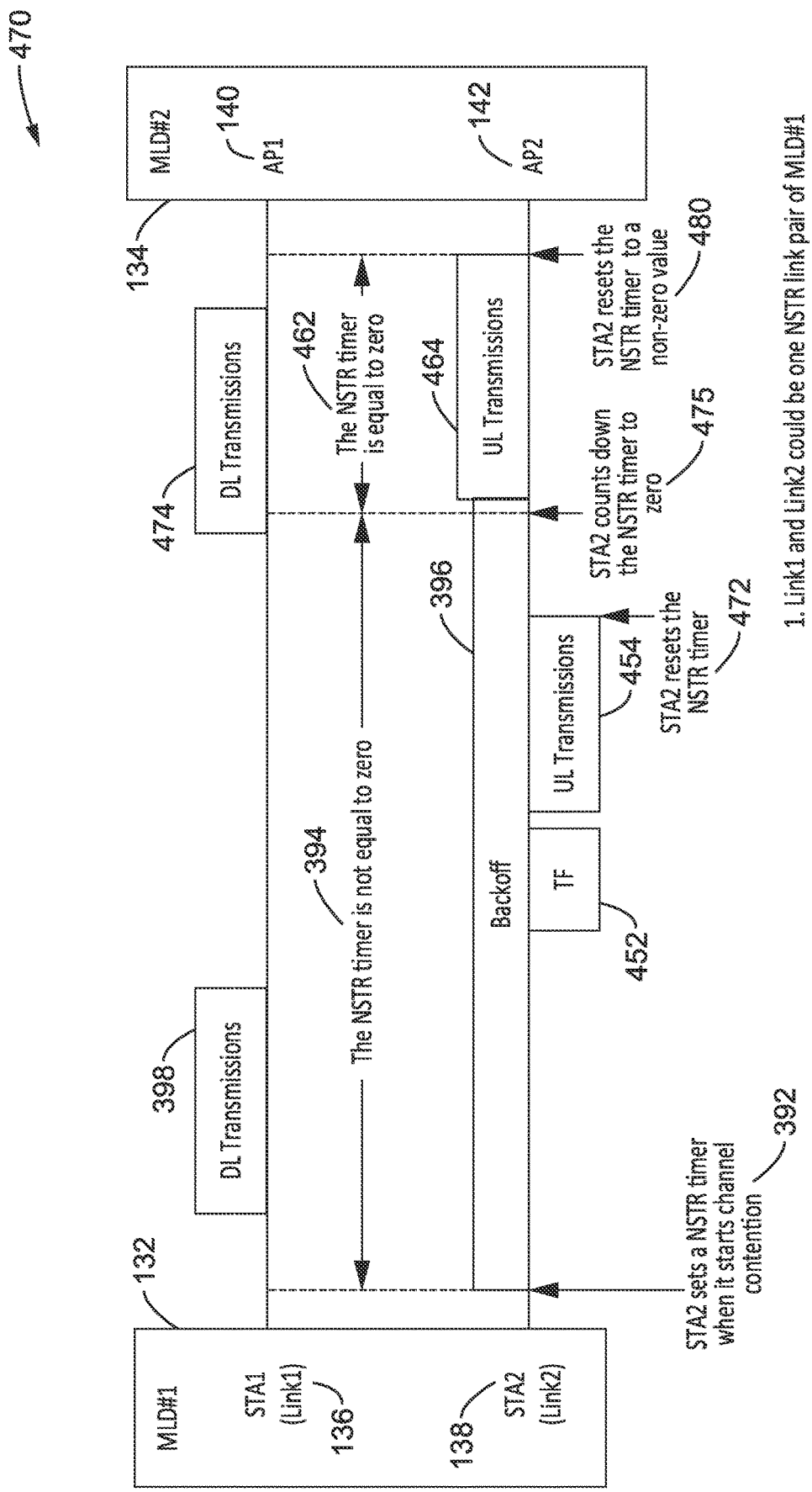
FIG. 23 is a communications sequence diagram showing an example of a STA affiliated with a MLD resetting its NSTR timer when it finishes a trigger-based UL transmission as performed according to at least one embodiment of the present disclosure.

FIG. 23 illustrates an example embodiment 470 of a STA affiliated with a MLD resetting its NSTR timer when it finishes a trigger-based UL transmission.

The network topology in the example is shown in FIG. 7 with MLD #1 132 which is a NSTR MLD having STA1 136 with Link1 and STA2 138 with Link2. Link1 and Link2 being a NSTR link pair of MLD #1. MLD #2 134 is shown with AP1 140 and AP2 142.

STA2 sets a NSTR timer 392 when it starts channel contention with backoff 396 on Link2, which is explained for block 92 of FIG. 9A. STA2 can count down the NSTR timer as explained in FIG. 9A and FIG. 9B.

STA1 is seen receiving DL transmissions 398 while the STA2 NSTR timer is being counted down. In this example, before STA2 transmits its UL transmission, it receives a TF 452 from AP1 for UL transmissions. When STA2 finishes transmitting UL transmissions 454 triggered by AP2, then STA2 resets the NSTR timer 472 as explained for block 116 of FIG. 10. When STA2 counts down the NSTR timer to zero 475, the NSTR timer is equal to zero 462 until it is reset. When STA2 gains channel access in response to the NSTR timer being counted down to zero, STA2 is allowed to transmit UL transmissions 464 even though STA1 is receiving DL transmissions 474 from AP1. It will be noted again that STA2 can reset the NSTR time to a non-zero value 480 after its transmission.

Figure 24:
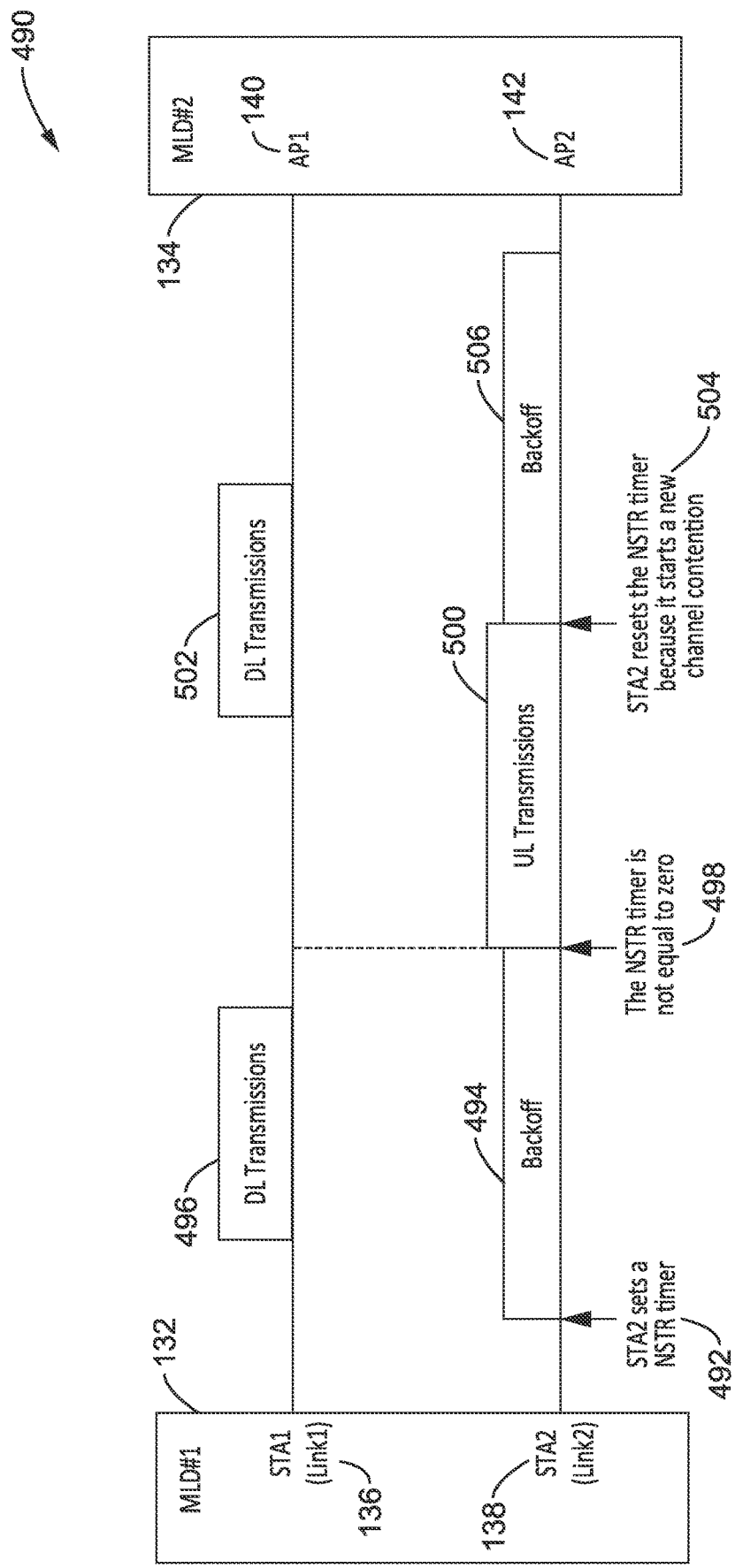
FIG. 24 is a communications sequence diagram showing an example of a STA resetting its NSTR timer when it starts a new channel contention process according to at least one embodiment of the present disclosure.

FIG. 24 illustrates an example embodiment 490 of a STA affiliated with a MLD resetting its NSTR timer when it starts contending for the channel.

The network topology in the example is shown in FIG. 7 with MLD #1 132 which is a NSTR MLD having STA1 136 with Link1 and STA2 138 with Link2. Link1 and Link2 being a NSTR link pair of MLD #1. MLD #2 134 is shown with AP1 140 and AP2 142.

STA2 has packets to transmit and sets a NSTR timer 492 when it starts channel contention with backoff 494 on Link2, which is explained for block 92 of FIG. 9A. STA2 can count down the NSTR timer as explained in FIG. 9A and FIG. 9B.

STA1 is seen receiving DL transmissions 496 while the NSTR timer of STA2 is being counted down. The backoff of STA2 is shown being completed at a time when there are no transmission being received on STA1. So while the NSTR timer is still not equal to zero 498, then STA2 gains channel access and transmits UL transmissions 500 on Link2. Since STA1 is not receiving on Link1, STA2 is able to transmit even if the NSTR timer is not equal to zero. During the UL transmission of STA2, STA1 starts receiving DL transmissions 502. At the end of the UL transmissions 500 of STA2, then STA2 starts a new channel contention and resets 504 the NSTR timer as explained for block 118 of FIG. 10.

Figure 25:
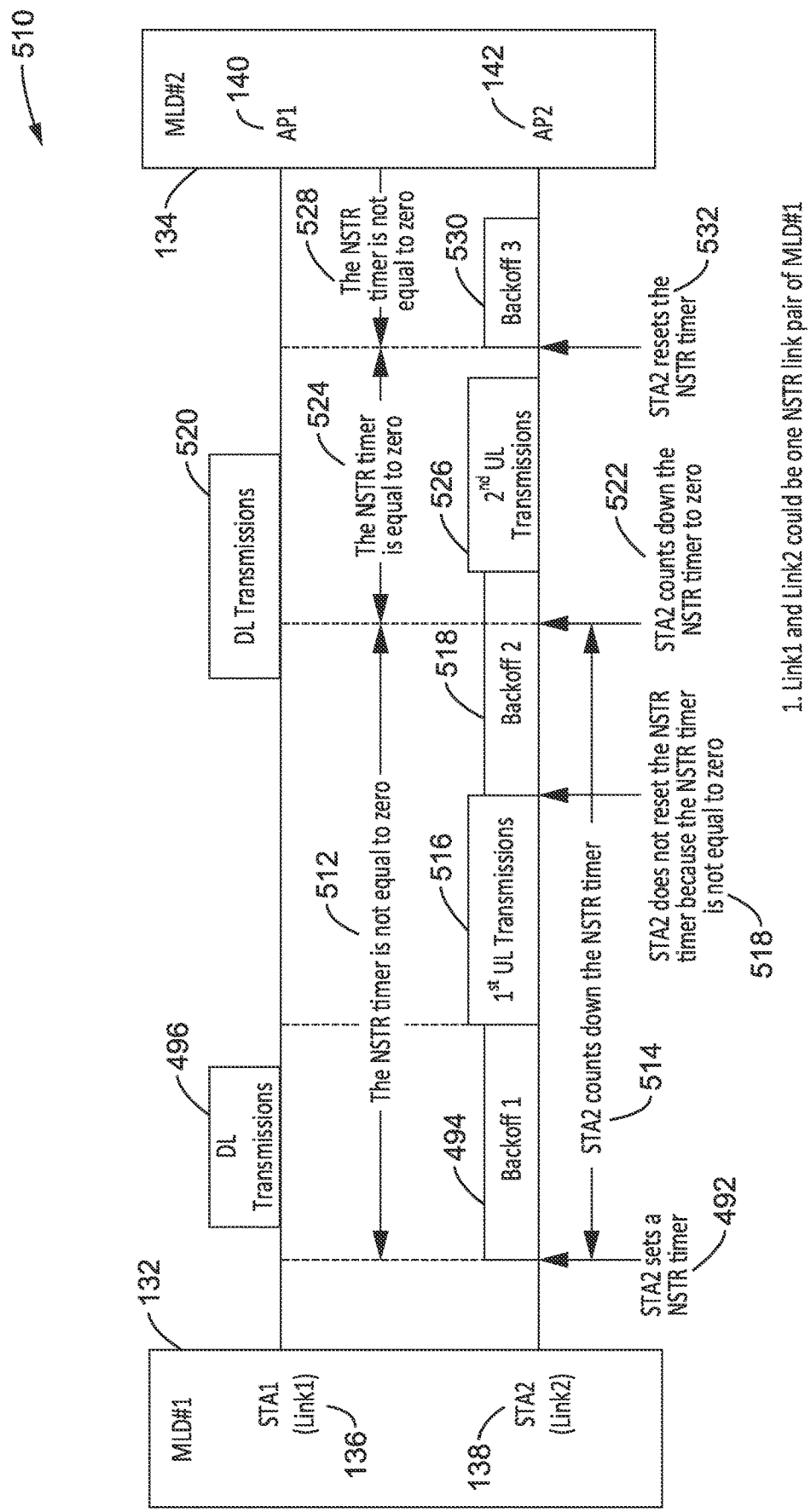
FIG. 25 is a communications sequence diagram showing an example of a STA resetting its NSTR timer only when the NSTR timer counts down to zero according to at least one embodiment of the present disclosure.

FIG. 25 illustrates an example embodiment 510 of a STA affiliated with a MLD using the options as shown in FIG. 10 to set or reset its NSTR timer only when the NSTR timer is equal to zero.

The network topology in the example is shown in FIG. 7 with MLD #1 132 which is a NSTR MLD having STA1 136 with Link1 and STA2 138 with Link2. Link1 and Link2 being a NSTR link pair of MLD #1. MLD #2 134 is shown with AP1 140 and AP2 142.

STA2 has packets to transmit and sets a NSTR timer 492 when it starts channel contention with backoff1 494 on Link2, which is explained for block 92 of FIG. 9A. STA2 can count down 514 the NSTR timer as explained in FIG. 9A and FIG. 9B.

The DL transmissions 496 received by STA1 are no longer being received, when STA2 backoff is completed and it gains channel access while the NSTR timer of STA2 has not yet reached a terminal count (zero). In response to gaining the channel, STA2 transmits $1^{st}$ UL transmissions 516 on Link2. In this example, when STA2 transmits $1^{st}$ UL transmissions on Link2, its NSTR timer is not equal 512 to zero. However, since STA1 is not receiving at that time, STA2 can still transmit. After STA2 starts its second channel contention with backoff2 it does not reset 518 the NSTR timer because the NSTR timer is not equal to zero. So the timer has still been counting down 512 from when it was originally set 492. When the NSTR timer of STA2 reaches its terminal count of zero 522 it is in the middle of a backoff2 518 and STA1 is receiving DL transmissions 520. The NSTR timer remains equal to zero 524. When STA2 backoff2 518 is completed, then STA2 sends its $2^{nd}$ UL transmissions 526. It will be noted that STA2 did not start its UL transmission at the end of the NSTR timer count, since STA1 was receiving DL transmissions 520, and since backoff2 is not counted down to zero at that time.

When STA2 starts its $3^{rd}$ channel contention with backoff3 530, then the NSTR timer is still equal 528 to zero; so STA2 resets the NSTR timer 532 using the option as explained for block 118 of FIG. 10, so that the NSTR timer is no longer equal to zero 528.

Figure 26:
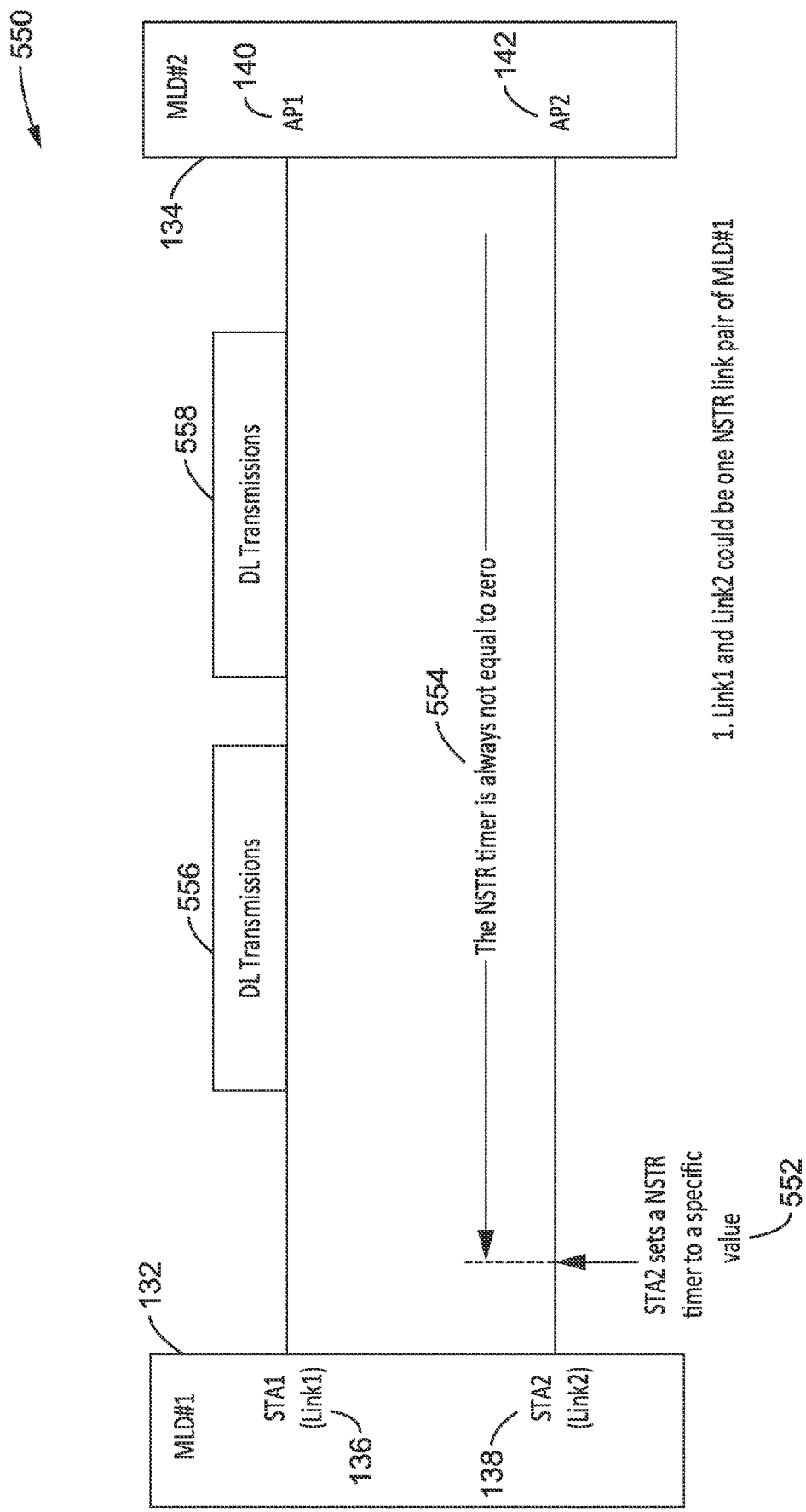
FIG. 26 is a communications sequence diagram showing an example of a STA affiliated with a MLD setting its NSTR timer on a link of one of the link pairs of the MLD to a value of always being forbidden to transmit on that link while another MLD affiliated with the same MLD is receiving on the other link of the link pair as performed according to at least one embodiment of the present disclosure.

FIG. 26 illustrates an example embodiment 550 of a STA affiliated with a MLD setting its NSTR timer on a link of one of the NSTR link pairs of the MLD to a constant value (e.g., specific value set aside as a flag) to indicate that it is never allowed to transmit at the same time another STA affiliated with the same MLD is receiving on the other link of the same NSTR link pair.

The network topology in the example is shown in FIG. 7 with MLD #1 132 which is a NSTR MLD having STA1 136 with Link1 and STA2 138 with Link2. Link1 and Link2 being a NSTR link pair of MLD #1. MLD #2 134 is shown with AP1 140 and AP2 142.

STA2 has packets to transmit and sets a NSTR timer 552 to a specific value on Link2, indicating that the counter is not be counted down and will never be equal to zero which is explained for block 92 of FIG. 9A. When STA2 sets the NSTR timer to this special value, e.g., the maximum value which is allowed to set the NSTR timer, the NSTR timer will never be equal to zero 554, but remains at the specific flag value. STA2 is thus never allowed to transmit when STA1 is receiving, and the example depicts STA1 receiving DL transmissions 556 and 558. The NSTR timer of STA2 maintains that same value and does not count down.

Figure 27:
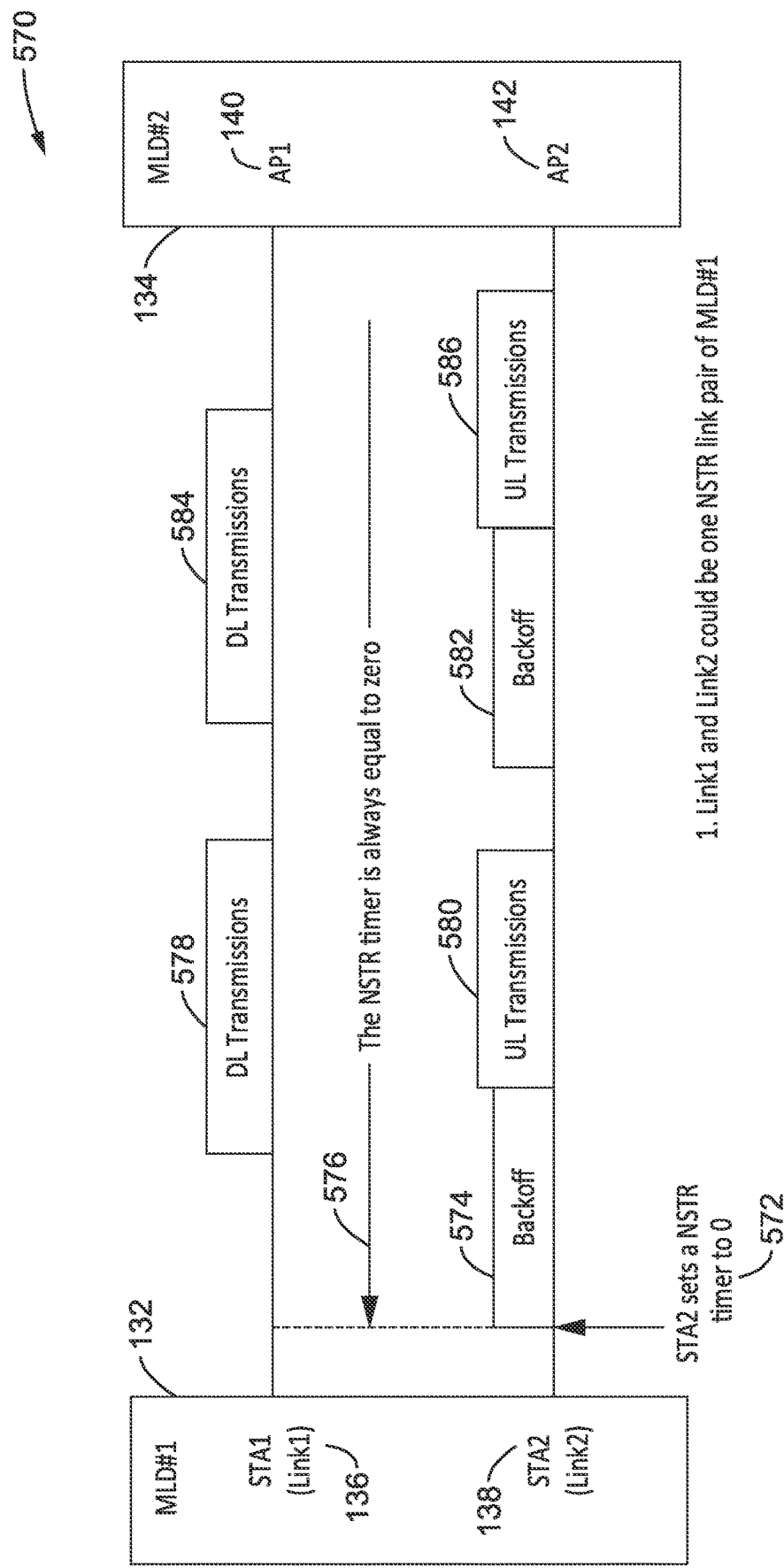
FIG. 27 is a communications sequence diagram showing an example of a STA affiliated with a MLD setting its NSTR timer on a link of one of the link pairs of the MLD to a value to always allow transmitting on that link while another MLD affiliated with the same MLD is receiving on the other link of the link pair as performed according to at least one embodiment of the present disclosure.

FIG. 27 illustrates an example embodiment 570 of a STA affiliated with a MLD setting its NSTR timer on a link of one of the NSTR link pairs of the MLD to a constant (specific) value (e.g., terminal count) which provides a flag to indicate that it is always allowed to transmit at the same time another STA affiliated with the same MLD is receiving on the other link of the same NSTR link pair. In at least one example this constant value is the value of the terminal count which for these examples is zero.

The network topology in the example is shown in FIG. 7 with MLD #1 132 which is a NSTR MLD having STA1 136 with Link1 and STA2 138 with Link2. Link1 and Link2 being a NSTR link pair of MLD #1. MLD #2 134 is shown with AP1 140 and AP2 142.

STA2 sets a NSTR timer 572 on Link2, which is explained for block 92 of FIG. 9A. When STA2 sets the NSTR timer to this special value, e.g., zero, it is then always allowed to transmit 576 regardless of whether STA1 is receiving. The NSTR timer of STA2 does not count down. After setting the NSTR timer to its terminal count (specific value), then it is seen starting a backoff 574, during which DL transmissions 578 are received on STA1, but since the setting of the NSTR timer is still zero (specific value which allows access), STA2 performs a transmission 580, exemplified as a UL transmission. This is shown repeated with a STA2 backoff 582, after which DL transmission 584 is received, and since access is still allowed, STA2 sends a transmission 586, also exemplified as a UL transmission.

Figure 28:
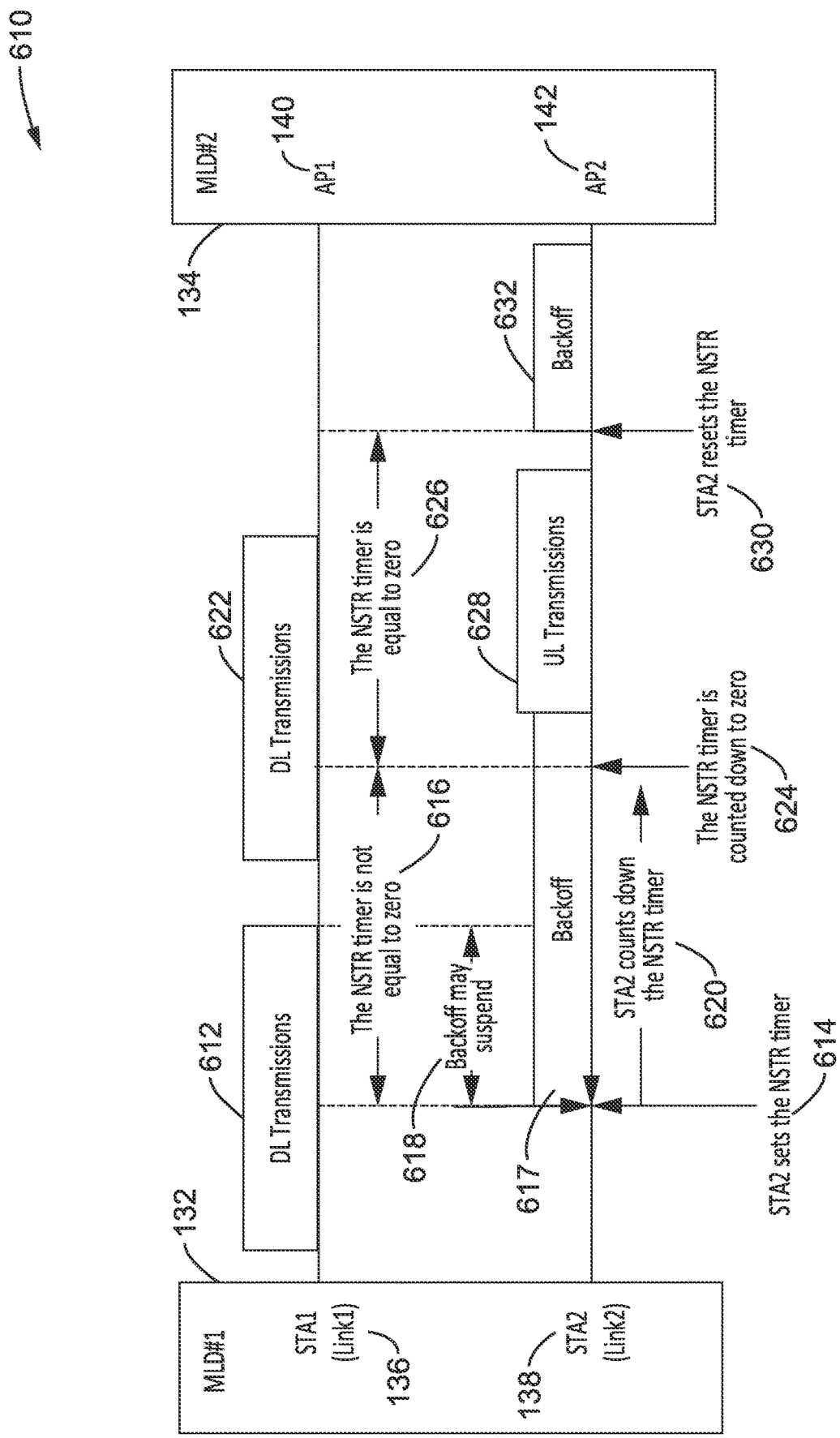
FIG. 28 is a communications sequence diagram showing an example of setting a NSTR timer and backoff timer at the same time according to at least one embodiment of the present disclosure.

FIG. 28 illustrates an example embodiment 610 of a STA affiliated with a MLD setting and counting down its NSTR timer.

The network topology in the example is shown in FIG. 7 with MLD #1 132 which is a NSTR MLD having STA1 136 with Link1 and STA2 138 with Link2. Link1 and Link2 being a NSTR link pair of MLD #1. MLD #2 134 is shown with AP1 140 and AP2 142.

STA1 is receiving DL transmissions 612, when STA2 sets a NSTR timer 614 when it starts channel contention with backoff 617 which may be suspended 618 on Link2, which is explained for block 92 of FIG. 9A. STA2 can count down the NSTR timer as explained in FIG. 9A and FIG. 9B.

During the count-down procedure, the NSTR timer is not counted down to zero 616. STA2 is counting down 620 the NSTR timer to zero 624, and the NSTR timer is equal to zero 626 until the NSTR timer is reset to a non-zero value 630.

When the NSTR timer is not equal to zero, STA2 is not allowed to transmit at the same time STA1 is receiving (i.e., DL transmissions 612) from AP1, which is explained for block 88 of FIG. 8.

When the NSTR timer count down reaches zero, STA2 is allowed to transmit at the same time STA1 is receiving (i.e., DL transmissions 622) from AP1, which is explained for block 86 of FIG. 8. As shown in the figure, when STA2 finishes backoff 617 and its NSTR timer is at terminal count, while STA1 is receiving DL transmissions 622 from AP1, then STA2 obtains the TXOP and transmits UL transmissions 628 to AP2.

It should be note that the backoff on link1 can be suspended 618 when the NSTR of STA2 is not equal to zero and STA1 is receiving on Link1. As shown in the figure, STA2 suspends its backoff when it starts the first backoff because STA1 is receiving.

After STA2 completes its UL transmissions 628 it resets the NSTR timer 630 when it commences another channel contention with its backoff 632.

Figure 29:
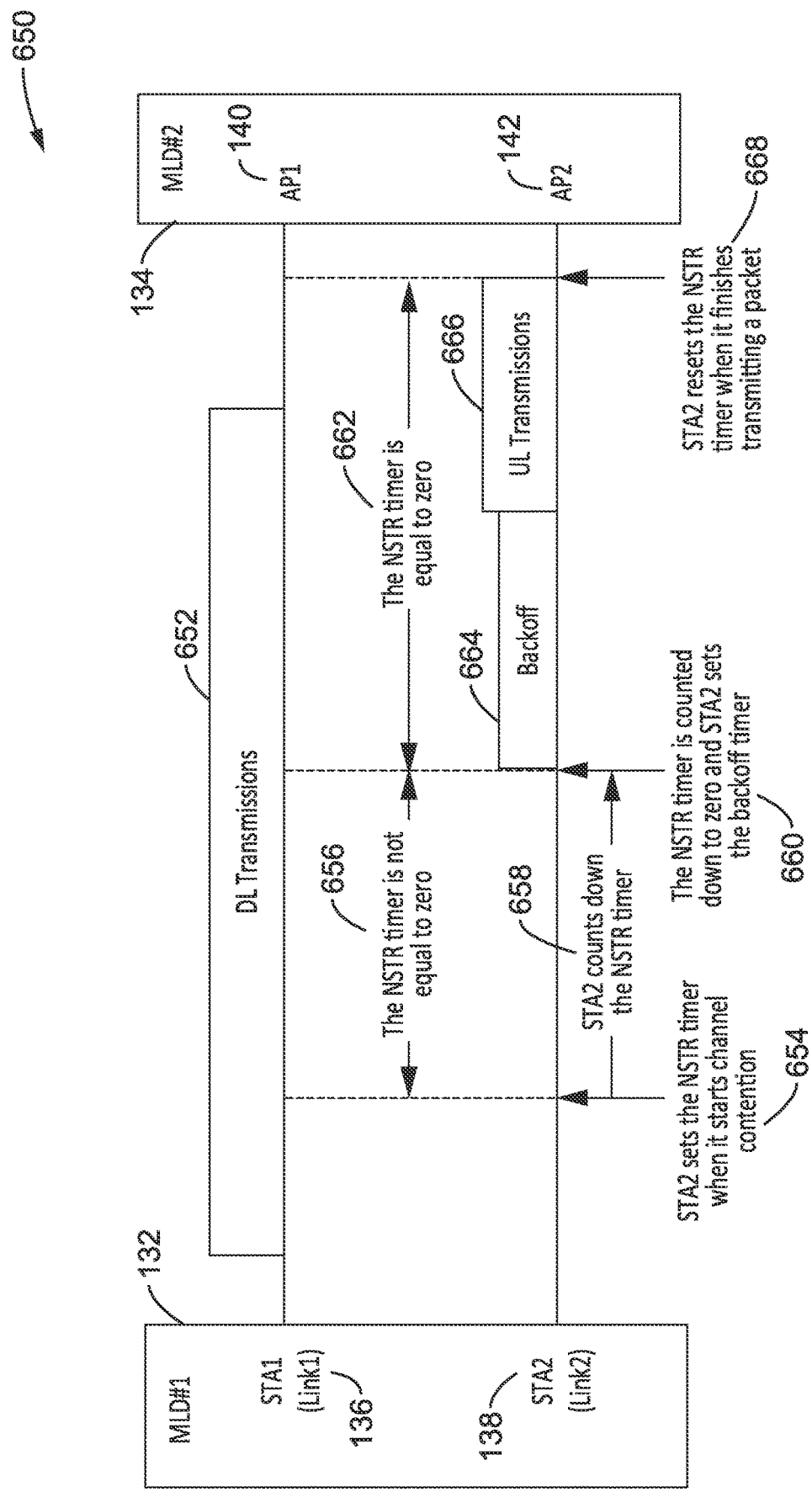
FIG. 29 is a communications sequence diagram showing an example of starting backoff when the NSTR timer is counted down to zero according to at least one embodiment of the present disclosure.

FIG. 29 illustrates an example embodiment 650 of a STA affiliated with a MLD setting and counting down an NSTR timer. This example shows that the backoff timer can be set when the NSTR timer is counted down to zero.

The network topology in the example is shown in FIG. 7 with MLD #1 132 which is a NSTR MLD having STA1 136 with Link1 and STA2 138 with Link2. Link1 and Link2 being a NSTR link pair of MLD #1. MLD #2 134 is shown with AP1 140 and AP2 142.

STA1 is receiving DL transmissions 652 during which STA2 sets a NSTR timer 654 for counting down when it begins contending for the channel on Link2, which is explained for block 92 of FIG. 9A. STA2 can count down 658 the NSTR timer as explained in FIG. 9A and FIG. 9B. It will be noted that in this mode STA2 does not start a backoff when it starts the NSTR counter, in view of STA1 receiving DL transmissions 652.

The NSTR timer is not equal to zero 656 for a period of time, then when it reaches zero 660, STA2 commences a backoff 664. Since the NSTR timer is equal to zero 662 until it is reset, STA2 is allowed to transmit at the same time STA1 is receiving (i.e., DL transmissions 652) from AP1, which is explained for block 86 of FIG. 8. As shown in the figure, when STA2 finishes backoff at the time STA1 is receiving DL transmissions from AP1, STA2 obtains the TXOP and transmits UL transmissions 666 to AP2, after which STA2 can reset the NSTR timer 668.

FIG. 30 illustrates an example embodiment 670 of one channel contention procedure containing multiple backoffs. This example also shows that the backoff can be performed independently of the NSTR timer.

The network topology in the example is shown in FIG. 7 with MLD #1 132 which is a NSTR MLD having STA1 136 with Link1 and STA2 138 with Link2. Link1 and Link2 being a NSTR link pair of MLD #1. MLD #2 134 is shown with AP1 140 and AP2 142.

STA1 is receiving DL transmissions 672, when STA2 sets a NSTR timer 674 when it begins contending 676 for the channel on Link2, which is explained for block 92 of FIG. 9A. STA2 can count down 675 the NSTR timer as explained in FIG. 9A and FIG. 9B.

STA2 has the option of setting the backoff, i.e., backoff1, later than the NSTR timer, as is seen in this instance. For example, backoff1 680 is commenced at the end time of the first DL transmissions 672 at STA1, during which time the NSTR timer is not equal to zero 678. When backoff1 counts down to zero, STA1 is receiving the second DL transmissions 682 from AP1. Since the NSTR timer is still counting down 675 and not equal to zero 678, STA2 is not able to transmit at that time.

Then, STA2 can reset for another backoff, i.e., backoff2 686, at the end of the second DL transmissions 682 at STA1. Since backoff1 did not obtain a TXOP, backoff2 is not regarded as a new channel contention. Thus the NSTR timer is counted down to zero 690 before backoff2 is completed. When backoff2 is completed the NSTR timer is already equal to zero and STA2 is allowed to transmit UL transmissions 694 when STA1 is receiving on Link1, while the NSTR timer remains at its terminal count of zero 692.

Then, STA2 commences a new channel contention with a backoff 698 and resets 696 the NSTR timer.

Figure 31:
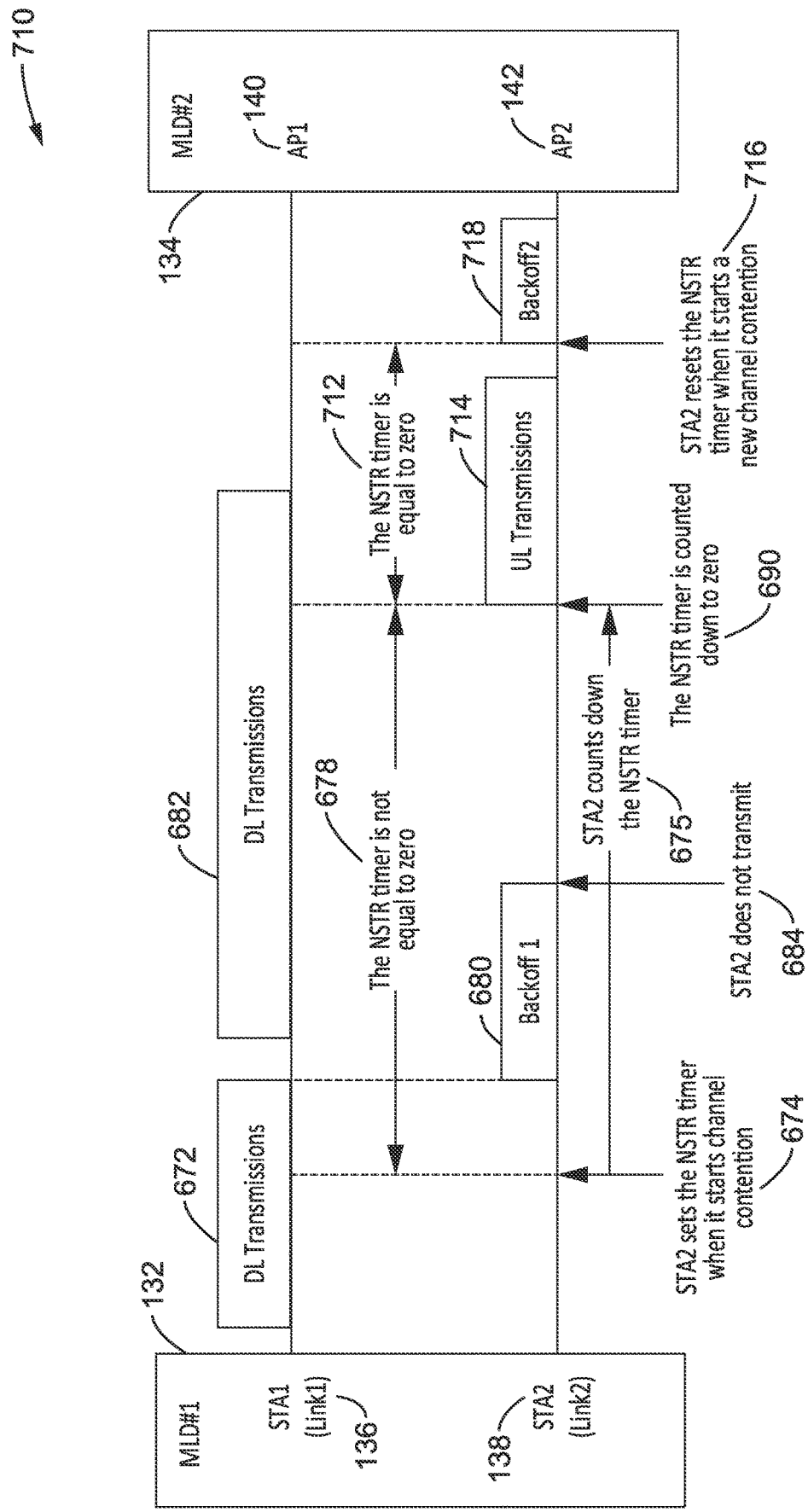
FIG. 31 is a communications sequence diagram showing an example of running backoffs during the count-down procedure of a NSTR timer according to at least one embodiment of the present disclosure.

FIG. 31 illustrates an example embodiment 710 of setting backoff in the middle of the count-time procedure of a NSTR timer. This example also shows that the backoff timer can be set independently of the NSTR timer.

The network topology in the example is shown in FIG. 7 with MLD #1 132 which is a NSTR MLD having STA1 136 with Link1 and STA2 138 with Link2. Link1 and Link2 being a NSTR link pair of MLD #1. MLD #2 134 is shown with AP1 140 and AP2 142.

STA1 is receiving DL transmissions 672 when STA2 sets a NSTR timer 674 when it begins contending for the channel on Link2, which is explained for block 92 of FIG. 9A. It will be noted that STA2 does not start a backoff yet, in view of STA1 receiving DL transmissions 672. STA2 can count down the NSTR timer as explained in FIG. 9A and FIG. 9B.

STA2 may set the backoff timer, i.e., backoff1 680, at the end of DL transmissions 672 on STA1, which is after the NSTR timer has been counted down to its terminal count of zero. When backoff1 is completed, STA1 is receiving DL transmissions from AP1, but the NSTR timer is not equal to zero 678. Since the NSTR timer is not equal to zero, STA2 is not able to transmit 684 at that time.

STA1 is receiving more DL transmissions 682, while STA2 can continue counting down 675 its NSTR timer. When the NSTR timer is counted down to zero 690 and STA2 senses the channel is idle at that time, it accesses the channel on Link2 and performs UL transmissions 714. It will be noted that this may require that the channel during the time between the end of backoff1 and the start time of UL transmission is always idle. If STA2 senses the channel busy on Link2 before the NSTR timer is counted down to zero, it can reset a new backoff for channel contention.

Then, STA2 begin a new channel contention 716 and resets the NSTR timer, with backoff2 718 being performed.

Figure 32:
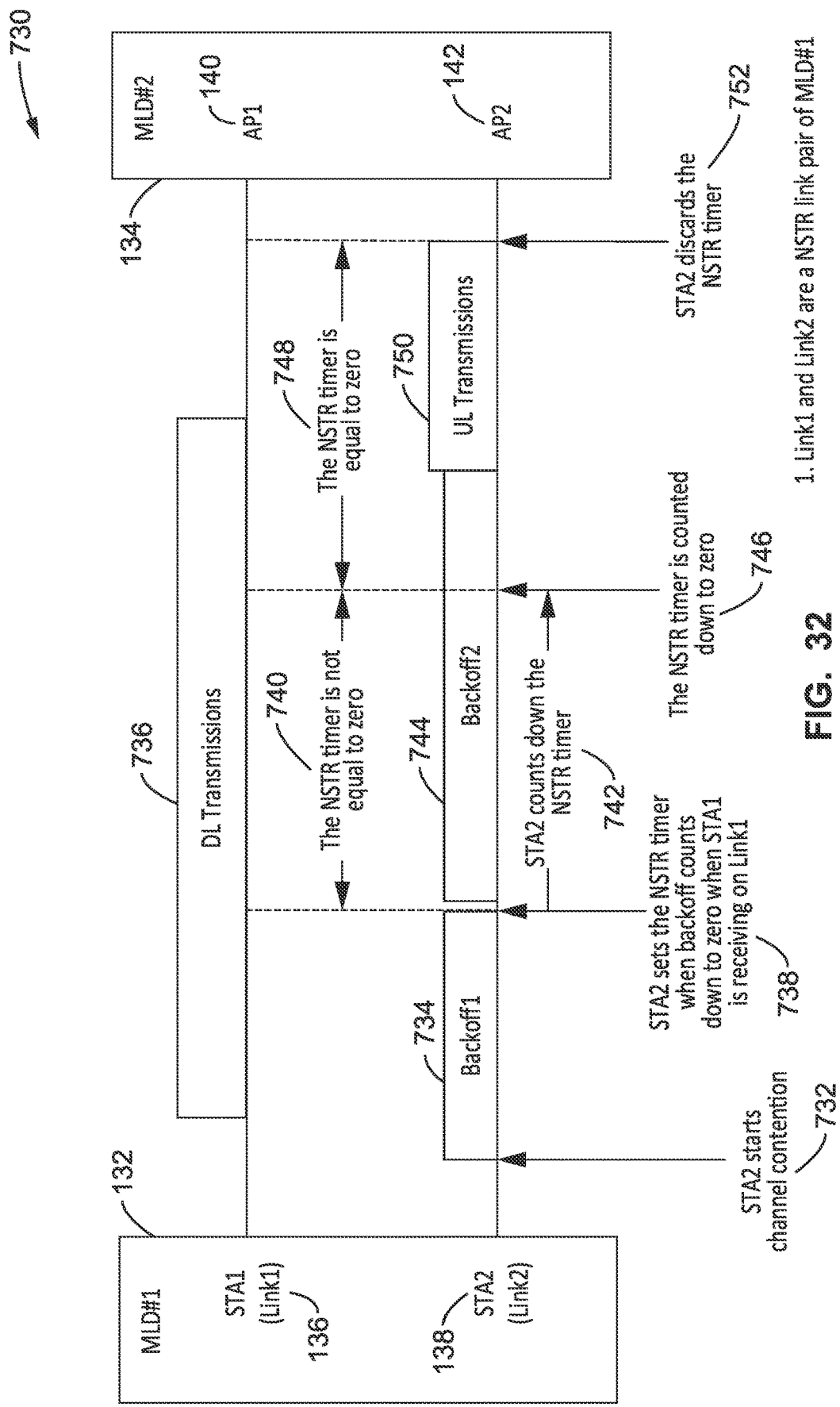
FIG. 32 is a communications sequence diagram showing an example of setting the NSTR timer when backoff is completed according to at least one embodiment of the present disclosure.

FIG. 32 illustrates an example embodiment 730 depicting an extra example of using the NSTR timer.

The network topology in the example is shown in FIG. 7 with MLD #1 132 which is a NSTR MLD having STA1 136 with Link1 and STA2 138 with Link2. Link1 and Link2 being a NSTR link pair of MLD #1. MLD #2 134 is shown with AP1 140 and AP2 142.

STA2 starts to contend for the channel and sets backoff1 732, but does not set the NSTR timer. After which STA1 is seen receiving DL transmissions 736. When backoff1 734 is completed, STA2 does not transmit since STA1 is receiving on Link1. Therefore, at that time, STA2 sets a NSTR timer 738. STA2 can then count down 742 the NSTR timer as explained in FIG. 9A and FIG. 9B.

Meanwhile, STA2 can commence another backoff, i.e., backoff2 744, while the NSTR timer is not equal to zero 740. This time, the NSTR timer is counted down to zero 746 before backoff2 is completed. When backoff2 completes then the NSTR timer is already equal to zero. STA2 is allowed to transmit UL transmissions 750 when STA1 is receiving on Link1.

After STA2 finishes its UL transmissions, it discards or resets the NSTR timer 752.

Figure 33:
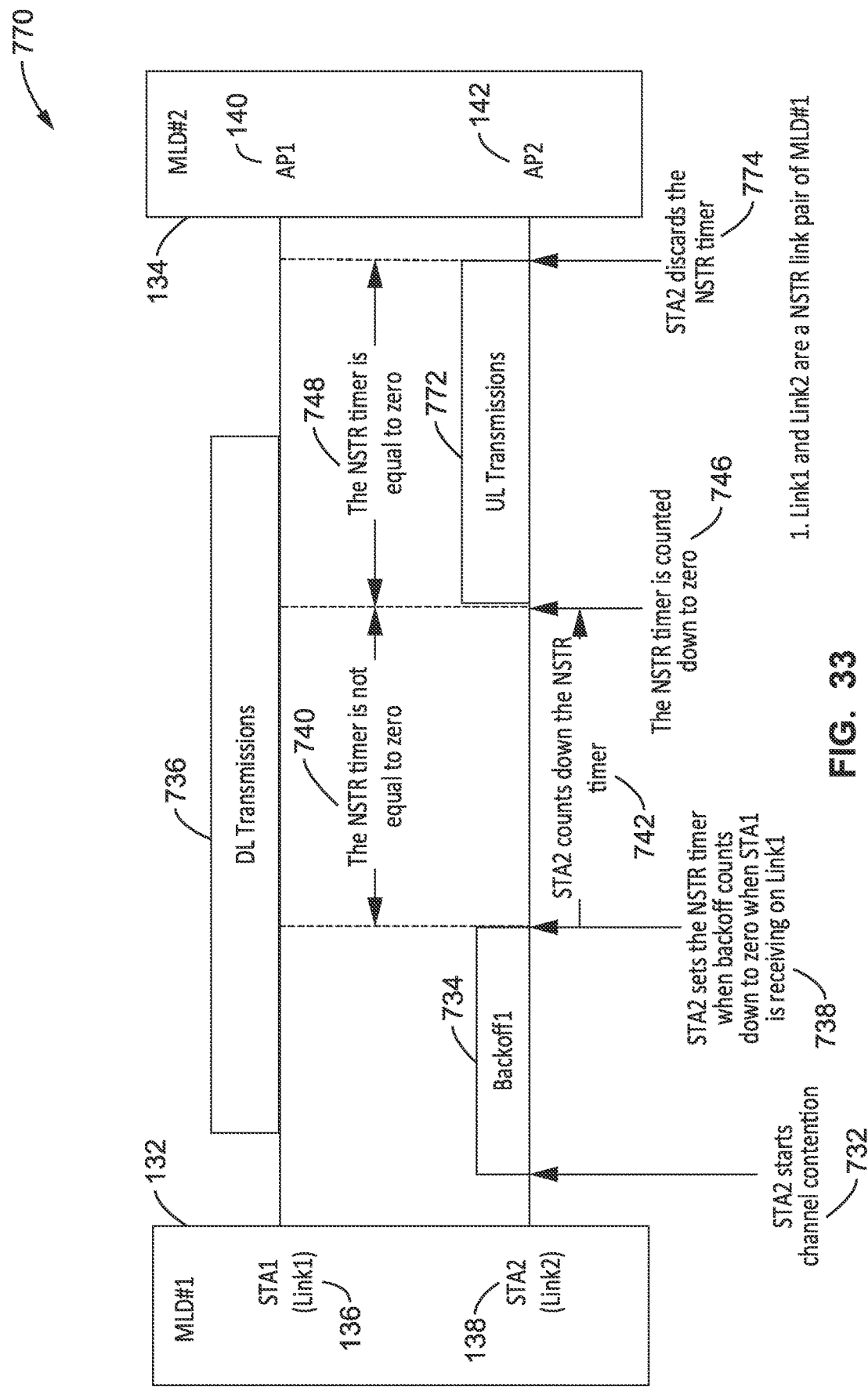
FIG. 33 is a communications sequence diagram showing an example of accessing a channel when the NSTR timer counts down to zero according to at least one embodiment of the present disclosure.

FIG. 33 illustrates an example embodiment 770 depicting an extra example of using the NSTR timer.

The network topology in the example is shown in FIG. 7 with MLD #1 132 which is a NSTR MLD having STA1 136 with Link1 and STA2 138 with Link2. Link1 and Link2 being a NSTR link pair of MLD #1. MLD #2 134 is shown with AP1 140 and AP2 142.

STA2 starts to contend 732 for the channel and sets backoff1 734. After this STA1 is seen receiving DL transmissions 736. When backoff1 is completed, STA2 does not transmit since STA1 is receiving DL transmissions on Link1. Therefore, at that time, STA2 sets a NSTR timer 738 and counts down the timer 742 which is not equal to zero for a period of time 740. STA2 can count down the NSTR timer as explained in FIG. 9A and FIG. 9B. If the NSTR timer is counted down to zero 746 before the end of the DL transmissions at Link1, STA2 can transmit the UL transmissions 772 anyway. After STA2 finishes its UL transmissions 772, the NSTR timer is still equal to zero 748 and STA2 can discard or reset 774 the NSTR timer.

Figure 34:
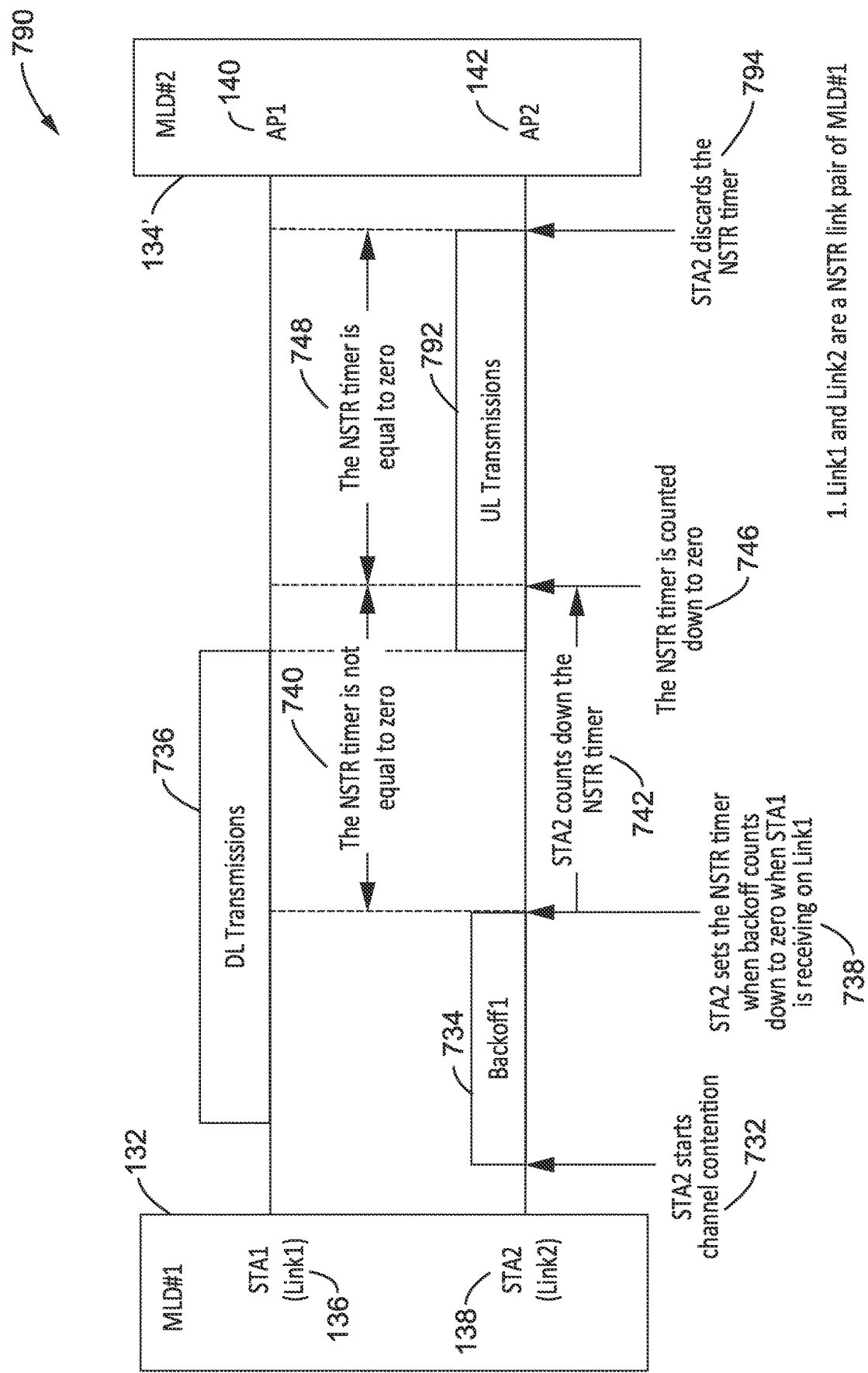
FIG. 34 is a communications sequence diagram showing an example of accessing a channel before the NSTR timer counts down to zero as performed according to at least one embodiment of the present disclosure.

FIG. 34 illustrates an example embodiment 790 with an extra example of a STA accessing the channel before the NSTR timer counts down to zero.

The network topology in the example is shown in FIG. 7 with MLD #1 132 which is a NSTR MLD having STA1 136 with Link1 and STA2 138 with Link2. Link1 and Link2 being a NSTR link pair of MLD #1. MLD #2 134 is shown with AP1 140 and AP2 142.

STA2 starts to contend 732 for the channel and starts backoff1 734. STA1 starts receiving DL transmissions 736, which are commencing when backoff1 734 is completed, but STA2 does not transmit since STA1 is receiving DL transmissions on Link1. Therefore, at that time, STA2 sets a NSTR timer 738 and can count down 742 the NSTR timer as explained in FIG. 9A and FIG. 9B. For a period of time after being set, the NSTR timer is not equal to zero 740. If DL transmissions 736 at Link1 ends before the NSTR timer is counted down to zero 746, then STA2 can transmit the UL transmissions 792 after the time DL transmissions at Link1 ends.

After STA2 finishes its UL transmissions, the NSTR timer is still equal to zero 748 and STA2 is shown discarding or resetting 794 the NSTR timer.

Figure 35:
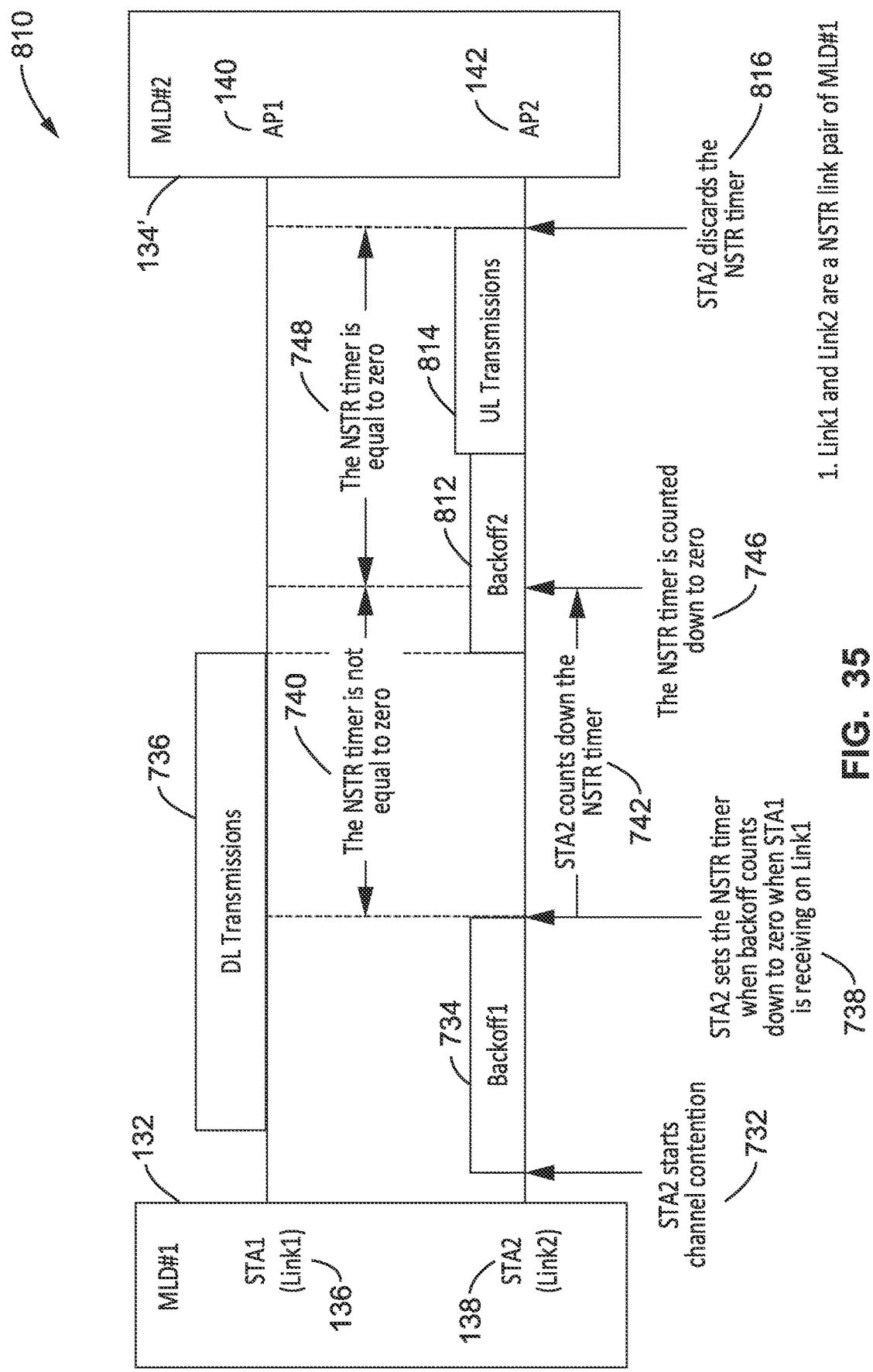
FIG. 35 is a communications sequence diagram showing an example of resetting a backoff before the NSTR timer counts down to zero according to at least one embodiment of the present disclosure.

FIG. 35 illustrates an example embodiment 810 depicting an example of resetting a backoff before NSTR timer counts down to zero.

The network topology in the example is shown in FIG. 7 with MLD #1 132 which is a NSTR MLD having STA1 136 with Link1 and STA2 138 with Link2. Link1 and Link2 being a NSTR link pair of MLD #1. MLD #2 134 is shown with AP1 140 and AP2 142.

STA2 starts to contend for the channel 732 and sets backoff1 734. STA1 starts receiving DL transmissions 736. When backoff1 734 is completed, STA2 does not transmit since STA1 is receiving DL transmissions 736 on Link1. Therefore, at that time, STA2 sets a NSTR timer 738 and starts counting down 742 the NSTR timer as explained in FIG. 9A and FIG. 9B. For a period of time after setting the NSTR timer its value is not equal to zero 740. If the DL transmissions 736 for Link1 ends before the NSTR timer is counted down to zero, STA2 can re-start another backoff, i.e., backoff2 812, to contend for the channel. During this second backoff, the NSTR counter is counted down to zero 746. After backoff2 812 is completed, the NSTR timer is still equal to zero 748 and STA2 can transmit the UL transmissions 814 on Link2.

After STA2 finishes its UL transmissions 748, it discards or resets 816 the NSTR timer.

5. General Scope of Implementations

The enhancements described in the presented technology can be readily implemented within various wireless network communication stations. It should also be appreciated that wireless network communication stations are preferably implemented to include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

It will also be appreciated that the computer readable media (memory storing instructions) in these computations systems is "non-transitory", which comprises any and all forms of computer-readable media, with the sole exception being a transitory, propagating signal. Accordingly, the disclosed technology may comprise any form of computer-readable media, including those which are random access (e.g., RAM), require periodic refreshing (e.g., DRAM), those that degrade over time (e.g., EEPROMS, disk media), or that store data for only short periods of time and/or only in the presence of power, with the only limitation being that the term "computer readable media" is not applicable to an electronic signal which is transitory.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure(s) algorithm(s), step(s), operation(s), formula(e), or computational depiction(s).

It should be appreciated that blocks at the beginning and end of these flowcharts, such as "Start" and "Stop" do not infer that the instructions are confined to a specific routine, or that it has an actual start and stop, per se, but are merely provided as points of reference in relation to executing steps involved in the process. The associated instructions for these process steps may be executed without limitation within various routines, tasks, slices, threads, and so forth, and these steps can be combined with steps to perform other functions, or can be extended to provide additional functionality, without departing from the teachings of the present disclosure.

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

An apparatus for wireless communication in a network, the apparatus comprising: (a) a wireless communication circuit configured as a station (STA) for wirelessly communicating with at least one other station (STA) on a network using Carrier-Sense Multiple-Access Collision Avoidance (CSMA/CA) as well as multi-link operations are applied; (b) a processor coupled to said station; (c) a non-transitory memory storing instructions executable by the processor; and (d) wherein said instructions, when executed by the processor, perform a communications protocol for said station and other stations on the network operating as either an Access Point (AP) station or non-AP stations, and wherein transmit opportunities (TXOPs) are obtained by stations which are part of a multi-link device (MLD) having at least one non-simultaneous transmit and receive (NSTR) link pair such that a STA affiliated with the MLD transmitting or receiving on one link of the NSTR link pair could affect another STA affiliated with the same MLD transmitting or receiving on the other link of the NSTR link pair, comprising: (d)(i) wherein said STA operating as an NSTR STA affiliated with the MLD sets an NSTR timer which is counted down/up to a terminal value, said terminal value indicating that it is allowed to transmit on a link of one of NSTR link pairs of the MLD; (d)(ii) wherein said NSTR STA counts down/up the NSTR timer toward a terminal value; (d)(iii) wherein said NSTR STA is not allowed to transmit a frame at the same time that another STA that is affiliated with the same MLD is receiving a packet on another link of the NSTR link pair of the MLD, when the NSTR timer is not equal to said terminal value; and (d)(iv) determining that the NSTR timer is equal to its terminal value, and allowing said NSTR STA to transmit a frame at the same time that another STA that is affiliated with the same MLD is receiving a packet on another link of the NSTR link pair of the MLD.

An apparatus for wireless communication in a network, the apparatus comprising: (a) a wireless communication circuit configured as a station (STA) for wirelessly communicating with at least one other station (STA) on a network using Carrier-Sense Multiple-Access Collision Avoidance (CSMA/CA) as well as multi-link operations are applied; (b) a processor coupled to said station; (c) a non-transitory memory storing instructions executable by the processor; and (d) wherein said instructions, when executed by the processor, perform a communications protocol for said station and other stations on the network operating as either an Access Point (AP) station or non-AP stations, and wherein transmit opportunities (TXOPs) are obtained by stations which are part of a multi-link device (MLD) having at least one non-simultaneous transmit and receive (NSTR) link pair such that a STA affiliated with the MLD transmitting or receiving on one link of the NSTR link pair could affect another STA affiliated with the same MLD transmitting or receiving on the other link of the NSTR link pair, comprising: (d)(i) wherein said STA operating as an NSTR STA affiliated with the MLD sets an NSTR timer which is counted down/up to a terminal value, said terminal value indicating that it is allowed to transmit on a link of one of NSTR link pairs of the MLD; (d)(ii) wherein said NSTR STA counts down/up the NSTR timer toward a terminal value; (d)(iii) wherein said NSTR STA is not allowed to transmit a frame at the same time that another STA that is affiliated with the same MLD is receiving a packet on another link of the NSTR link pair of the MLD, when the NSTR timer is not equal to said terminal value; (d)(iv) determining that the NSTR timer is equal to its terminal value, and allowing said NSTR STA to transmit a frame at the same time that another STA that is affiliated with the same MLD is receiving a packet on another link of the NSTR link pair of the MLD; (d)(v) wherein said NSTR STA is configured for setting said NSTR timer to its terminal value to indicate that the STA is always allowed to transmit a frame at the same time that another STA that is affiliated with the same MLD is receiving a frame on the other link of the NSTR link pair; (d)(vi) wherein said NSTR STA is configured for setting said NSTR timer to a specific value which indicates that the STA is never allowed to transmit a frame at the same time that another STA that is affiliated with the same MLD is receiving a frame on another link of the NSTR link pair; and (d)(vii) wherein said NSTR STA which has set said NSTR timer can discard use of said NSTR timer when it does not have packets to transmit.

A protocol for wireless network communications between stations (STAs) on a network using multi-link operations, the protocol comprising: (a) controlling operations of STAs on the network operating as either an Access Point (AP) station or non-AP stations, and wherein transmit opportunities (TXOPs) are obtained by STAs using multi-link operations which are part of a multi-link device (MLD) having at least one non-simultaneous transmit and receive (NSTR) link pair, wherein a STA affiliated with the MLD transmitting or receiving on one link of the NSTR link pair could affect another STA affiliated with the same MLD transmitting or receiving on the other link of the NSTR link pair; (b) allowing an NSTR STA affiliated with the MLD to set an NSTR timer which is counted down/up to a terminal value, said terminal value indicating that it is allowed to transmit on a link of one of NSTR link pairs of the MLD; (c) not allowing said NSTR STA to transmit a frame at the same time that another STA that is affiliated with the same MLD is receiving a packet on another link of the NSTR link pair of the MLD, when the NSTR timer is not equal to said terminal value; and (d) determining whether the NSTR timer is equal to its terminal value, and if the NSTR timer is equal to its terminal value then allowing said NSTR STA to transmit a frame at the same time that another STA that is affiliated with the same MLD is receiving a packet on another link of the NSTR link pair of the MLD; (e) wherein said protocol is performed by one or more processors executing instructions stored on a non-transitory medium within a STA following the protocol.

A method of performing wireless communication in a network, the method comprising steps of: (a) executing a communications protocol by a processor for a wireless communication circuit configured as a station (STA) for wirelessly communicating with at least one other station (STA) on a network using Carrier-Sense Multiple-Access Collision Avoidance (CSMA/CA) as well as multi-link operations are applied, and in which said communications protocol is performed for said station and other stations on the network operating as either an Access Point (AP) station or non-AP stations, and wherein transmit opportunities (TXOPs) are obtained by stations which are part of a multi-link device (MLD) having at least one non-simultaneous transmit and receive (NSTR) link pair such that a STA affiliated with the MLD transmitting or receiving on one link of the NSTR link pair could affect another STA affiliated with the same MLD transmitting or receiving on the other link of the NSTR link pair; (b) wherein said STA operating as an NSTR STA affiliated with the MLD sets an NSTR timer which is counted down/up to a terminal value, said terminal value indicating that it is allowed to transmit on a link of one of NSTR link pairs of the MLD; (c) wherein said NSTR STA counts down/up the NSTR timer toward a terminal value; (d) wherein said NSTR STA is not allowed to transmit a frame at the same time that another STA that is affiliated with the same MLD is receiving a packet on another link of the NSTR link pair of the MLD, when the NSTR timer is not equal to said terminal value; and (e) determining that the NSTR timer is equal to its terminal value, and allowing said NSTR STA to transmit a frame at the same time that another STA that is affiliated with the same MLD is receiving a packet on another link of the NSTR link pair of the MLD.

A wireless communication system/apparatus performing transmission of packets, where CSMA/CA and multi-link operation are applied, a MLD that has at least one non-simultaneous transmit and receive (NSTR) link pair such that a STA affiliated with the MLD transmits or receives on one link of the NSTR link pair could affect another STA affiliated with the same MLD transmits or receives on the other link of the NSTR link pair, comprising: (a) the STA that is affiliated with the MLD sets a timer, denoted by NSTR timer, when it is to transmit on a link of one of NSTR link pairs of the MLD; (b) the STA counts down the NSTR timer until it reaches zero; (c) when the NSTR timer is not equal to zero, the STA is not allowed to transmit a frame at the same time that another STA that is affiliated with the same MLD is receiving a packet on another link of the NSTR link pair of the MLD; and (d) when the NSTR timer is equal to zero, the STA is allowed to transmit a frame at the same time that another STA that is affiliated with the same MLD is receiving a packet on another link of the NSTR link pair of the MLD.

The apparatus, system protocol or method of any preceding implementation, wherein said NSTR STA setting the NSTR timer commences counting down/up said NSTR timer when it first detects that it is not allowed to transmit a frame because another STA that is affiliated with the same MLD is receiving a frame on another link of the NSTR link pair.

The apparatus, system protocol or method of any preceding implementation, wherein said NSTR STA setting the NSTR timer commences counting down/up said NSTR timer immediately after the NSTR timer is set.

The apparatus, system protocol or method of any preceding implementation, wherein said NSTR STA is configured for setting and/or resetting the NSTR timer to an initial count value when it starts a new channel contention.

The apparatus, system protocol or method of any preceding implementation, wherein said NSTR STA is configured for setting and/or resetting the NSTR timer to an initial count value after it finishes a transmission triggered by another STA.

The apparatus, system protocol or method of any preceding implementation, wherein said NSTR STA is configured for setting and/or resetting the NSTR timer to an initial value when, or after, another STA that is affiliated with the same MLD transmits on another link.

The apparatus, system protocol or method of any preceding implementation, wherein after said NSTR STA commences counting down/up said NSTR timer, it is configured to pause and/or continue counting down/up the NSTR timer if the value of the timer has not reached its terminal value.

The apparatus, system protocol or method of any preceding implementation, wherein said NSTR STA continues counting down/up said NSTR timer when it is not allowed to transmit because another STA that is affiliated with the same MLD is receiving a frame on another link of the NSTR link pair.

The apparatus, system protocol or method of any preceding implementation, wherein said NSTR STA continues counting down/up said NSTR timer only when it is not allowed to transmit because another STA that is affiliated with the same MLD is receiving a frame on another link of the NSTR link pair.

The apparatus, system protocol or method of any preceding implementation, wherein said NSTR STA is configured for counting down/up said NSTR timer without suspension of the counting process when the value of the NSTR timer has not reached its terminal count.

The apparatus, system protocol or method of any preceding implementation, wherein said NSTR STA is configured for setting said NSTR timer to its terminal value to indicate that the STA is always allowed to transmit a frame at the same time that another STA that is affiliated with the same MLD is receiving a frame on the other link of the NSTR link pair.

The apparatus, system protocol or method of any preceding implementation, wherein said NSTR STA is configured for setting said NSTR timer to a specific value which indicates that the STA is never allowed to transmit a frame at the same time that another STA that is affiliated with the same MLD is receiving a frame on another link of the NSTR link pair.

The apparatus, system protocol or method of any preceding implementation, wherein said NSTR STA which has set said NSTR timer can discard use of said NSTR timer when it does not have packets to transmit.

The apparatus, system protocol or method of any preceding implementation, wherein said NSTR STA setting the NSTR timer commences counting down/up said NSTR timer immediately after the NSTR timer is set, or when it first detects that it is not allowed to transmit a frame because another STA that is affiliated with the same MLD is receiving a frame on another link of the NSTR link pair.

The apparatus, system protocol or method of any preceding implementation, wherein said NSTR STA is configured for setting and/or resetting the NSTR timer to an initial count value when: (a) it starts a new channel contention; (b) after it finishes a transmission triggered by another STA; (c) at the time or after another STA that is affiliated with the same MLD transmits on another link.

The apparatus, system protocol or method of any preceding implementation, wherein after said NSTR STA commences counting down/up said NSTR timer, it is configured to pause and/or continue counting down/up the NSTR timer if the value of the timer has not reached its terminal value.

The apparatus, system protocol or method of any preceding implementation, wherein said NSTR STA continues counting down/up said NSTR timer when: (a) it is not allowed to transmit because another STA that is affiliated with the same MLD is receiving a frame on another link of the NSTR link pair; (b) it is not allowed to transmit because another STA that is affiliated with the same MLD is receiving a frame on another link of the NSTR link pair; or (c) the value of the NSTR timer has not reached its terminal count and performs counting without suspension of the counting process.

The apparatus, system protocol or method of any preceding implementation, wherein the STA setting a NSTR timer could start to count down the timer from the first time it is not allowed to transmit a frame because another STA that is affiliated with the same MLD is receiving a frame on another link of the NSTR link pair since the timer is set.

The apparatus, system protocol or method of any preceding implementation, wherein the STA setting a NSTR timer could start to count down the NSTR timer immediately at the time that the NSTR timer is set.

The apparatus, system protocol or method of any preceding implementation, wherein the STA setting a NSTR timer could set/reset the NSTR timer when it starts a new channel contention.

The apparatus, system protocol or method of any preceding implementation, wherein the STA setting a NSTR timer could set/reset the NSTR timer after it finishes a transmission triggered by another STA.

The apparatus, system protocol or method of any preceding implementation, wherein the STA setting a NSTR timer could set/reset the NSTR timer when or after another STA that is affiliated with the same MLD transmits on another link.

The apparatus, system protocol or method of any preceding implementation, wherein the STA setting a NSTR timer could pause and continue counting down the timer under different conditions when the value of the timer is nonzero after the STA starts to count down the NSTR timer.

The apparatus, system protocol or method of any preceding implementation, wherein the STA setting a NSTR timer could count down the timer without suspension to 0 when the value of the NSTR timer is nonzero after the STA starts to count down the NSTR timer.

The apparatus, system protocol or method of any preceding implementation, wherein the STA setting a NSTR timer could set the timer to 0 to indicate that the STA is always allowed to transmit a frame at the same time that another STA that is affiliated with the same MLD is receiving a frame on the other link of the NSTR link pair.

The apparatus, system protocol or method of any preceding implementation, wherein the STA setting a NSTR timer could set the NSTR timer to a specific number to indicate that the STA is never allowed to transmit a frame at the same time that another STA that is affiliated with the same MLD is receiving a frame on another link of the NSTR link pair.

The apparatus, system protocol or method of any preceding implementation, wherein the STA setting a NSTR timer could discard the NSTR timer when it does not have packet to transmit.

The apparatus, system protocol or method of any preceding implementation, where the STA could count down the NSTR timer when it is not allowed to transmit because another STA that is affiliated with the same MLD is receiving a frame on another link of the NSTR link pair.

The apparatus, system protocol or method of any preceding implementation, where the STA could count down the NSTR timer only when it is not allowed to transmit because another STA that is affiliated with the same MLD is receiving a frame on another link of the NSTR link pair.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing group of elements, indicates that at least one of these group elements is present, which includes any possible combination of these listed elements as applicable.

References in this specification referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

In addition, when the disclosure refers to operations which "can" or "should" (or similar wording) be performed by the instructions, then this indicates that the operation is performed in at least one embodiment and/or mode of the present disclosure and more generally most of the embodiments and/or modes of the present disclosure, but that there could be instances, where for any of a variety of reasons, these instructions are overridden or otherwise not performed.

As used herein, the term "set" refers to a collection of one or more objects. Thus, for example, a set of objects can include a single object or multiple objects.

As used herein, the terms "approximately", "approximate", "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

It will be appreciated that the practice of some jurisdictions may require deletion of one or more portions of the disclosure after that application is filed. Accordingly the reader should consult the application as filed for the original content of the disclosure. Any deletion of content of the disclosure should not be construed as a disclaimer, forfeiture or dedication to the public of any subject matter of the application as originally filed.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for wireless communication in a network, the apparatus comprising:
   (a) a wireless communication circuit configured as a station (STA) for wirelessly communicating with at least one other station (STA) on a network using Carrier-Sense Multiple-Access Collision Avoidance (CSMA/CA) and wherein multi-link operations are applied;
   (b) a processor coupled to said STA;
   (c) a non-transitory memory storing instructions executable by the processor; and
   (d) wherein said instructions, when executed by the processor, perform a communications protocol for said STA and other STAs on the network operating as either an Access Point (AP) station or non-AP stations, and wherein transmit opportunities (TXOPs) are obtained by STAs which are part of a multi-link device (MLD) having at least one non-simultaneous transmit and receive (NSTR) link pair such that a STA affiliated with the MLD transmitting or receiving on one link of the NSTR link pair could affect another STA affiliated with the same MLD transmitting or receiving on the other link of the NSTR link pair, said communications protocol comprising:
      (i) said STA operating as an NSTR STA affiliated with the MLD sets an NSTR timer which is counted down/up to a terminal value, said terminal value indicating that NSTR STA is allowed to transmit on a link of one of NSTR link pairs of the MLD;
      (ii) said NSTR STA counts down/up the NSTR timer toward a terminal value;
      (iii) said NSTR STA is not allowed to transmit a frame at the same time that another STA that is affiliated with the same MLD is receiving a packet on another link of the NSTR link pair of the MLD, when the NSTR timer is not equal to said terminal value; and
      (iv) determining whether the NSTR timer is equal to its terminal value, and if the NSTR timer is equal to its terminal value then allowing said NSTR STA to transmit a frame at the same time that another STA that is affiliated with the same MLD is receiving a packet on another link of the NSTR link pair of the MLD.

2. The apparatus of claim 1, wherein said NSTR STA setting the NSTR timer commences counting down/up said NSTR timer when it first detects that it is not allowed to transmit a frame because another STA that is affiliated with the same MLD is receiving a frame on another link of the NSTR link pair.

3. The apparatus of claim 1, wherein said NSTR STA setting the NSTR timer commences counting down/up said NSTR timer immediately after the NSTR timer is set.

4. The apparatus of claim 1, wherein said NSTR STA is configured for setting and/or resetting the NSTR timer to an initial count value when it starts a new channel contention.

5. The apparatus of claim 1, wherein said NSTR STA is configured for setting and/or resetting the NSTR timer to an initial count value after it finishes a transmission triggered by another STA.

6. The apparatus of claim 1, wherein said NSTR STA is configured for setting and/or resetting the NSTR timer to an initial value when, or after, another STA that is affiliated with the same MLD transmits on another link.

7. The apparatus of claim 1, wherein after said NSTR STA commences counting down/up said NSTR timer, said NSTR STA pauses and/or continues counting down/up the NSTR timer if the value of the timer has not reached its terminal value.

8. The apparatus of claim 7, wherein said NSTR STA continues counting down/up said NSTR timer when said NSTR STA is not allowed to transmit because another STA that is affiliated with the same MLD is receiving a frame on another link of the NSTR link pair.

9. The apparatus of claim 7, wherein said NSTR STA continues counting down/up said NSTR timer only when NSTR STA is not allowed to transmit because another STA that is affiliated with the same MLD is receiving a frame on another link of the NSTR link pair.

10. The apparatus of claim 1, wherein said NSTR STA is configured for counting down/up said NSTR timer without suspension of the counting process when the value of the NSTR timer has not reached its terminal count.

11. The apparatus of claim 1, wherein said NSTR STA is configured for setting said NSTR timer to its terminal value to indicate that the STA is always allowed to transmit a frame at the same time that another STA that is affiliated with the same MLD is receiving a frame on the other link of the NSTR link pair.

12. The apparatus of claim 1, wherein said NSTR STA is configured for setting said NSTR timer to a specific value which indicates that the STA is never allowed to transmit a frame at the same time that another STA that is affiliated with the same MLD is receiving a frame on another link of the NSTR link pair.

13. The apparatus of claim 1, wherein said NSTR STA which has set said NSTR timer can discard use of said NSTR timer when it does not have packets to transmit.

14. A protocol for wireless network communications between stations (STAs) on a network using multi-link operations, the protocol comprising:
   (a) controlling operations of STAs on the network operating as either an Access Point (AP) station or non-AP stations, and wherein transmit opportunities (TXOPs) are obtained by STAs using multi-link operations which are part of a multi-link device (MLD) having at least one non-simultaneous transmit and receive (NSTR) link pair, wherein a STA affiliated with the MLD transmitting or receiving on one link of the NSTR link pair could affect another STA affiliated with the same MLD transmitting or receiving on the other link of the NSTR link pair;

(b) allowing an NSTR STA affiliated with the MLD to set an NSTR timer which is counted down/up to a terminal value, said terminal value indicating that it is allowed to transmit on a link of one of NSTR link pairs of the MLD;

(c) not allowing NSTR STA to transmit a frame at the same time that another STA that is affiliated with the same MLD is receiving a packet on another link of the NSTR link pair of the MLD, when the NSTR timer is not equal to said terminal value; and (d) determining whether the NSTR timer is equal to its terminal value, and if the NSTR timer is equal to its terminal value then allowing said NSTR STA to transmit a frame at the same time that another STA that is affiliated with the same MLD is receiving a packet on another link of the NSTR link pair of the MLD;

(e) wherein said protocol is performed by one or more processors executing instructions stored on a non-transitory medium within a STA following the protocol.

15. The protocol of claim 14, wherein said NSTR STA setting the NSTR timer commences counting down/up said NSTR timer when it first detects that it is not allowed to transmit a frame because another STA that is affiliated with the same MLD is receiving a frame on another link of the NSTR link pair.

16. The protocol of claim 14, wherein said NSTR STA setting the NSTR timer commences counting down/up said NSTR timer immediately after the NSTR timer is set.

17. The protocol of claim 14, wherein said NSTR STA is configured for setting and/or resetting the NSTR timer to an initial count value when it starts a new channel contention.

18. The protocol of claim 14, wherein said NSTR STA is configured for setting and/or resetting the NSTR timer to an initial count value after it finishes a transmission triggered by another STA.

19. The protocol of claim 14, wherein said NSTR STA is configured for setting and/or resetting the NSTR timer to an initial value when, or after, another STA that is affiliated with the same MLD transmits on another link.

20. The protocol of claim 14, wherein after said NSTR STA commences counting down/up said NSTR timer, said NSTR STA pauses and/or continues counting down/up the NSTR timer if the value of the timer has not reached its terminal value.

21. The protocol of claim 20, wherein said NSTR STA continues counting down/up said NSTR timer when said NSTR STA is not allowed to transmit because another STA that is affiliated with the same MLD is receiving a frame on another link of the NSTR link pair.

22. The protocol of claim 20, wherein said NSTR STA continues counting down/up said NSTR timer only when NSTR STA is not allowed to transmit because another STA that is affiliated with the same MLD is receiving a frame on another link of the NSTR link pair.

23. The protocol of claim 14, wherein said NSTR STA is configured for counting down/up said NSTR timer without suspension of the counting process when the value of the NSTR timer has not reached its terminal count.

24. The protocol of claim 14, wherein said NSTR STA is configured for setting said NSTR timer to its terminal value to indicate that the STA is always allowed to transmit a frame at the same time that another STA that is affiliated with the same MLD is receiving a frame on the other link of the NSTR link pair.

25. The protocol of claim 14, wherein said NSTR STA is configured for setting said NSTR timer to a specific value which indicates that the STA is never allowed to transmit a frame at the same time that another STA that is affiliated with the same MLD is receiving a frame on another link of the NSTR link pair.

26. The protocol of claim 14, wherein said NSTR STA which has set said NSTR timer can discard use of said NSTR timer when it does not have packets to transmit.

27. A method of performing wireless communication in a network, the method comprising:

(a) executing a communications protocol by a processor for a wireless communication circuit configured as a station (STA) for wirelessly communicating with at least one other station (STA) on a network using Carrier-Sense Multiple-Access Collision Avoidance (CSMA/CA) as well as multi-link operations are applied, and in which said communications protocol is performed for said station and other stations on the network operating as either an Access Point (AP) station or non-AP stations, and wherein transmit opportunities (TXOPs) are obtained by stations which are part of a multi-link device (MLD) having at least one non-simultaneous transmit and receive (NSTR) link pair such that a STA affiliated with the MLD transmitting or receiving on one link of the NSTR link pair could affect another STA affiliated with the same MLD transmitting or receiving on the other link of the NSTR link pair;

(b) wherein an STA operating as an NSTR STA affiliated with the MLD sets an NSTR timer which is counted down/up to a terminal value, said terminal value indicating that it is allowed to transmit on a link of one of NSTR link pairs of the MLD;

(c) wherein said NSTR STA counts down/up the NSTR timer toward a terminal value;

(d) wherein said NSTR STA is not allowed to transmit a frame at the same time that another STA that is affiliated with the same MLD is receiving a packet on another link of the NSTR link pair of the MLD, when the NSTR timer is not equal to said terminal value; and (e) determining that the NSTR timer is equal to its terminal value, and allowing said NSTR STA to transmit a frame at the same time that another STA that is affiliated with the same MLD is receiving a packet on another link of the NSTR link pair of the MLD.

28. The method of claim 27, wherein said NSTR STA, based on communication conditions at the MLD, is configured to determine (a) when to commence counting down/up said NSTR timer; (b) setting and/or resetting the NSTR timer to an initial count value; (c) pausing and/or continuing counting down/up the NSTR timer; (d) when to discard use of said NSTR timer; (e) when to set said NSTR timer to a specific value to indicate that the STA is always allowed to transmit a frame at the same time that another STA that is affiliated with the same MLD is receiving a frame on the other link of the NSTR link pair; and (f) when to set said NSTR timer to a specific value which indicates that the STA is never allowed to transmit a frame at the same time that another STA that is affiliated with the same MLD is receiving a frame on another link of the NSTR link pair.

* * * * *